(12) United States Patent
Kondo et al.

(10) Patent No.: US 7,477,289 B2
(45) Date of Patent: Jan. 13, 2009

(54) IMAGE PROCESSING APPARATUS AND METHOD, AND IMAGE PICKUP APPARATUS

(75) Inventors: Tetsujiro Kondo, Tokyo (JP); Seiji Wada, Kanagawa (JP); Junichi Ishibashi, Saitama (JP); Takashi Sawao, Tokyo (JP); Naoki Fujiwara, Tokyo (JP); Takahiro Nagano, Kanagawa (JP); Toru Miyake, Tokyo (JP)

(73) Assignee: Sony Corporation, Tokyo (JP)

( * ) Notice: Subject to any disclaimer, the term of this patent is extended or adjusted under 35 U.S.C. 154(b) by 1205 days.

(21) Appl. No.: 10/362,793

(22) PCT Filed: Jun. 26, 2002

(86) PCT No.: PCT/JP02/06383

§ 371 (c)(1),
(2), (4) Date: Oct. 20, 2003

(87) PCT Pub. No.: WO03/003305

PCT Pub. Date: Jan. 9, 2003

(65) Prior Publication Data

US 2004/0105493 A1 Jun. 3, 2004

(30) Foreign Application Priority Data

Jun. 27, 2001 (JP) ............................. 2001-194608

(51) Int. Cl.
*H04N 5/228* (2006.01)

(52) U.S. Cl. .............. 348/208.4; 348/208.5; 348/208.6; 348/208.13; 348/208.14

(58) Field of Classification Search ... 348/208.4–208.6, 348/208.13, 208.14
See application file for complete search history.

(56) References Cited

U.S. PATENT DOCUMENTS 6,404,901 B1 * 6/2002 Itokawa ....................... 382/103

FOREIGN PATENT DOCUMENTS

| EP | 0 771 107 | 5/1997 |
| EP | 0 933 727 | 8/1999 |
| EP | 1 400 926 | 3/2004 |
| JP | 7-336688 | 12/1995 |

(Continued)

*Primary Examiner*—Lin Ye
*Assistant Examiner*—Anthony J Daniels
(74) *Attorney, Agent, or Firm*—Frommer Lawrence & Haug LLP; William S. Frommer

(57) ABSTRACT

An object of the present invention is to make it possible to detect the mixture state of an image. An area specifying unit 103 specifies, in correspondence with image data, a mixed area in which foreground object components forming a foreground object and background object components forming a background object are mixed and a non-mixed area formed of a foreground area consisting of only the foreground object components and a background area consisting of only the background object components. A mixture-ratio calculator 104 estimates, based on the ratio of the width of the mixed area in a predetermined direction with respect to the moving direction of the foreground object, the width of the mixed area being specified by the area information, to the distance from the position of a designated pixel to the edge of the mixed area in the predetermined direction, the mixture ratio indicating the ratio of the foreground object components and the background object components of the designated pixel. The present invention is applicable to an image processing apparatus.

32 Claims, 72 Drawing Sheets

FOREIGN PATENT DOCUMENTS

| | | |
|---|---|---|
| JP | 10-164436 | 6/1998 |
| JP | 2000-30040 | 1/2000 |
| JP | 2001-250119 | 9/2001 |
| JP | 2002-190015 | 7/2002 |
| JP | 2002-190016 | 7/2002 |
| JP | 2002-190028 | 7/2002 |
| WO | WO 99 22520 | 5/1999 |
| WO | WO 03/001456 | 1/2003 |

\* cited by examiner

FIG. 3
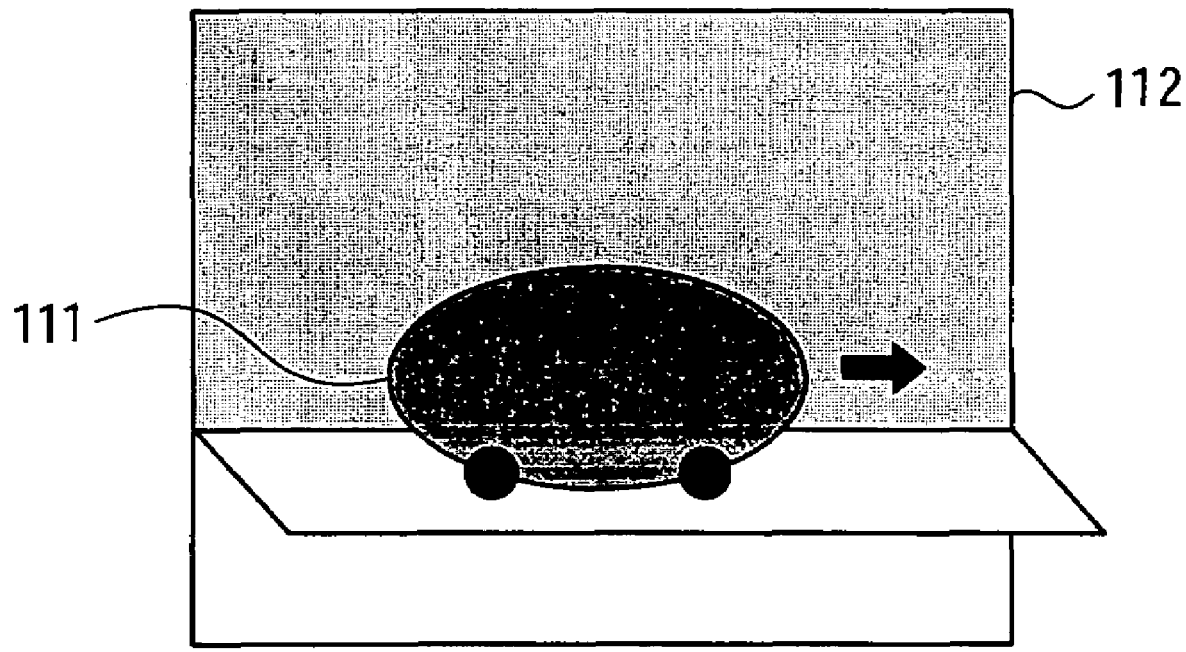
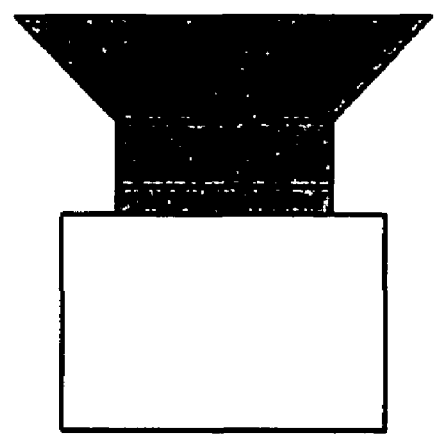

| AREA | | DESCRIPTION |
|---|---|---|
| BACKGROUND AREA | | STATIONARY PORTION |
| FOREGROUND AREA | | MOVING PORTION |
| MIXED AREA | COVERED BACKGROUND AREA | PORTION CHANGING FROM BACKGROUND TO FOREGROUND |
| | UNCOVERED BACKGROUND AREA | PORTION CHANGING FROM FOREGROUND TO BACKGROUND |

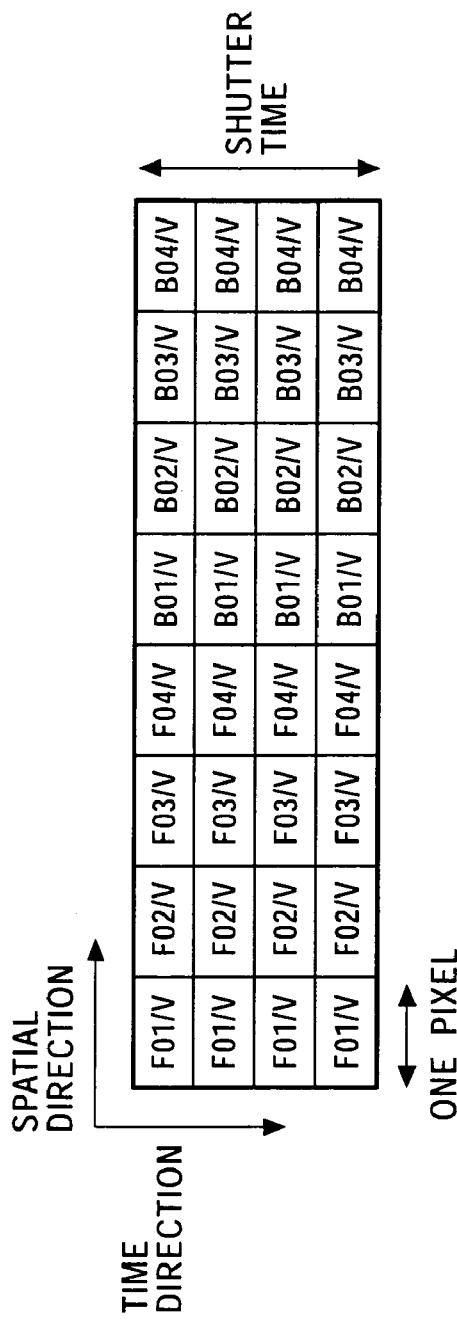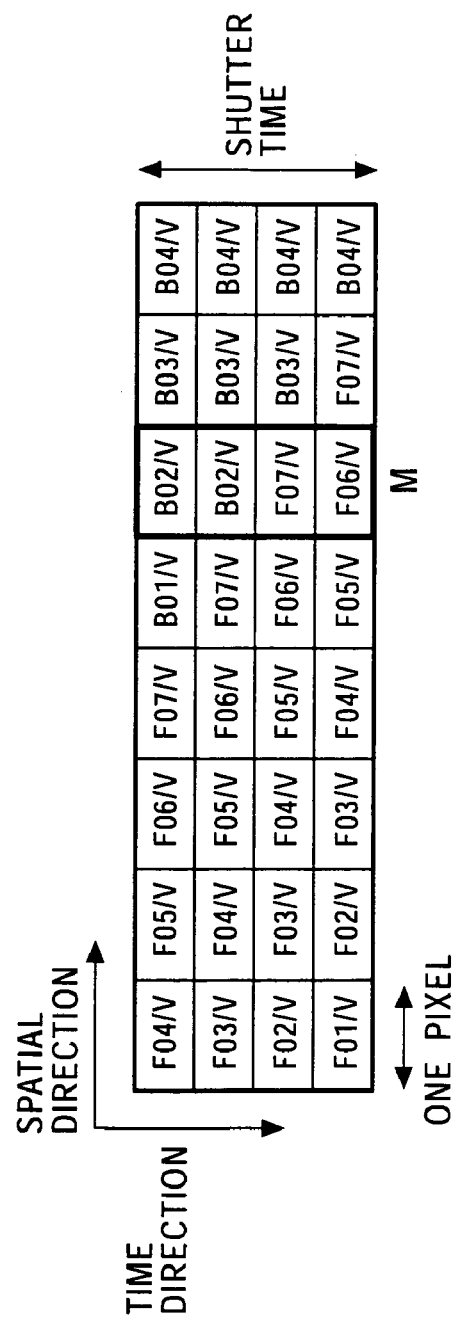

FIG. 25

| AREA DETERMINATION | STATIONARY/MOVING DETERMINATION BETWEEN FRAME #n-2 AND FRAME #n-1 | STATIONARY/MOVING DETERMINATION BETWEEN FRAME #n-1 AND FRAME #n | STATIONARY/MOVING DETERMINATION BETWEEN FRAME #n AND FRAME #n+1 | STATIONARY/MOVING DETERMINATION BETWEEN FRAME #n+1 AND FRAME #n+2 |
|---|---|---|---|---|
| COVERED-BACKGROUND-AREA DETERMINATION | STATIONARY | MOVING | — | — |
| STATIONARY-AREA DETERMINATION | — | STATIONARY | STATIONARY | — |
| MOVING-AREA DETERMINATION | — | MOVING | MOVING | — |
| UNCOVERED-BACKGROUND-AREA DETERMINATION | — | — | MOVING | STATIONARY |

FIG. 33A

| $X_0$ | $X_1$ | $X_2$ |
|---|---|---|
| $X_3$ | $X_4$ | $X_5$ |
| $X_6$ | $X_7$ | $X_8$ |

FIG. 33B

| $Y_0$ | $Y_1$ | $Y_2$ |
|---|---|---|
| $Y_3$ | $Y_4$ | $Y_5$ |
| $Y_6$ | $Y_7$ | $Y_8$ |

FIG. 34A

|     |     |     |
| --- | --- | --- |
| $X_0$ | $X_1$ | $X_2$ |
| $X_3$ | $X_4$ | $X_5$ |
| $X_6$ | $X_7$ | $X_8$ |

FIG. 34B

|     |     |     |
| --- | --- | --- |
| $Y_0$ | $Y_1$ | $Y_2$ |
| $Y_3$ | $Y_4$ | $Y_5$ |
| $Y_6$ | $Y_7$ | $Y_8$ |

FIG. 37

| | BACKGROUND AREA | FOREGROUND AREA | COVERED BACKGROUND AREA | UNCOVERED BACKGROUND AREA |
|---|---|---|---|---|
| FRAME #n-1 | 1 | 1 | 0 | 1 |
| FRAME #n | 0 | 1 | 1 | 1 |
| FRAME #n+1 | 1 | 1 | 1 | 0 |

FIG. 57A
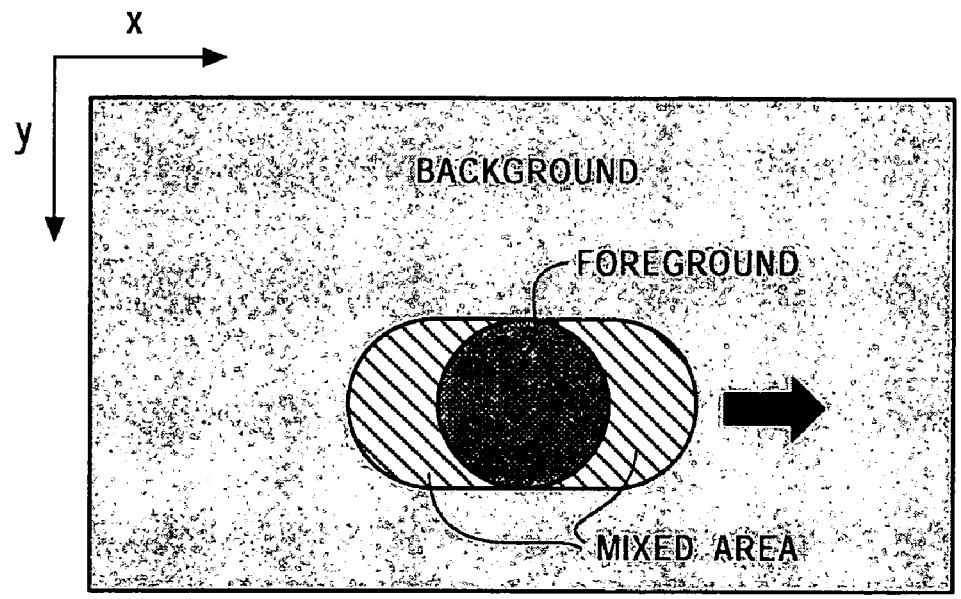
SEPARATE FOREGROUND AND BACKGROUND
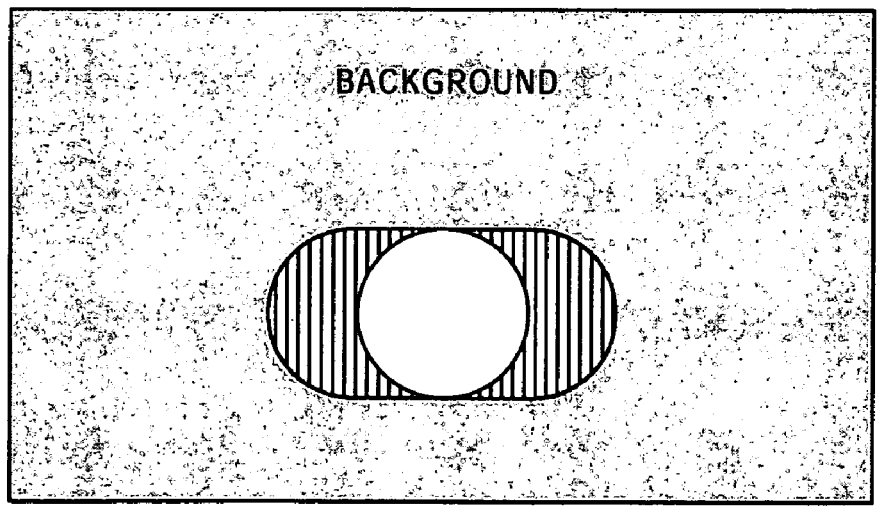
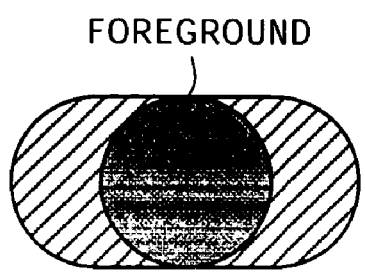
FOREGROUND

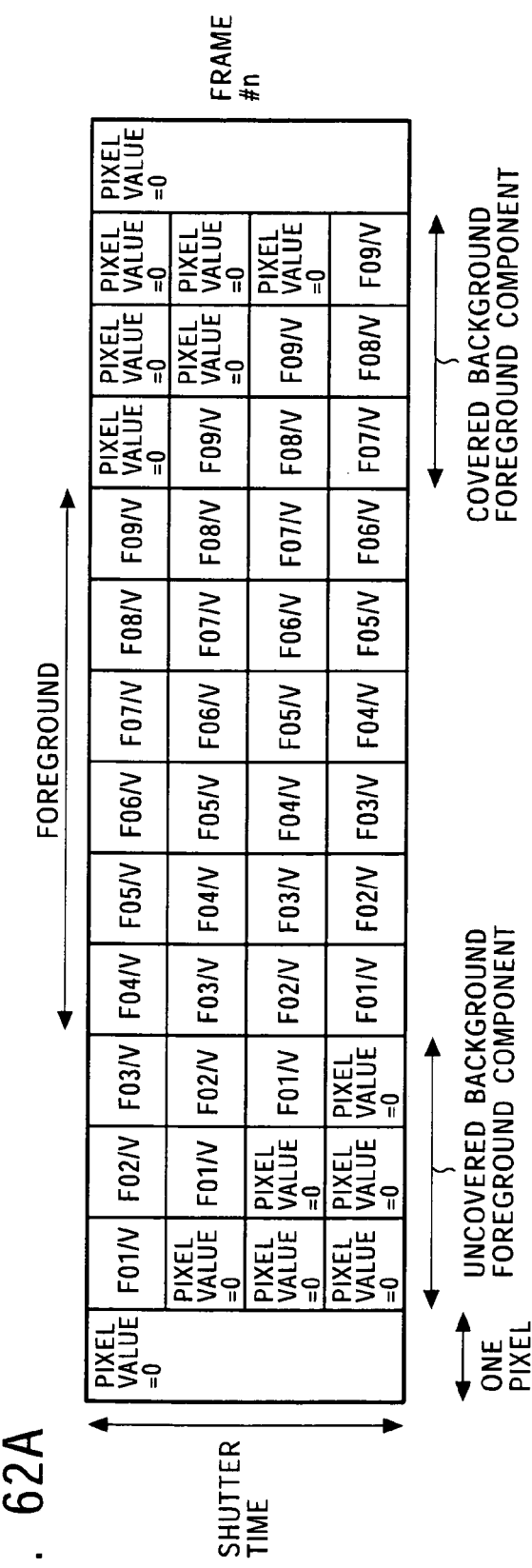
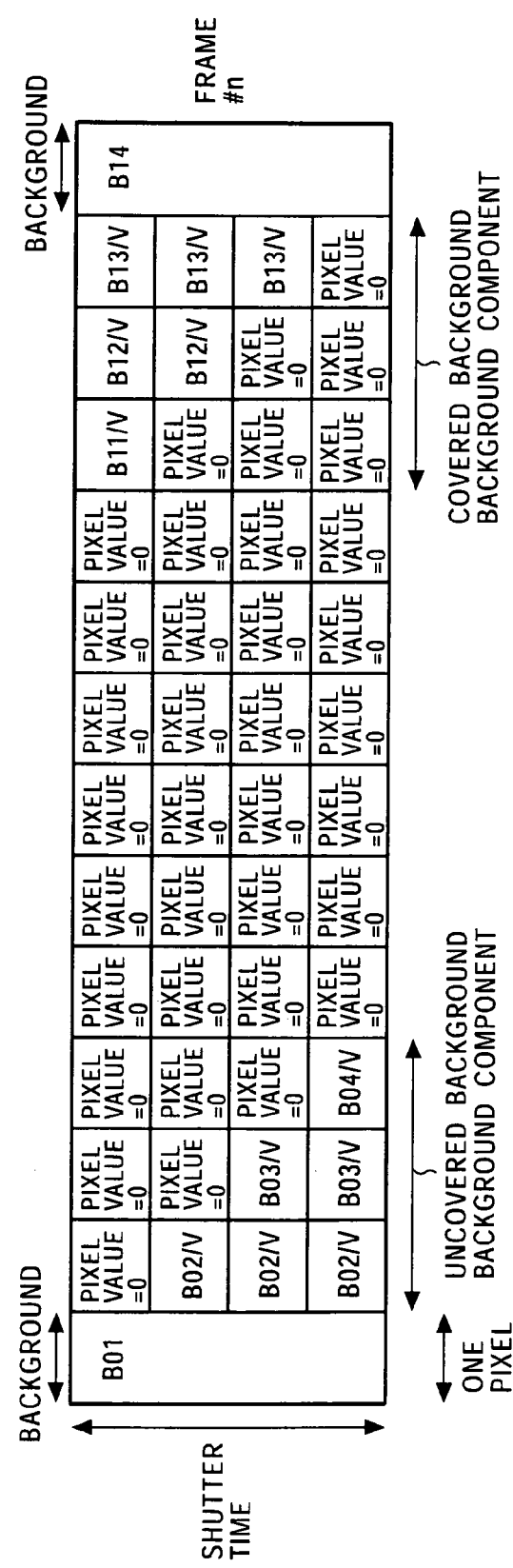
FIG. 62A
FIG. 62B

FIG. 66
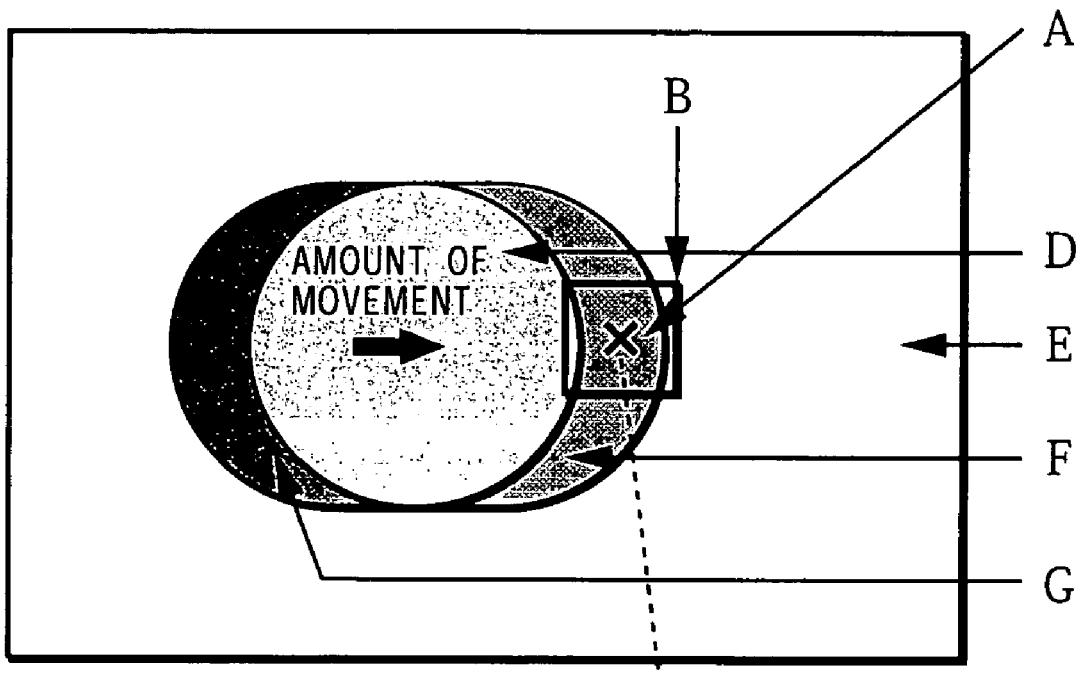
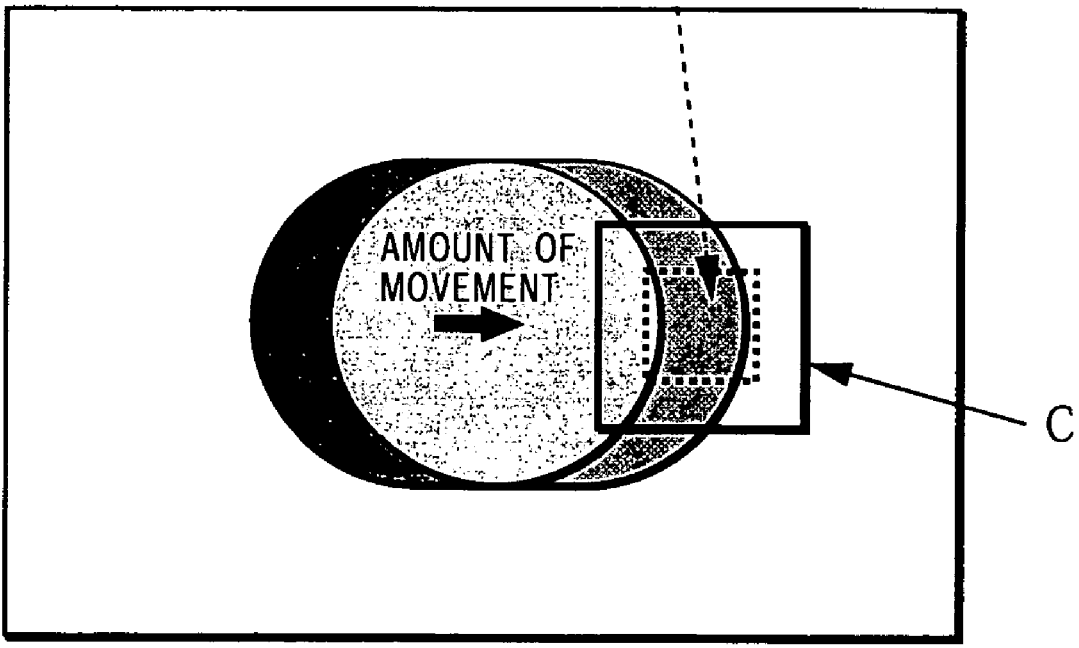

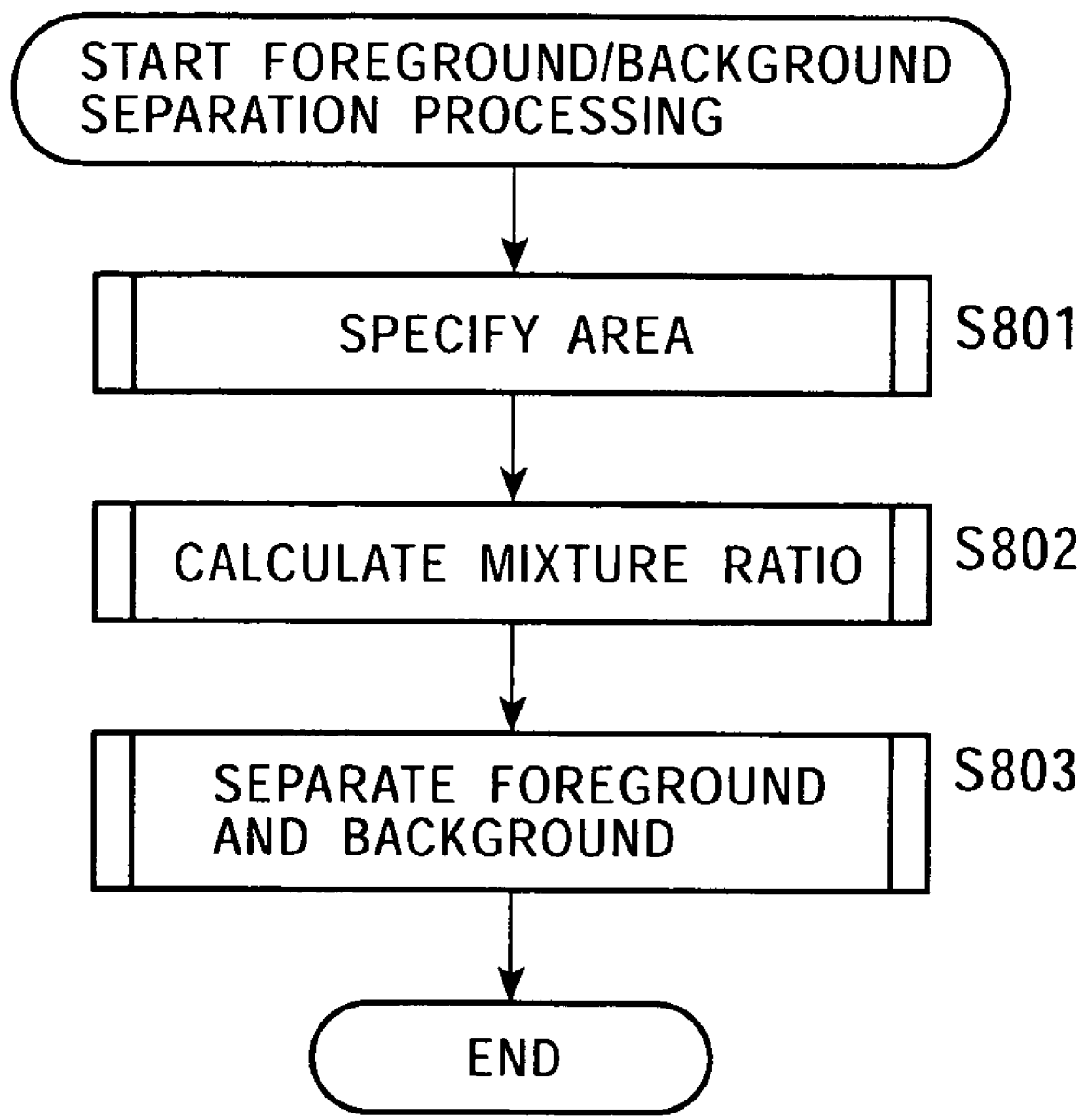

IMAGE PROCESSING APPARATUS AND METHOD, AND IMAGE PICKUP APPARATUS

TECHNICAL FIELD

The present invention relates to image processing apparatuses and methods, and image-capturing apparatuses, and more particularly, to an image processing apparatus and method, and an image-capturing apparatus in which a difference between a signal detected by a sensor and the real world is taken into consideration.

BACKGROUND ART

A technique for detecting incidents occurring in the real world by a sensor and for processing sampled data output from the image sensor is widely used.

For example, motion blur occurs in an image obtained by capturing an object moving in front of a predetermined stationary background with a video camera if the moving speed is relatively high.

However, when an object is moving in front of a stationary background, not only does motion blur caused by the mixture of the moving object itself occur, but also the mixture of the background image and the object image occurs. Hitherto, the processing for dealing with the mixture state of the background image and the moving object has not been considered.

DISCLOSURE OF INVENTION

The present invention has been made in view of the above-described background. Accordingly, it is an object of the present invention to make it possible to detect the mixture state in an image.

A first image processing apparatus of the present invention includes: area specifying means for specifying, in correspondence with image data, a mixed area in which foreground object components forming a foreground object and background object components forming a background object are mixed and a non-mixed area formed of a foreground area consisting of only the foreground object components and a background area consisting of only the background object components; and mixture-ratio estimating means for estimating, based on the ratio of the width of the mixed area in a predetermined direction with respect to the moving direction of the foreground object component, the width of the mixed area being specified by the area information, to the distance from the position of a designated pixel to the edge of the mixed area in the predetermined direction, a mixture ratio indicating the ratio between the foreground object components and the background object components of the designated pixel.

The image processing apparatus may further include motion-vector detection means for detecting a motion vector of the foreground object. The mixture-ratio estimating means may detect the width of the mixed area and the distance from the position of the designated pixel to the edge of the mixed area in the moving direction of the motion vector, and may estimate the mixture ratio based on the ratio of the width of the mixed area to the distance from the position of the designated pixel to the edge of the mixed area.

The image processing apparatus may further include moving-direction detection means for detecting the moving direction of the foreground object. The mixture-ratio estimating means may detect the width of the mixed area and the distance from the position of the designated pixel to the edge of the mixed area in the moving direction, and may estimate the mixture ratio based on the ratio of the width of the mixed area to the distance from the position of the designated pixel to the edge of the mixed area.

The moving-direction detection means may include motion-vector generating means for generating a motion vector based on the area information and the position of the mixed area in a designated frame and the position of the mixed area in a frame in the vicinity of the designated frame, thereby making it possible to detect the moving direction based on the generated motion vector.

A first image processing method of the present invention includes: an area specifying step of specifying, in correspondence with image data, a mixed area in which foreground object components forming a foreground object and background object components forming a background object are mixed and a non-mixed area formed of a foreground area consisting of only the foreground object components and a background area consisting of only the background object components; and a mixture-ratio estimating step of estimating, based on the ratio of the width of the mixed area in a predetermined direction with respect to the moving direction of the foreground object component, the width of the mixed area being specified by the area information, to the distance from the position of a designated pixel to the edge of the mixed area in the predetermined direction, a mixture ratio indicating the ratio between the foreground object components and the background object components of the designated pixel.

The image processing method may further include a motion-vector detection step of detecting a motion vector of the foreground object. In the mixture-ratio estimating step, the width of the mixed area and the distance from the position of the designated pixel to the edge of the mixed area may be detected in the moving direction of the motion vector, and the mixture ratio may be estimated based on the ratio of the width of the mixed area to the distance from the position of the designated pixel to the edge of the mixed area.

The image processing method may further include a moving-direction detection step of detecting the moving direction of the foreground object. In the mixture-ratio estimating step, the width of the mixed area and the distance from the position of the designated pixel to the edge of the mixed area may be detected in the moving direction, and the mixture ratio may be estimated based on the ratio of the width of the mixed area to the distance from the position of the designated pixel to the edge of the mixed area.

The moving-direction detection step may include a motion-vector generating step of generating a motion vector based on the area information and the position of the mixed area in a designated frame and the position of the mixed area in a frame in the vicinity of the designated frame, thereby making it possible to detect the moving direction based on the generated motion vector.

A program of a first recording medium of the present invention includes: an area specifying step of specifying, in correspondence with image data, a mixed area in which foreground object components forming a foreground object and background object components forming a background object are mixed and a non-mixed area formed of a foreground area consisting of only the foreground object components and a background area consisting of only the background object components; and a mixture-ratio estimating step of estimating, based on the ratio of the width of the mixed area in a predetermined direction with respect to the moving direction of the foreground object component, the width of the mixed area being specified by the area information, to the distance from the position of a designated pixel to the edge of the mixed area in the predetermined direction, a mixture ratio indicating the ratio between the foreground object components and the background object components of the designated pixel.

The program may further include a motion-vector detection step of detecting a motion vector of the foreground object. In the mixture-ratio estimating step, the width of the mixed area and the distance from the position of the designated pixel to the edge of the mixed area may be detected in the moving direction of the motion vector, and the mixture ratio may be estimated based on the ratio of the width of the mixed area to the distance from the position of the designated pixel to the edge of the mixed area.

The program may further include a moving-direction detection step of detecting the moving direction of the foreground object. In the mixture-ratio estimating step, the width of the mixed area and the distance from the position of the designated pixel to the edge of the mixed area may be detected in the moving direction, and the mixture ratio may be estimated based on the ratio of the width of the mixed area to the distance from the position of the designated pixel to the edge of the mixed area.

The moving-direction detection step may include a motion-vector generating step of generating a motion vector based on the area information and the position of the mixed area in a designated frame and the position of the mixed area in a frame in the vicinity of the designated frame, thereby making it possible to detect the moving direction based on the generated motion vector.

A first program of the present invention allows a computer to execute: an area specifying step of specifying, in correspondence with image data, a mixed area in which foreground object components forming a foreground object and background object components forming a background object are mixed and a non-mixed area formed of a foreground area consisting of only the foreground object components and a background area consisting of only the background object components; and a mixture-ratio estimating step of estimating, based on the ratio of the width of the mixed area in a predetermined direction with respect to the moving direction of the foreground object component, the width of the mixed area being specified by the area information, to the distance from the position of a designated pixel to the edge of the mixed area in the predetermined direction, a mixture ratio indicating the ratio between the foreground object components and the background object components of the designated pixel.

The program may further include a motion-vector detection step of detecting a motion vector of the foreground object. In the mixture-ratio estimating step, the width of the mixed area and the distance from the position of the designated pixel to the edge of the mixed area may be detected in the moving direction of the motion vector, and the mixture ratio may be estimated based on the ratio of the width of the mixed area to the distance from the position of the designated pixel to the edge of the mixed area.

The program may further include a moving-direction detection step of detecting the moving direction of the foreground object. In the mixture-ratio estimating step, the width of the mixed area and the distance from the position of the designated pixel to the edge of the mixed area may be detected in the moving direction, and the mixture ratio may be estimated based on the ratio of the width of the mixed area to the distance from the position of the designated pixel to the edge of the mixed area.

The moving-direction detection step may include a motion-vector generating step of generating a motion vector based on the area information and the position of the mixed area in a designated frame and the position of the mixed area in a frame in the vicinity of the designated frame, thereby making it possible to the moving direction based on the generated motion vector.

A first image-capturing apparatus of the present invention includes: image-capturing means for outputting a subject image captured by an image-capturing device including a predetermined number of pixels, the pixels having a time integrating function, as image data formed of a predetermined number of pixel data; area specifying means for specifying, in correspondence with the image data, a mixed area in which foreground object components forming a foreground object and background object components forming a background object are mixed and a non-mixed area formed of a foreground area consisting of only the foreground object components and a background area consisting of only the background object components; and mixture-ratio estimating means for estimating, based on the ratio of the width of the mixed area in a predetermined direction with respect to the moving direction of the foreground object component, the width of the mixed area being specified by the area information, to the distance from the position of a designated pixel to the edge of the mixed area in the predetermined direction, a mixture ratio indicating the ratio between the foreground object components and the background object components of the designated pixel.

The image-capturing apparatus may further include motion-vector detection means for detecting a motion vector of the foreground object. The mixture-ratio estimating means may detect the width of the mixed area and the distance from the position of the designated pixel to the edge of the mixed area in the moving direction of the motion vector, and may estimate the mixture ratio based on the ratio of the width of the mixed area to the distance from the position of the designated pixel to the edge of the mixed area.

The image-capturing apparatus may further include moving-direction detection means for detecting the moving direction of the foreground object. The mixture-ratio estimating means may detect the width of the mixed area and the distance from the position of the designated pixel to the edge of the mixed area in the moving direction, and may estimate the mixture ratio based on the ratio of the width of the mixed area to the distance from the position of the designated pixel to the edge of the mixed area.

The moving-direction detection means may include motion-vector generating means for generating a motion vector based on the area information and the position of the mixed area in a designated frame and the position of the mixed area in a frame in the vicinity of the designated frame, thereby making it possible to detect the moving direction based on the generated motion vector.

A second image processing apparatus of the present invention includes: area specifying means for outputting area information used for specifying, in correspondence with image data, a mixed area in which foreground object components forming a foreground object and background object components forming a background object are mixed; and mixture-ratio estimating means for estimating a mixture ratio indicating the ratio of the foreground object components and the background object components in the mixed area based on the area information and the moving direction of the foreground object by assuming that the mixture ratio changes substantially linearly with respect to the position of the pixel.

The mixture-ratio estimating means may estimate, based on the position on a segment whose one end is positioned at a foreground area consisting of only the foreground object components and the other end is positioned at a background area consisting of only the background object components, the segment traversing the mixed area, the mixture ratio of the pixel corresponding to the position on the segment.

The mixture-ratio estimating means may estimate the mixture ratio of the pixel corresponding to the position on the segment based on the position on the segment parallel to the moving direction of the foreground object.

The mixture-ratio estimating means may estimate the mixture ratio of the pixel corresponding to the position on the segment based on the position on the segment obliquely intersecting with the moving direction of the foreground object.

A second image processing method of the present invention includes: an area specifying step of outputting area information used for specifying, in correspondence with image data, a mixed area in which foreground object components forming a foreground object and background object components forming a background object are mixed; and a mixture-ratio estimating step of estimating a mixture ratio indicating the ratio of the foreground object components and the background object components in the mixed area based on the area information and the moving direction of the foreground object by assuming that the mixture ratio changes substantially linearly with respect to the position of the pixel.

In the mixture-ratio estimating step, based on the position on a segment whose one end is positioned at a foreground area consisting of only the foreground object components and the other end is positioned at a background area consisting of only the background object components, the segment traversing the mixed area, the mixture ratio of the pixel corresponding to the position on the segment may be estimated.

In the mixture-ratio estimating step, the mixture ratio of the pixel corresponding to the position on the segment may be estimated based on the position on the segment parallel to the moving direction of the foreground object.

In the mixture-ratio estimating step, the mixture ratio of the pixel corresponding to the position on the segment may be estimated based on the position on the segment obliquely intersecting with the moving direction of the foreground object.

A program of a second recording medium of the present invention includes: an area specifying step of outputting area information used for specifying, in correspondence with image data, a mixed area in which foreground object components forming a foreground object and background object components forming a background object are mixed; and a mixture-ratio estimating step of estimating a mixture ratio indicating the ratio of the foreground object components and the background object components in the mixed area based on the area information and a moving direction of the foreground object by assuming that the mixture ratio changes substantially linearly with respect to a position of the pixel.

In the mixture-ratio estimating step, based on the position on a segment whose one end is positioned at a foreground area consisting of only the foreground object components and the other end is positioned at a background area consisting of only the background object components, the segment traversing the mixed area, the mixture ratio of the pixel corresponding to the position on the segment may be estimated.

In the mixture-ratio estimating step, the mixture ratio of the pixel corresponding to the position on the segment may be estimated based on the position on the segment parallel to the moving direction of the foreground object.

In the mixture-ratio estimating step, the mixture ratio of the pixel corresponding to the position on the segment may be estimated based on the position on the segment obliquely intersecting with the moving direction of the foreground object.

A second program of the present invention allows a computer to execute: an area specifying step of outputting area information used for specifying, in correspondence with image data, a mixed area in which foreground object components forming a foreground object and background object components forming a background object are mixed; and a mixture-ratio estimating step of estimating a mixture ratio indicating the ratio of the foreground object components and the background object components in the mixed area based on the area information and the moving direction of the foreground object by assuming that the mixture ratio changes substantially linearly with respect to a position of the pixel.

In the mixture-ratio estimating step, based on the position on a segment whose one end is positioned at a foreground area consisting of only the foreground object components and the other end is positioned at a background area consisting of only the background object components, the segment traversing the mixed area, the mixture ratio of the pixel corresponding to the position on the segment may be estimated.

In the mixture-ratio estimating step, the mixture ratio of the pixel corresponding to the position on the segment may be estimated based on the position on the segment parallel to the moving direction of the foreground object.

In the mixture-ratio estimating step, the mixture ratio of the pixel corresponding to the position on the segment may be estimated based on the position on the segment obliquely intersecting with the moving direction of the foreground object.

A second image-capturing apparatus of the present invention includes: image-capturing means for outputting a subject image captured by an image-capturing device including a predetermined number of pixels, the pixels having a time integrating function, as image data formed of a predetermined number of pixel data; area specifying means for outputting area information used for specifying, in correspondence with the image data, a mixed area in which foreground object components forming a foreground object and background object components forming a background object are mixed; and mixture-ratio estimating means for estimating a mixture ratio indicating the ratio of the foreground object components and the background object components in the mixed area based on the area information and the moving direction of the foreground object by assuming that the mixture ratio changes substantially linearly with respect to a position of the pixel.

The mixture-ratio estimating means may estimate, based on the position on a segment whose one end is positioned at a foreground area consisting of only the foreground object components and the other end is positioned at a background area consisting of only the background object components, the segment traversing the mixed area, the mixture ratio of the pixel corresponding to the position on the segment.

The mixture-ratio estimating means may estimate the mixture ratio of the pixel corresponding to the position on the segment based on the position on the segment parallel to the moving direction of the foreground object.

The mixture-ratio estimating means may estimate the mixture ratio of the pixel corresponding to the position on the segment based on the position on the segment obliquely intersecting with the moving direction of the foreground object.

In correspondence with image data, a mixed area in which foreground object components forming a foreground object and background object components forming a background object are mixed and a non-mixed area formed of a foreground area consisting of only the foreground object components and a background area consisting of only the background object components are specified. Based on the ratio of the width of the mixed area in a predetermined direction with respect to the moving direction of the foreground object component, the width of the mixed area being specified by the area information, to the distance from the position of a designated pixel to the edge of the mixed area in the predetermined direction, a mixture ratio indicating the ratio between the foreground object components and the background object components of the designated pixel is estimated.

Area information used for specifying, in correspondence with image data, a mixed area in which foreground object components forming a foreground object and background object components forming a background object are mixed is output. A mixture ratio indicating the ratio of the foreground object components and the background object components in the mixed area is estimated based on the area information and the moving direction of the foreground object by assuming that the mixture ratio changes substantially linearly with respect to the position of the pixel.

With this arrangement, the mixture state in an image can be detected.

BRIEF DESCRIPTION OF THE DRAWINGS

FIG. 3 illustrates the image capturing performed by a sensor.

FIG. 9 illustrates a model in which pixel values are expanded in the time direction and the period corresponding to the shutter time is divided.

FIG. 10 illustrates a model in which pixel values are expanded in the time direction and the period corresponding to the shutter time is divided.

FIG. 25 illustrates the conditions for determining the area.

FIG. 33A illustrates the calculation of a correlation value.

FIG. 33B illustrates the calculation of a correlation value.

FIG. 34A illustrates the calculation of a correlation value.

FIG. 34B illustrates the calculation of a correlation value.

FIG. 37 illustrates determinations made by an area determining portion 342.

FIG. 57A illustrates an input image, a foreground component image, and a background component image.

FIG. 62A illustrates an example of a separated foreground component image.

FIG. 62B illustrates an example of a separated background component image.

FIG. 66 illustrates block matching of a motion-vector detector 721.

FIG. 74 is a flowchart illustrating the foreground/background separation processing.

BEST MODE FOR CARRYING OUT THE INVENTION

Figure 1:
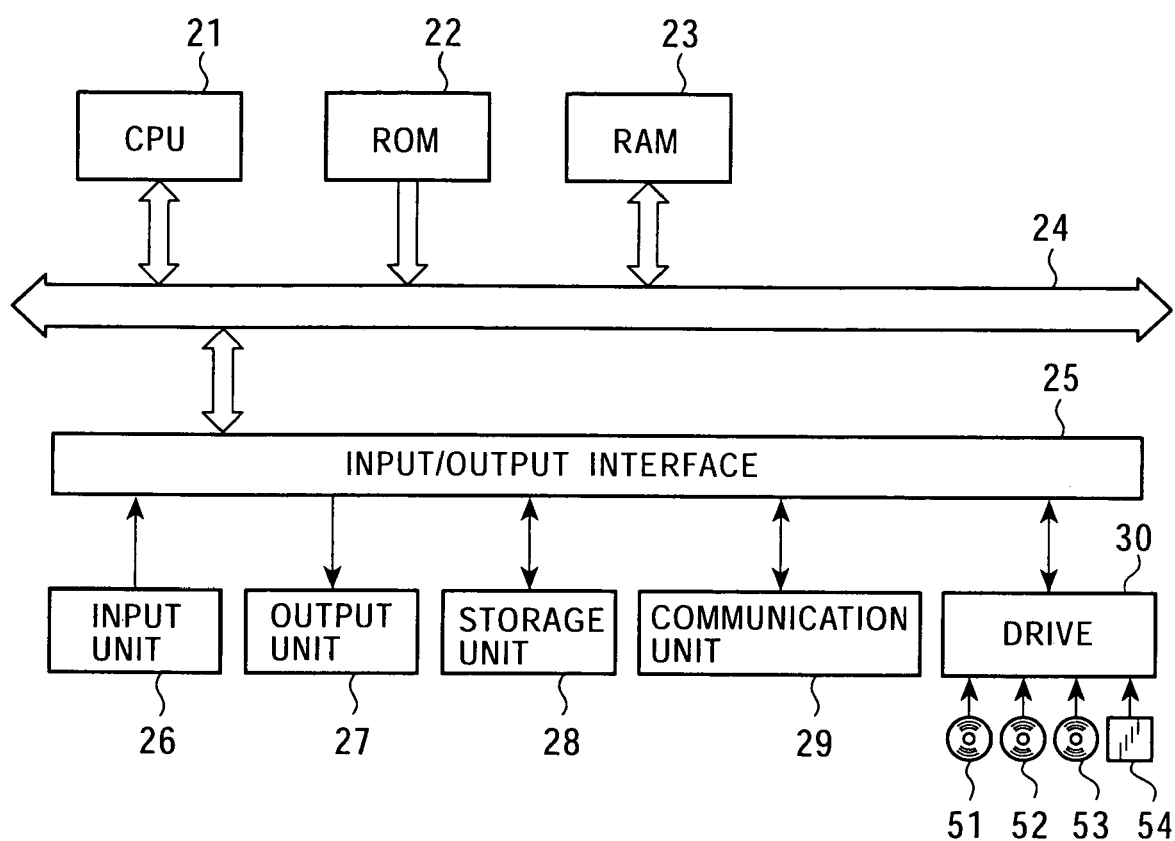
FIG. 1 illustrates an embodiment of an image processing apparatus according to the present invention.

FIG. 1 illustrates an embodiment of an image processing apparatus according to the present invention. A CPU (Central Processing Unit) 21 executes various types of processing according to programs stored in a ROM (Read Only Memory) 22 or in a storage unit 28. Programs executed by the CPU 21 and data are stored in a RAM (Random Access Memory) 23 as required. The CPU 21, the ROM 22, and the RAM 23 are connected to each other by a bus 24.

An input/output interface 25 is also connected to the CPU 21 via the bus 24. An input unit 26, which is formed of a keyboard, a mouse, a microphone, and so on, and an output unit 27, which is formed of a display, a speaker, and so on, are connected to the input/output interface 25. The CPU 21 executes various types of processing in response to a command input from the input unit 26. The CPU 21 then outputs an image or sound obtained as a result of the processing to the output unit 27.

The storage unit 28 connected to the input/output interface 25 is formed of, for example, a hard disk, and stores programs executed by the CPU 21 and various types of data. A communication unit 29 communicates with an external device via the Internet or another network. In this example, the communication unit 29 serves as an obtaining unit for obtaining an output of a sensor.

Alternatively, a program may be obtained via the communication unit 29 and stored in the storage unit 28.

A drive 30 connected to the input/output interface 25 drives a magnetic disk 51, an optical disc 52, a magneto-optical disk 53, a semiconductor memory 54, or the like, when such a recording medium is attached to the drive 30, and obtains a program or data stored in the corresponding medium. The obtained program or data is transferred to the storage unit 28 and stored therein if necessary.

Figure 2:
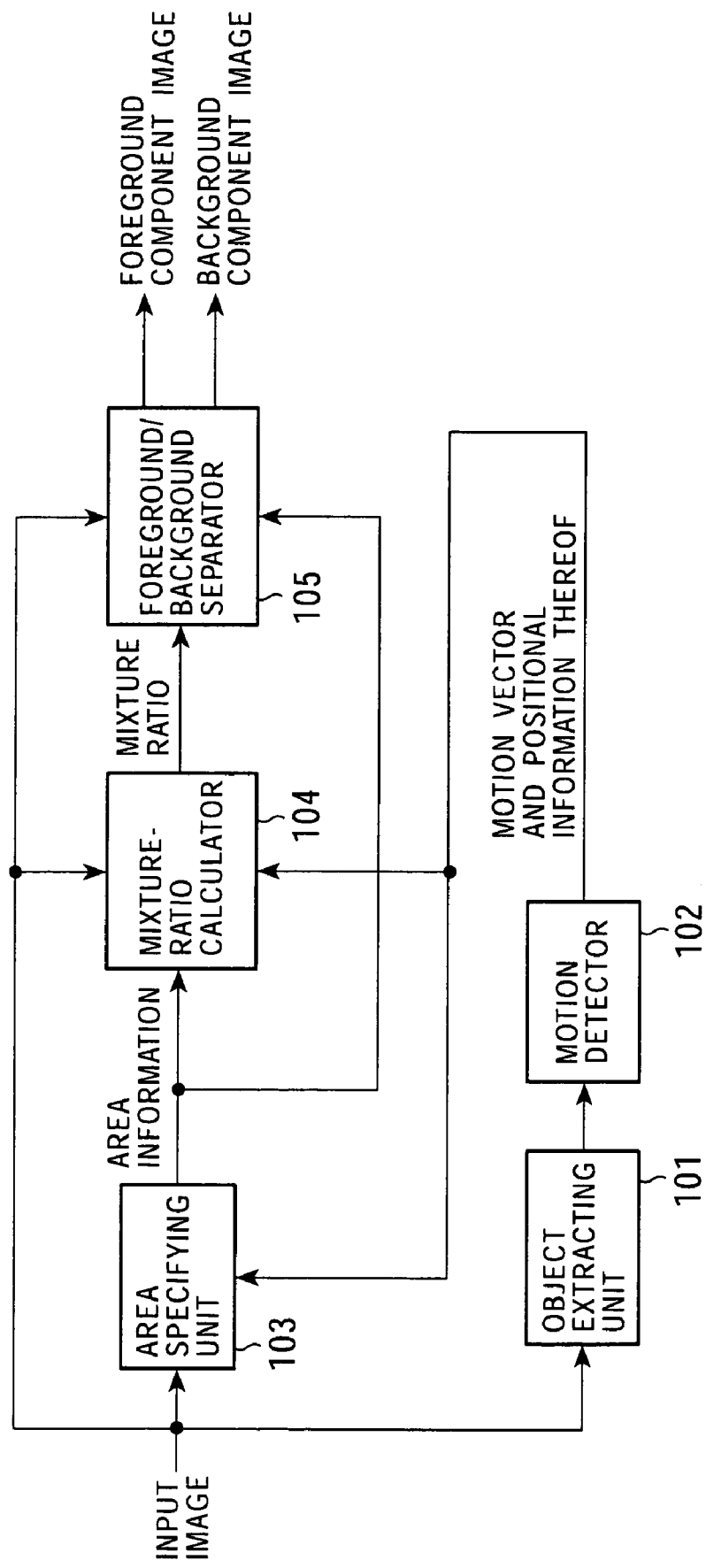
FIG. 2 is a block diagram illustrating the image processing apparatus.

FIG. 2 is a block diagram illustrating the image processing apparatus.

It does not matter whether the individual functions of the image processing apparatus are implemented by hardware or software. That is, the block diagrams of this specification may be hardware block diagrams or software functional block diagrams.

In this specification, an image to be captured corresponding to an object in the real world is referred to as an image object.

An input image supplied to the image processing apparatus is supplied to an object extracting unit 101, an area specifying unit 103, and a foreground/background separator 105.

The object extracting unit 101 extracts a rough image object corresponding to a foreground object contained in the input image, and supplies the extracted image object to a motion detector 102. The object extracting unit 101 detects, for example, an outline of the foreground image object contained in the input image so as to extract a rough image object corresponding to the foreground object.

The object extracting unit 101 extracts a rough image object corresponding to a background object contained in the input image, and supplies the extracted image object to the motion detector 102. The object extracting unit 101 extracts a rough image object corresponding to the background object from, for example, the difference between the input image and the extracted image object corresponding to the foreground object.

Alternatively, for example, the object extracting unit 101 may extract the rough image object corresponding to the foreground object and the rough image object corresponding to the background object from the difference between the background image stored in a built-in background memory and the input image.

The motion detector 102 calculates a motion vector of the roughly extracted image object corresponding to the foreground object according to a technique, such as block matching, gradient, phase correlation, or pel-recursive technique, and supplies the calculated motion vector and the motion-vector positional information (which is information for specifying the positions of the pixels corresponding to the motion vector) to the area specifying unit 103 and the mixture-ratio calculator 104.

The motion vector output from the motion detector 102 contains information corresponding to the amount of movement v.

The motion detector 102 may output the motion vector of each image object, together with the pixel positional information for specifying the pixels for the image object, to the area specifying unit 103 and the mixture-ratio calculator 104.

The amount of movement v is a value indicating a positional change in an image corresponding to a moving object in units of the pixel pitch. For example, if an object image corresponding to a foreground is moving such that it is displayed at a position four pixels away from a reference frame when it is positioned in the subsequent frame, the amount of movement v of the object image corresponding to the foreground is 4.

The area specifying unit 103 determines to which of a foreground area, a background area, or a mixed area each pixel of the input image belongs, and supplies information indicating to which area each pixel belongs (hereinafter referred to as "area information") to the mixture-ratio calculator 104 and the foreground/background separator 105.

The mixture-ratio calculator 104 calculates the mixture ratio corresponding to the pixels contained in a mixed area (hereinafter referred to as the "mixture ratio $\alpha$") based on the motion vector and the positional information thereof supplied from the motion detector 102, and the area information supplied from the area specifying unit 103, and supplies the calculated mixture ratio to the foreground/background separator 105.

The mixture ratio $\alpha$ is a value indicating the ratio of the image components corresponding to the background object (hereinafter also be referred to as "background components") to the pixel value as expressed by equation (3), which is shown below.

The foreground/background separator 105 separates the input image into a foreground component image formed of only the image components corresponding to the foreground object (hereinafter also be referred to as "foreground components") and a background component image formed of only the background components based on the area information supplied from the area specifying unit 103 and the mixture ratio $\alpha$ supplied from the mixture-ratio calculator 104, and outputs the foreground component image and the background component image.

A more precise foreground and background can be obtained compared to a known method in which only a foreground and a background are specified without considering the mixed area.

An input image supplied to the image processing apparatus is discussed below with reference to FIGS. 3 through 18.

FIG. 3 illustrates image capturing performed by a sensor. The sensor is formed of, for example, a CCD (Charge-Coupled Device) video camera provided with a CCD area sensor, which is a solid-state image-capturing device. An object 111 corresponding to a foreground in the real world moves, for example, horizontally from the left to the right, between an object 112 corresponding to a background and the sensor.

The sensor captures the image of the object 111 corresponding to the foreground together with the image of the object 112 corresponding to the background. The sensor outputs the captured image in units of frames. For example, the sensor outputs an image having 30 frames per second. The exposure time of the sensor can be 1/30 second. The exposure time is a period from when the sensor starts converting input light into electrical charge until when the conversion from the input light to the electrical charge is finished. The exposure time is also referred to as a "shutter time".

Figure 4:
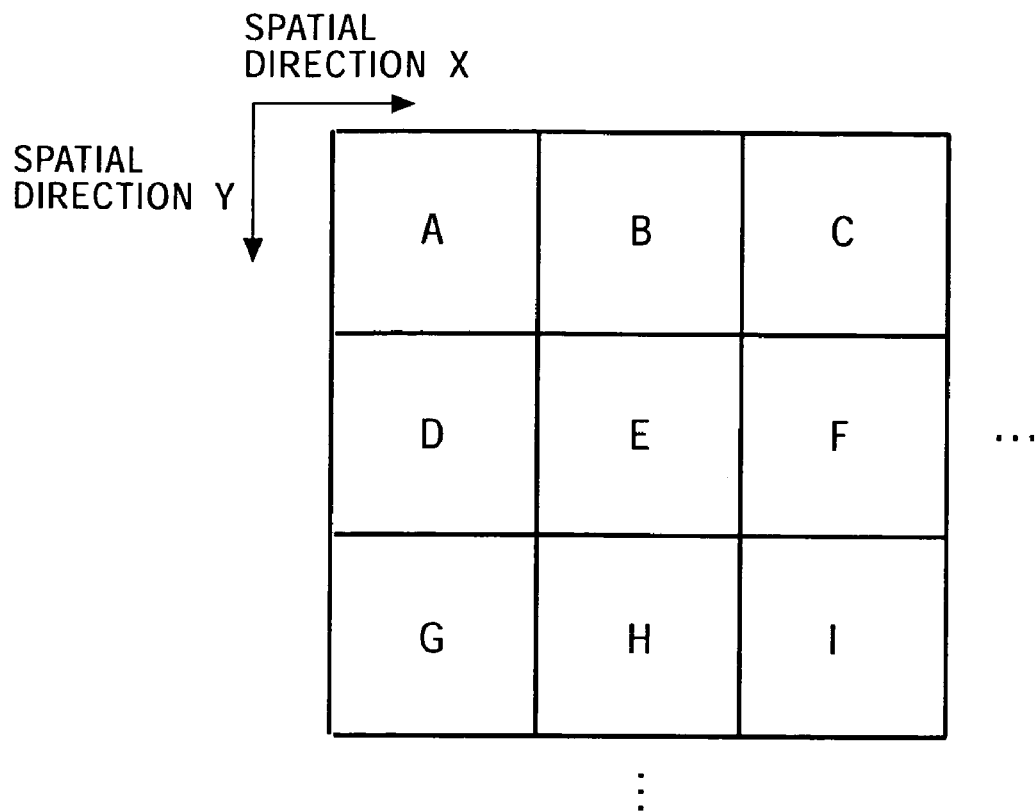
FIG. 4 illustrates the arrangement of pixels.

FIG. 4 illustrates the arrangement of pixels. In FIG. 4, A through I indicate the individual pixels. The pixels are disposed on a plane of a corresponding image. One detection device corresponding to each pixel is disposed on the sensor. When the sensor performs image capturing, each detection device outputs a pixel value of the corresponding pixel forming the image. For example, the position of the detection device in the X direction corresponds to the horizontal direction on the image, while the position of the detection device in the Y direction corresponds to the vertical direction on the image.

Figure 5:
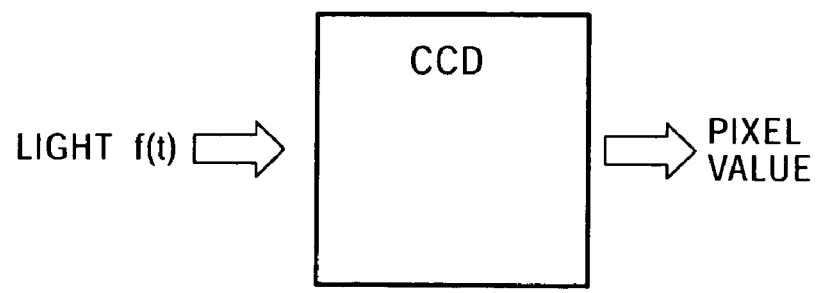
FIG. 5 illustrates the operation of a detection device.

As shown in FIG. 5, the detection device, which is, for example, a CCD, converts input light into electrical charge during a period corresponding to a shutter time, and stores the converted electrical charge. The amount of charge is almost proportional to the intensity of the input light and the period for which the light is input. The detection device sequentially adds the electrical charge converted from the input light to the stored electrical charge during the period corresponding to the shutter time. That is, the detection device integrates the input light during the period corresponding to the shutter time and stores the electrical charge corresponding to the amount of integrated light. It can be considered that the detection device has an integrating function with respect to time.

The electrical charge stored in the detection device is converted into a voltage value by a circuit (not shown), and the voltage value is further converted into a pixel value, such as digital data, and is output. Accordingly, each pixel value output from the sensor is a value projected on a linear space, which is a result of integrating a certain three-dimensional portion of the object corresponding to the foreground or the background with respect to the shutter time.

The image processing apparatus extracts significant information embedded in the output signal, for example, the mixture ratio $\alpha$, by the storage operation of the sensor. The image processing apparatus adjusts the amount of distortion, for example, the amount of motion blur, caused by the mixture of the foreground image object itself. The image processing apparatus also adjusts the amount of distortion caused by the mixture of the foreground image object and the background image object.

Figure 6A:
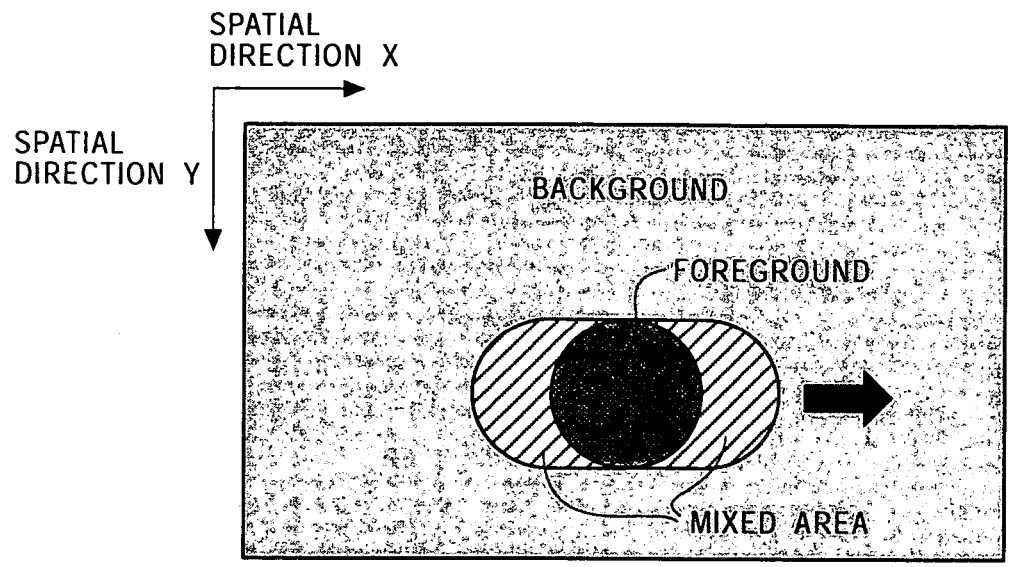
FIG. 6A illustrates an image obtained by image-capturing an object corresponding to a moving foreground and an object corresponding to a stationary background.
Figure 6B:
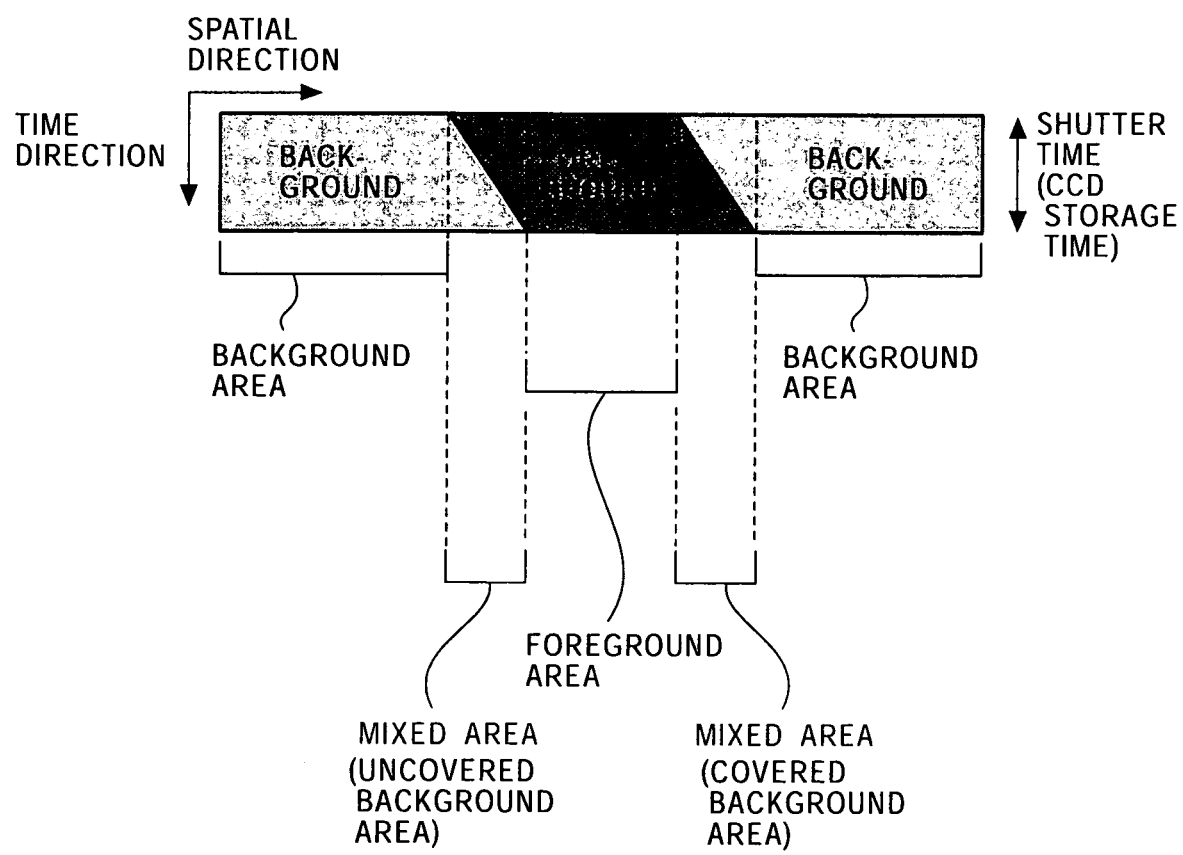
FIG. 6B illustrates a model of an image obtained by image-capturing an object corresponding to a moving foreground and an object corresponding to a stationary background.

FIG. 6A illustrates an image obtained by capturing a moving object corresponding to a foreground and a stationary object corresponding to a background. FIG. 6B illustrates an image obtained by capturing a moving object corresponding to a foreground and a stationary object corresponding to a background.

FIG. 6A illustrates an image obtained by capturing a moving object corresponding to a foreground and a stationary object corresponding to a background. In the example shown in FIG. 6A, the object corresponding to the foreground is moving horizontally from the left to the right with respect to the screen.

FIG. 6B illustrates a model obtained by expanding pixel values corresponding to one line of the image shown in FIG. 6A in the time direction. The horizontal direction shown in FIG. 6B corresponds to the spatial direction X in FIG. 6A.

The values of the pixels in the background area are formed only from the background components, that is, the image components corresponding to the background object. The values of the pixels in the foreground area are formed only from the foreground components, that is, the image components corresponding to the foreground object.

The values of the pixels of the mixed area are formed from the background components and the foreground components. Since the values of the pixels in the mixed area are formed from the background components and the foreground components, it may be referred to as a "distortion area". The mixed area is further classified into a covered background area and an uncovered background area.

The covered background area is a mixed area at a position corresponding to the leading end in the direction in which the foreground object is moving, where the background components are gradually covered with the foreground over time.

In contrast, the uncovered background area is a mixed area corresponding to the trailing end in the direction in which the foreground object is moving, where the background components gradually appear over time.

As discussed above, the image containing the foreground area, the background area, or the covered background area or the uncovered background area is input into the area specifying unit 103, the mixture-ratio calculator 104, and the foreground/background separator 105 as the input image.

Figures 7, 8:
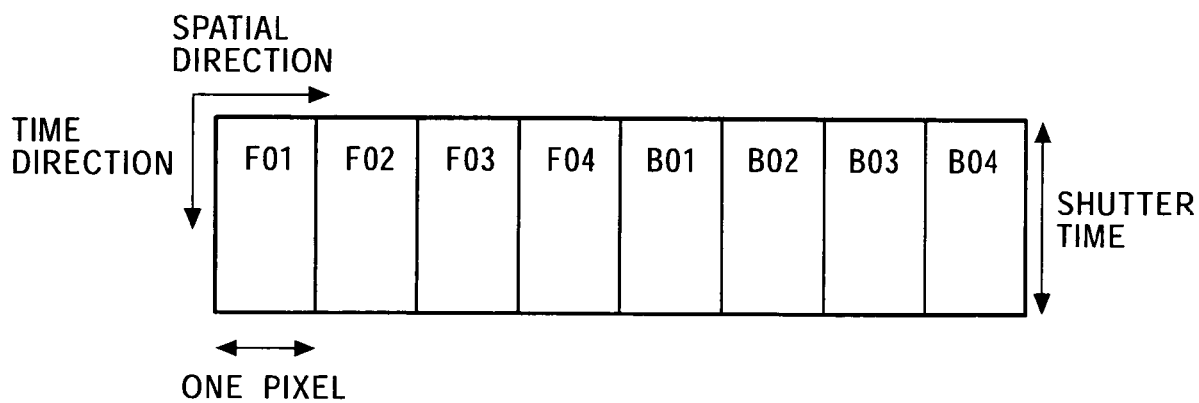
FIG. 7 illustrates a background area, a foreground area, a mixed area, a covered background area, and an uncovered background area.
FIG. 8 illustrates a model obtained by expanding in the time direction the pixel values of pixels aligned side-by-side in an image obtained by image-capturing an object corresponding to a stationary foreground and an the object corresponding to a stationary background.

FIG. 7 illustrates the background area, the foreground area, the mixed area, the covered background area, and the uncovered background area discussed above. In the areas corresponding to the image shown in FIG. 6A, the background area is a stationary portion, the foreground area is a moving portion, the covered background area of the mixed area is a portion that changes from the background to the foreground, and the uncovered background area of the mixed area is a portion that changes from the foreground to the background.

FIG. 8 illustrates a model obtained by expanding in the time direction the pixel values of the pixels aligned side-by-side in the image obtained by capturing the image of the object corresponding to the stationary foreground and the image of the object corresponding to the stationary background. For example, as the pixels aligned side-by-side, pixels arranged in one line on the screen can be selected.

The pixel values indicated by F01 through F04 shown in FIG. 8 are values of the pixels corresponding to the object of the stationary foreground. The pixel values indicated by B01 through B04 shown in FIG. 8 are values of the pixels corresponding to the object of the stationary background.

Time elapses from the top to the bottom in FIG. 8 in the vertical direction in FIG. 8. The position at the top side of the rectangle in FIG. 8 corresponds to the time at which the sensor starts converting input light into electrical charge, and the position at the bottom side of the rectangle in FIG. 8 corresponds to the time at which the conversion from the input light into the electrical charge is finished. That is, the distance from the top side to the bottom side of the rectangle in FIG. 8 corresponds to the shutter time.

The pixels shown in FIG. 8 are described below assuming that, for example, the shutter time is equal to the frame size.

The horizontal direction in FIG. 8 corresponds to the spatial direction X in FIG. 6A. More specifically, in the example shown in FIG. 8, the distance from the left side of the rectangle indicated by "F01" in FIG. 8 to the right side of the rectangle indicated by "B04" is eight times the pixel pitch, i.e., eight consecutive pixels.

When the foreground object and the background object are stationary, the light input into the sensor does not change during the period corresponding to the shutter time.

The period corresponding to the shutter time is divided into two or more portions of equal periods. For example, if the number of virtual divided portions is 4, the model shown in FIG. 8 can be represented by the model shown in FIG. 9. The number of virtual divided portions can be set according to the amount of movement v of the object corresponding to the foreground within the shutter time. For example, the number of virtual divided portions is set to 4 when the amount of movement v is 4, and the period corresponding to the shutter time is divided into four portions.

The uppermost line in FIG. 9 corresponds to the first divided period from when the shutter has opened. The second line in FIG. 9 corresponds to the second divided period from when the shutter has opened. The third line in FIG. 9 corresponds to the third divided period from when the shutter has opened. The fourth line in FIG. 9 corresponds to the fourth divided period from when the shutter has opened.

The shutter time divided in accordance with the amount of movement v is also hereinafter referred to as the "shutter time/v".

When the object corresponding to the foreground is stationary, the light input into the sensor does not change, and thus, the foreground component F01/v is equal to the value obtained by dividing the pixel value F01 by the number of virtual divided portions. Similarly, when the object corresponding to the foreground is stationary, the foreground component F02/v is equal to the value obtained by dividing the pixel value F02 by the number of virtual divided portions, the foreground component F03/v is equal to the value obtained by dividing the pixel value F03 by the number of virtual divided portions, and the foreground component F04/v is equal to the value obtained by dividing the pixel value F04 by the number of virtual divided portions.

When the object corresponding to the background is stationary, the light input into the sensor does not change, and thus, the background component B01/v is equal to the value obtained by dividing the pixel value B01 by the number of virtual divided portions. Similarly, when the object corresponding to the background is stationary, the background component B02/v is equal to the value obtained by dividing the pixel value B02 by the number of virtual divided portions, the background component B03/v is equal to the value obtained by dividing the pixel value B03 by the number of virtual divided portions, and the background component B04/v is equal to the value obtained by dividing the pixel value B04 by the number of virtual divided portions.

More specifically, when the object corresponding to the foreground is stationary, the light corresponding to the foreground object input into the sensor does not change during the period corresponding to the shutter time. Accordingly, the foreground component F01/v corresponding to the first portion of the shutter time/v from when the shutter has opened, the foreground component F01/v corresponding to the second portion of the shutter time/v from when the shutter has opened, the foreground component F01/v corresponding to the third portion of the shutter time/v from when the shutter has opened, and the foreground component F01/v corresponding to the fourth portion of the shutter time/v from when the shutter has opened become the same value. The same applies to F02/v through F04/v, as in the case of F01/v.

When the object corresponding to the background is stationary, the light corresponding to the background object input into the sensor does not change during the period corresponding to the shutter time. Accordingly, the background component B01/v corresponding to the first portion of the shutter time/v from when the shutter has opened, the background component B01/v corresponding to the second portion of the shutter time/v from when the shutter has opened, the background component B01/v corresponding to the third portion of the shutter time/v from when the shutter has opened, and the background component B01/v corresponding to the fourth portion of the shutter time/v from when the shutter has opened become the same value. The same applies to B02/v through B04/v.

A description is given of the case in which the object corresponding to the foreground is moving and the object corresponding to the background is stationary.

FIG. 10 illustrates a model obtained by expanding in the time direction the pixel values of the pixels in one line, including a covered background area, when the object corresponding to the foreground is moving to the right in FIG. 10. In FIG. 10, the amount of movement v is 4. Since one frame is a short period, it can be assumed that the object corresponding to the foreground is a rigid body moving with constant velocity. In FIG. 10, the object image corresponding to the foreground is moving such that it is positioned four pixels to the right with respect to a reference frame when it is displayed in the subsequent frame.

In FIG. 10, the pixels from the leftmost pixel to the fourth pixel belong to the foreground area. In FIG. 10, the pixels from the fifth pixel to the seventh pixel from the left belong to the mixed area, which is the covered background area. In FIG. 10, the rightmost pixel belongs to the background area.

The object corresponding to the foreground is moving such that it gradually covers the object corresponding to the background over time. Accordingly, the components contained in the pixel values of the pixels belonging to the covered background area change from the background components to the foreground components at a certain time during the period corresponding to the shutter time.

For example, the pixel value M surrounded by the thick frame in FIG. 10 is expressed by equation (1) below.

$$M = B02/v + B02/v + F07/v + F06/v \tag{1}$$

For example, the fifth pixel from the left contains a background component corresponding to one portion of the shutter time/v and foreground components corresponding to three portions of the shutter time/v, and thus, the mixture ratio $\alpha$ of the fifth pixel from the left is $1/4$. The sixth pixel from the left contains background components corresponding to two portions of the shutter time/v and foreground components corresponding to two portions of the shutter time/v, and thus, the mixture ratio $\alpha$ of the sixth pixel from the left is $1/2$. The seventh pixel from the left contains background components corresponding to three portions of the shutter time/v and a foreground component corresponding to one portion of the shutter time/v, and thus, the mixture ratio $\alpha$ of the fifth pixel from the left is $3/4$.

It can be assumed that the object corresponding to the foreground is a rigid body, and the foreground object is moving with constant velocity such that it is displayed four pixels to the right in the subsequent frame. Accordingly, for example, the foreground component F07/v of the fourth pixel from the left in FIG. 10 corresponding to the first portion of the shutter time/v from when the shutter has opened is equal to the foreground component of the fifth pixel from the left in FIG. 10 corresponding to the second portion of the shutter time/v from when the shutter has opened. Similarly, the foreground component F07/v is equal to the foreground component of the sixth pixel from the left in FIG. 10 corresponding to the third portion of the shutter time/v from when the shutter has opened, and the foreground component of the seventh pixel from the left in FIG. 10 corresponding to the fourth portion of the shutter time/v from when the shutter has opened.

It can be assumed that the object corresponding to the foreground is a rigid body, and the foreground object is moving with constant velocity such that it is displayed four pixels to the right in the subsequent frame. Accordingly, for example, the foreground component F06/v of the third pixel from the left in FIG. 10 corresponding to the first portion of the shutter time/v from when the shutter has opened is equal to the foreground component of the fourth pixel from the left in FIG. 10 corresponding to the second portion of the shutter time/v from when the shutter has opened. Similarly, the foreground component F06/v is equal to the foreground component of the fifth pixel from the left in FIG. 10 corresponding to the third portion of the shutter time/v from when the shutter has opened, and the foreground component of the sixth pixel from the left in FIG. 10 corresponding to the fourth portion of the shutter time/v from when the shutter has opened.

It can be assumed that the object corresponding to the foreground is a rigid body, and the foreground object is moving with constant velocity such that it is displayed four pixels to the right in the subsequent frame. Accordingly, for example, the foreground component F05/v of the second pixel from the left in FIG. 10 corresponding to the first portion of the shutter time/v from when the shutter has opened is equal to the foreground component of the third pixel from the left in FIG. 10 corresponding to the second portion of the shutter time/v from when the shutter has opened. Similarly, the foreground component F05/v is equal to the foreground component of the fourth pixel from the left in FIG. 10 corresponding to the third portion of the shutter time/v from when the shutter has opened, and the foreground component of the fifth pixel from the left in FIG. 10 corresponding to the fourth portion of the shutter time/v from when the shutter has opened.

It can be assumed that the object corresponding to the foreground is a rigid body, and the foreground object is moving with constant velocity such that it is displayed four pixels to the right in the subsequent frame. Accordingly, for example, the foreground component F04/v of the leftmost pixel in FIG. 10 corresponding to the first portion of the shutter time/v from when the shutter has opened is equal to the foreground component of the second pixel from the left in FIG. 10 corresponding to the second portion of the shutter time/v from when the shutter has opened. Similarly, the foreground component F04/v is equal to the foreground component of the third pixel from the left in FIG. 10 corresponding to the third portion of the shutter time/v from when the shutter has opened, and the foreground component of the fourth pixel from the left in FIG. 10 corresponding to the fourth portion of the shutter time/v from when the shutter has opened.

Since the foreground area corresponding to the moving object contains motion blur as discussed above, it can also be referred to as a "distortion area".

Figure 11:
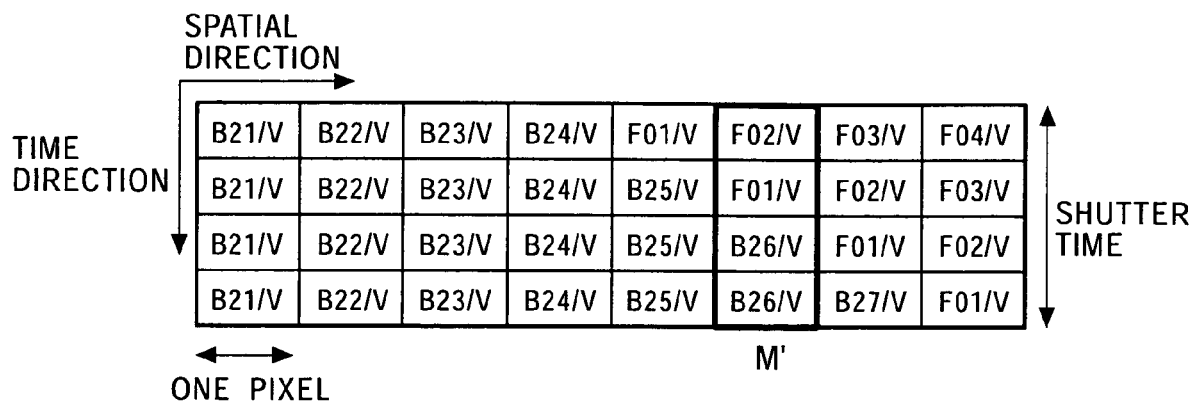
FIG. 11 illustrates a model in which pixel values are expanded in the time direction and the period corresponding to the shutter time is divided.

FIG. 11 illustrates a model obtained by expanding in the time direction the pixel values of the pixels in one line including an uncovered background area when the object corresponding to the foreground is moving to the right in FIG. 11. In FIG. 11, the amount of movement v is 4. Since one frame is a short period, it can be assumed that the object corresponding to the foreground is a rigid body moving with constant velocity. In FIG. 11, the object image corresponding to the foreground is moving to the right such that it is positioned four pixels to the right with respect to a reference frame when it is displayed in the subsequent frame.

In FIG. 11, the pixels from the leftmost pixel to the fourth pixel belong to the background area. In FIG. 11, the pixels from the fifth pixel to the seventh pixels from the left belong to the mixed area, which is an uncovered background area. In FIG. 11, the rightmost pixel belongs to the foreground area.

The object corresponding to the foreground which covers the object corresponding to the background is moving such that it is gradually removed from the object corresponding to the background over time. Accordingly, the components contained in the pixel values of the pixels belonging to the uncovered background area change from the foreground components to the background components at a certain time of the period corresponding to the shutter time.

For example, the pixel value M' surrounded by the thick frame in FIG. 11 is expressed by equation (2).

$$M' = F02/v + F01/v + B26/v + B26/v \quad (2)$$

For example, the fifth pixel from the left contains background components corresponding to three portions of the shutter time/v and a foreground component corresponding to one shutter portion of the shutter time/v, and thus, the mixture ratio α of the fifth pixel from the left is ¾. The sixth pixel from the left contains background components corresponding to two portions of the shutter time/v and foreground components corresponding to two portions of the shutter time/v, and thus, the mixture ratio α of the sixth pixel from the left is ½. The seventh pixel from the left contains a background component corresponding to one portion of the shutter time/v and foreground components corresponding to three portions of the shutter time/v, and thus, the mixture ratio α of the seventh pixel from the left is ¼.

When equations (1) and (2) are generalized, the pixel value M can be expressed by equation (3):

$$M = \alpha \cdot B + \sum_i Fi/v \quad (3)$$

where α is the mixture ratio, B indicates a pixel value of the background, and Fi/v designates a foreground component.

It can be assumed that the object corresponding to the foreground is a rigid body, which is moving with constant velocity, and the amount of movement is 4. Accordingly, for example, the foreground component F01/v of the fifth pixel from the left in FIG. 11 corresponding to the first portion of the shutter time/v from when the shutter has opened is equal to the foreground component of the sixth pixel from the left in FIG. 11 corresponding to the second portion of the shutter time/v from when the shutter has opened. Similarly, the foreground component F01/v is equal to the foreground component of the seventh pixel from the left in FIG. 11 corresponding to the third portion of the shutter time/v from when the shutter has opened, and the foreground component of the eighth pixel from the left in FIG. 11 corresponding to the fourth portion of the shutter time/v from when the shutter has opened.

It can be assumed that the object corresponding to the foreground is a rigid body, which is moving with constant velocity, and the amount of movement v is 4. Accordingly, for example, the foreground component F02/v of the sixth pixel from the left in FIG. 11 corresponding to the first portion of the shutter time/v from when the shutter has opened is equal to the foreground component of the seventh pixel from the left in FIG. 11 corresponding to the second portion of the shutter time/v from when the shutter has opened. Similarly, the foreground component F02/v is equal to the foreground component of the eighth pixel from the left in FIG. 11 corresponding to the third portion of the shutter time/v from when the shutter has opened.

It can be assumed that the object corresponding to the foreground is a rigid body, which is moving with constant velocity, and the amount of movement v is 4. Accordingly, for example, the foreground component F03/v of the seventh pixel from the left in FIG. 11 corresponding to the first portion of the shutter time/v from when the shutter has opened is equal to the foreground component of the eighth pixel from the left in FIG. 11 corresponding to the second portion of the shutter time/v from when the shutter has opened.

It has been described with reference to FIGS. 9 through 11 that the number of virtual divided portions is 4. The number of virtual divided portions corresponds to the amount of movement v. Generally, the amount of movement v corresponds to the moving speed of the object corresponding to the foreground. For example, if the object corresponding to the foreground is moving such that it is displayed four pixels to the right with respect to a certain frame when it is positioned in the subsequent frame, the amount of movement v is set to 4. The number of virtual divided portions is set to 4 in accordance with the amount of movement v. Similarly, when the object corresponding to the foreground is moving such that it is displayed six pixels to the left with respect to a certain frame when it is positioned in the subsequent frame, the amount of movement v is set to 6, and the number of virtual divided portions is set to 6.

Figure 12:
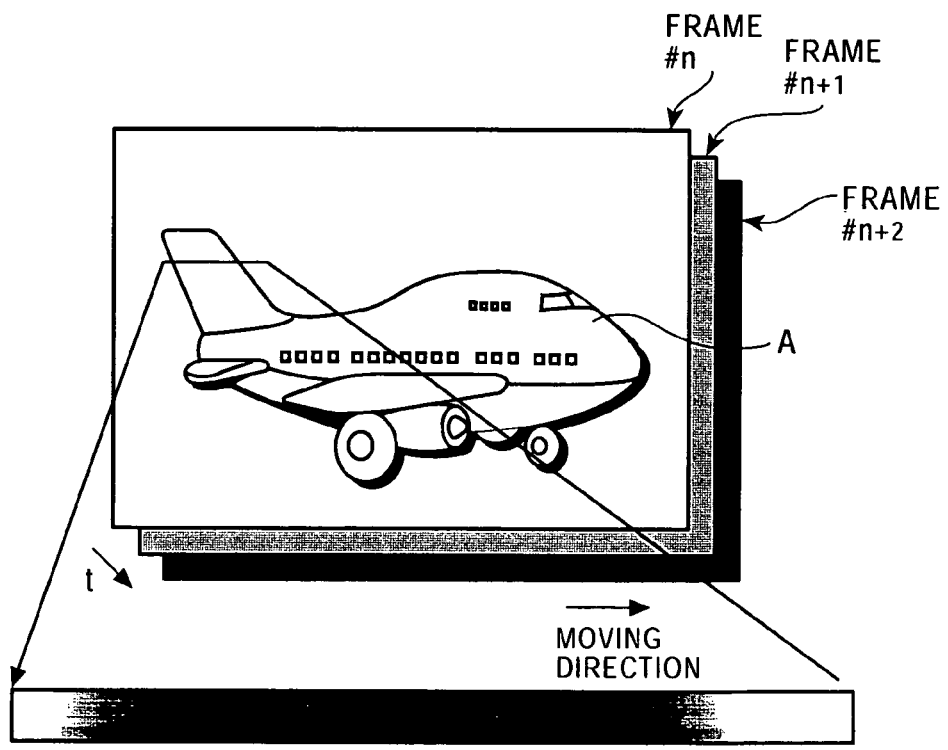
FIG. 12 illustrates an example in which pixels in a foreground area, a background area, and a mixed area are extracted.
Figure 13:
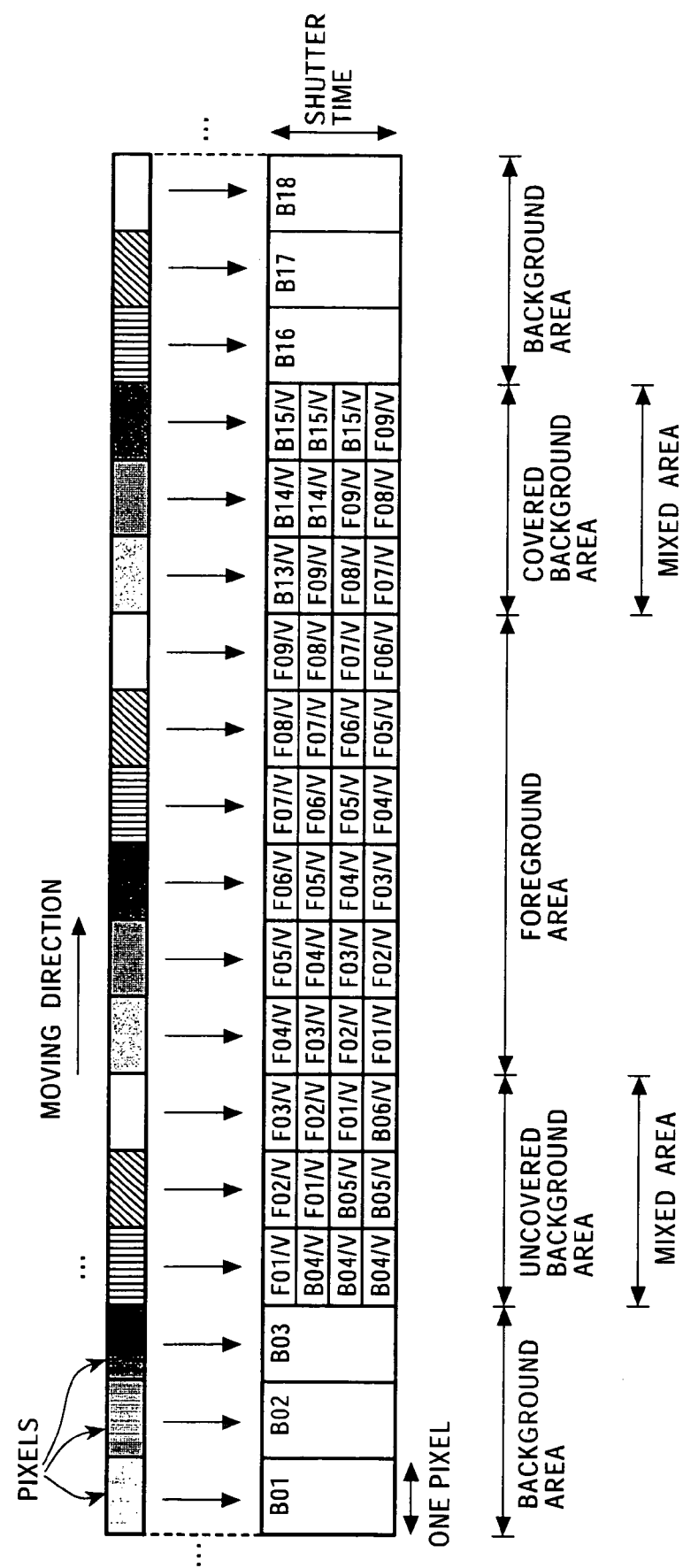
FIG. 13 illustrates the relationships between pixels and a model obtained by expanding the pixel values in the time direction.

FIGS. 12 and 13 illustrate the relationship of the foreground area, the background area, and the mixed area which consists of a covered background or an uncovered background, which are discussed above, to the foreground components and the background components corresponding to the divided periods of the shutter time.

FIG. 12 illustrates an example in which pixels in the foreground area, the background area, and the mixed area are extracted from an image containing a foreground corresponding to an object moving in front of a stationary background. In the example shown in FIG. 12, the object corresponding to the foreground indicated by A is horizontally moving with respect to the screen.

Frame #n+1 is a frame subsequent to frame #n, and frame #n+2 is a frame subsequent to frame #n+1.

Pixels in the foreground area, the background area, and the mixed area are extracted from one of frames #n through #n+2, and the amount of movement v is set to 4. A model obtained by expanding the pixel values of the extracted pixels in the time direction is shown in FIG. 13.

Since the object corresponding to the foreground is moving, the pixel values in the foreground area are formed of four different foreground components corresponding to the shutter time/v. For example, the leftmost pixel of the pixels in the foreground area shown in FIG. 13 consists of F01/v, F02/v, F03/v, and F04/v. That is, the pixels in the foreground contain motion blur.

Since the object corresponding to the background is stationary, light input into the sensor corresponding to the background during the shutter time does not change. In this case, the pixel values in the background area do not contain motion blur.

The pixel values in the mixed area consisting of a covered background area or an uncovered background area are formed of foreground components and background components.

A description is given below of a model obtained by expanding in the time direction the pixel values of the pixels which are aligned side-by-side in a plurality of frames and which are located at the same positions in the frames when the image corresponding to the object is moving. For example, when the image corresponding to the object is moving horizontally with respect to the screen, pixels aligned on the screen can be selected as the pixels aligned side-by-side.

Figure 14:
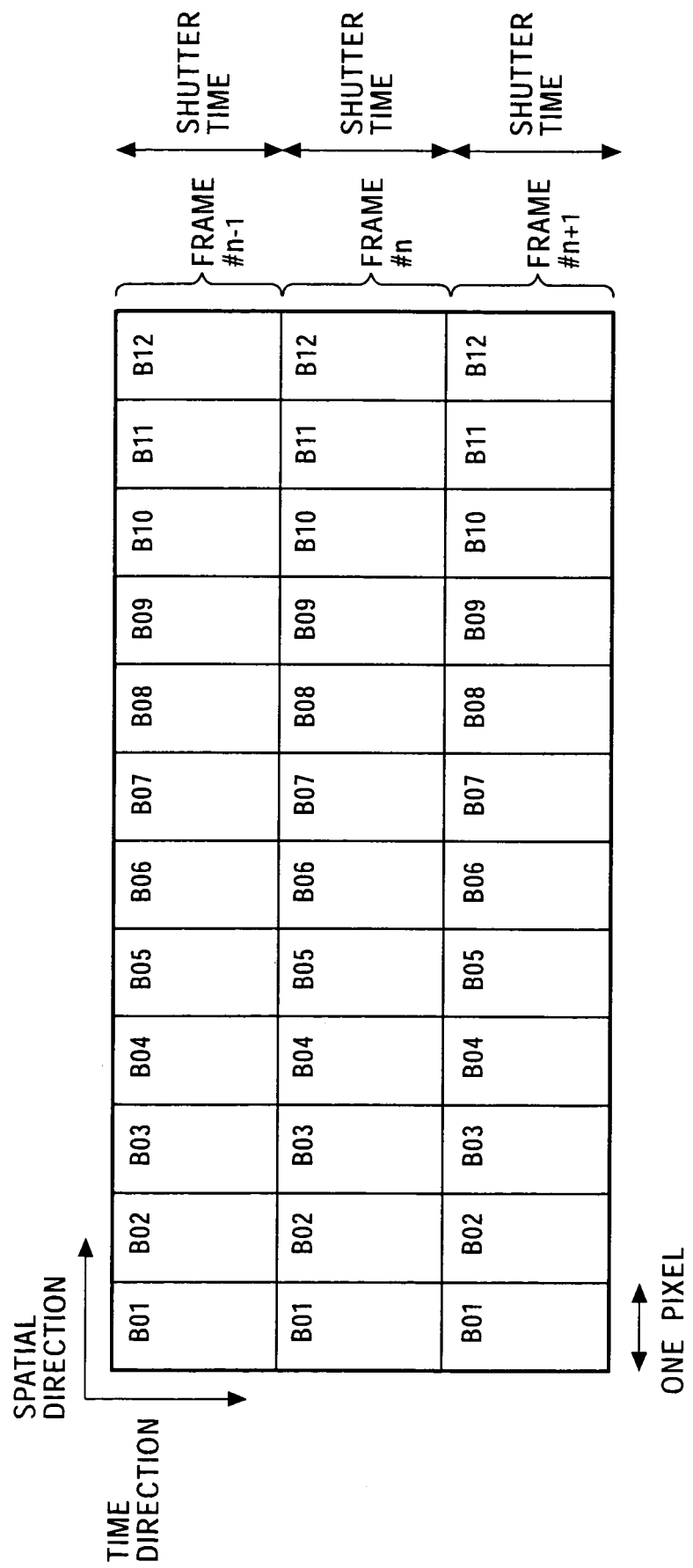
FIG. 14 illustrates a model in which pixel values are expanded in the time direction and the period corresponding to the shutter time is divided.

FIG. 14 illustrates a model obtained by expanding in the time direction the pixels which are aligned side-by-side in three frames of an image obtained by capturing an object corresponding to a stationary background and which are located at the same positions in the frames. Frame #n is the frame subsequent to frame #n−1, and frame #n+1 is the frame subsequent to frame #n. The same applies to the other frames.

The pixel values B01 through B12 shown in FIG. 14 are pixel values corresponding to the stationary background object. Since the object corresponding to the background is stationary, the pixel values of the corresponding pixels in frame #n−1 through frame #n+1 do not change. For example, the pixel in frame #n and the pixel in frame #n+1 located at the corresponding position of the pixel having the pixel value B05 in frame #n−1 have the pixel value B05.

Figure 15:
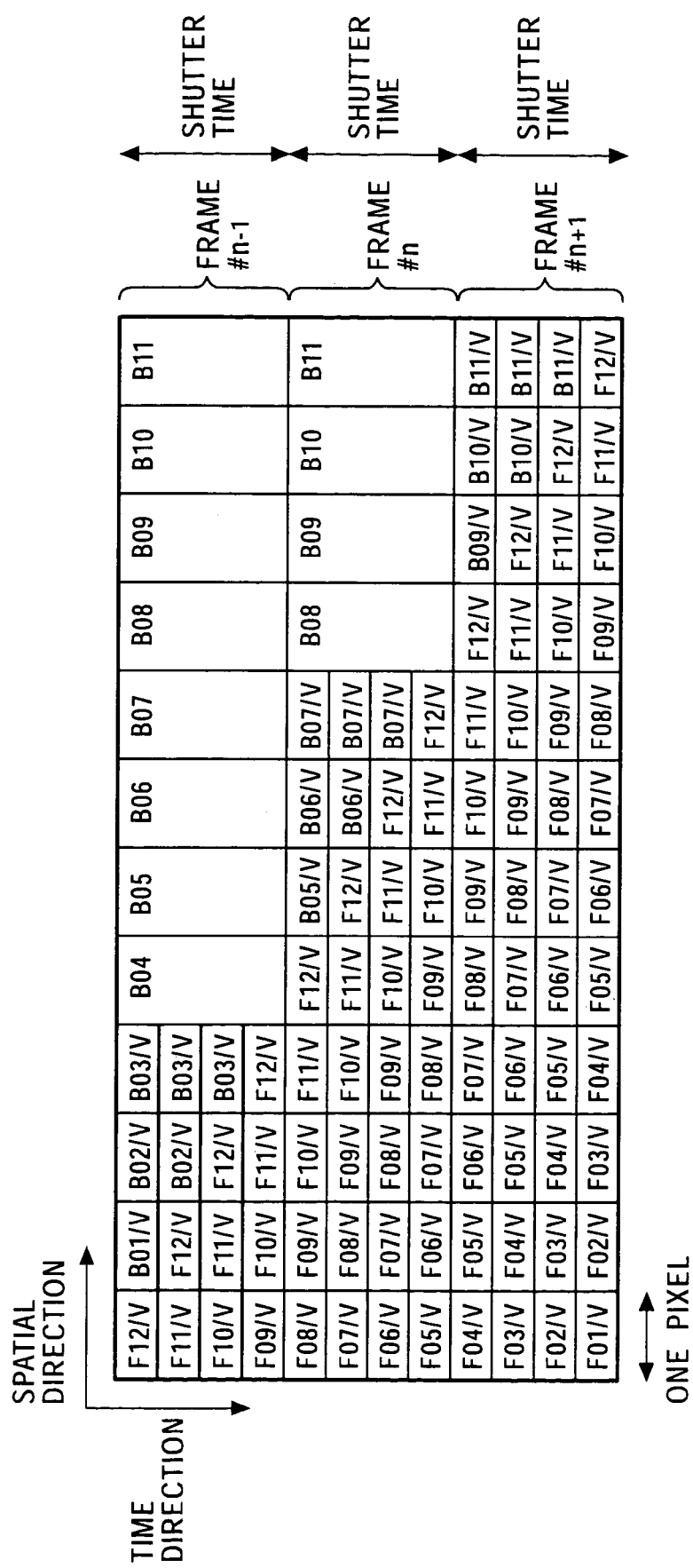
FIG. 15 illustrates a model in which pixel values are expanded in the time direction and the period corresponding to the shutter time is divided.

FIG. 15 illustrates a model obtained by expanding in the time direction the pixels which are aligned side-by-side in three frames of an image obtained by capturing an object corresponding to a foreground that is moving to the right in FIG. 15 together with an object corresponding to a stationary background and which are located at the same positions in the frames. The model shown in FIG. 15 contains a covered background area.

In FIG. 15, it can be assumed that the object corresponding to the foreground is a rigid body moving with constant velocity, and that it is moving such that it is displayed four pixels to the right in the subsequent frame. Accordingly, the amount of movement v is 4, and the number of virtual divided portions is 4.

For example, the foreground component of the leftmost pixel of frame #n−1 in FIG. 15 corresponding to the first portion of the shutter time/v from when the shutter has opened is F12/v, and the foreground component of the second pixel from the left in FIG. 15 corresponding to the second portion of the shutter time/v from when the shutter has opened is also F12/v. The foreground component of the third pixel from the left in FIG. 15 corresponding to the third portion of the shutter time/v from when the shutter has opened and the foreground component of the fourth pixel from the left in FIG. 15 corresponding to the fourth portion of the shutter time/v from when the shutter has opened are F12/v.

The foreground component of the leftmost pixel of frame #n−1 in FIG. 15 corresponding to the second portion of the shutter time/v from when the shutter has opened is F11/v. The foreground component of the second pixel from the left in FIG. 15 corresponding to the third portion of the shutter time/v from when the shutter has opened is also F11/v. The foreground component of the third pixel from the left in FIG. 15 corresponding to the fourth portion of the shutter time/v from when the shutter has opened is F11/v.

The foreground component of the leftmost pixel of frame #n−1 in FIG. 15 corresponding to the third portion of the shutter time/v from when the shutter has opened is F10/v. The foreground component of the second pixel from the left in FIG. 15 corresponding to the fourth portion of the shutter time/v from when the shutter has opened is also F10/v. The foreground component of the leftmost pixel of frame #n−1 in FIG. 15 corresponding to the fourth portion of the shutter time/v from when the shutter has opened is F09/v.

Since the object corresponding to the background is stationary, the background component of the second pixel from the left of frame #n−1 in FIG. 15 corresponding to the first portion of the shutter time/v from when the shutter has opened is B01/v. The background components of the third pixel from the left of frame #n−1 in FIG. 15 corresponding to the first and second portions of the shutter time/v from when the shutter has opened are B02/v. The background components of the fourth pixel from the left of frame #n−1 in FIG. 15 corresponding to the first through third portions of the shutter time/v from when the shutter has opened are B03/v.

In frame #n−1 in FIG. 15, the leftmost pixel from the left belongs to the foreground area, and the second through fourth pixels from the left belong to the mixed area, which is a covered background area.

The fifth through twelfth pixels from the left of frame #n−1 in FIG. 15 belong to the background area, and the pixel values thereof are B04 through B11, respectively.

The first through fifth pixels from the left in frame #n in FIG. 15 belong to the foreground area. The foreground component in the shutter time/v in the foreground area of frame #n is any one of F05/v through F12/v.

It can be assumed that the object corresponding to the foreground is a rigid body moving with constant velocity, and that it is moving such that the foreground image is displayed four pixels to the right in the subsequent frame. Accordingly, the foreground component of the fifth pixel from the left of frame #n in FIG. 15 corresponding to the first portion of the shutter time/v from when the shutter has opened is F12/v, and the foreground component of the sixth pixel from the left in FIG. 15 corresponding to the second portion of the shutter time/v from when the shutter has opened is also F12/v. The foreground component of the seventh pixel from the left in FIG. 15 corresponding to the third portion of the shutter time/v from when the shutter has opened and the foreground component of the eighth pixel from the left in FIG. 15 corresponding to the fourth portion of the shutter time/v from when the shutter has opened are F12/v.

The foreground component of the fifth pixel from the left of frame #n in FIG. 15 corresponding to the second portion of the shutter time/v from when the shutter has opened is F11/v. The foreground component of the sixth pixel from the left in FIG. 15 corresponding to the third portion of the shutter time/v from when the shutter has opened is also F11/v. The foreground component of the seventh pixel from the left in FIG. 15 corresponding to the fourth portion of the shutter time/v from when the shutter has opened is F11/v.

The foreground component of the fifth pixel from the left of frame #n in FIG. 15 corresponding to the third portion of the shutter time/v from when the shutter has opened is F10/v. The foreground component of the sixth pixel from the left in FIG. 15 corresponding to the fourth portion of the shutter time/v from when the shutter has opened is also F10/v. The foreground component of the fifth pixel from the left of frame #n in FIG. 15 corresponding to the fourth portion of the shutter time/v from when the shutter has opened is F09/v.

Since the object corresponding to the background is stationary, the background component of the sixth pixel from the left of frame #n in FIG. 15 corresponding to the first portion of the shutter time/v from when the shutter has opened is B05/v. The background components of the seventh pixel from the left of frame #n in FIG. 15 corresponding to the first and second portions of the shutter time/v from when the shutter has opened are B06/v. The background components of the eighth pixel from the left of frame #n in FIG. 15 corresponding to the first through third portion of the shutter time/v from when the shutter has opened are B07/v.

In frame #n in FIG. 15, the sixth through eighth pixels from the left belong to the mixed area, which is a covered background area.

The ninth through twelfth pixels from the left of frame #n in FIG. 15 belong to the background area, and the pixel values thereof are B08 through B11, respectively.

The first through ninth pixels from the left in frame #n+1 in FIG. 15 belong to the foreground area. The foreground component in the shutter time/v in the foreground area of frame #n+1 is any one of F01/v through F12/v.

It can be assumed that the object corresponding to the foreground is a rigid body moving with constant velocity, and that it is moving such that the foreground image is displayed four pixels to the right in the subsequent frame. Accordingly, the foreground component of the ninth pixel from the left of frame #n+1 in FIG. 15 corresponding to the first portion of the shutter time/v from when the shutter has opened is F12/v, and the foreground component of the tenth pixel from the left in FIG. 15 corresponding to the second portion of the shutter time/v from when the shutter has opened is also F12/v. The foreground component of the eleventh pixel from the left in FIG. 15 corresponding to the third portion of the shutter time/v from when the shutter has opened and the foreground component of the twelfth pixel from the left in FIG. 15 corresponding to the fourth portion of the shutter time/v from when the shutter has opened are F12/v.

The foreground component of the ninth pixel from the left of frame #n+1 in FIG. 15 corresponding to the second portion of the shutter time/v from when the shutter has opened is F11/v. The foreground component of the tenth pixel from the left in FIG. 15 corresponding to the third portion of the shutter time/v from when the shutter has opened is also F11/v. The foreground component of the eleventh pixel from the left in FIG. 15 corresponding to the fourth portion of the shutter time/v from when the shutter has opened is F11/v.

The foreground component of the ninth pixel from the left of frame #n+1 in FIG. 15 corresponding to the third portion of the shutter time/v from when the shutter has opened is F10/v. The foreground component of the tenth pixel from the left in FIG. 15 corresponding to the fourth portion of the shutter time/v from when the shutter has opened is also F10/v. The foreground component of the ninth pixel from the left of frame #n+1 in FIG. 15 corresponding to the fourth portion of the shutter time/v from when the shutter has opened is F09/v.

Since the object corresponding to the background is stationary, the background component of the tenth pixel from the left of frame #n+1 in FIG. 15 corresponding to the first portion of the shutter time/v from when the shutter has opened is B09/v. The background components of the eleventh pixel from the left of frame #n+1 in FIG. 15 corresponding to the first and second portions of the shutter time/v from when the shutter has opened are B10/v. The background components of the twelfth pixel from the left of frame #n+1 in FIG. 15 corresponding to the first through third portion of the shutter time/v from when the shutter has opened are B11/v.

In frame #n+1 in FIG. 15, the tenth through twelfth pixels from the left belong to the mixed area, which is a covered background area.

Figure 16:
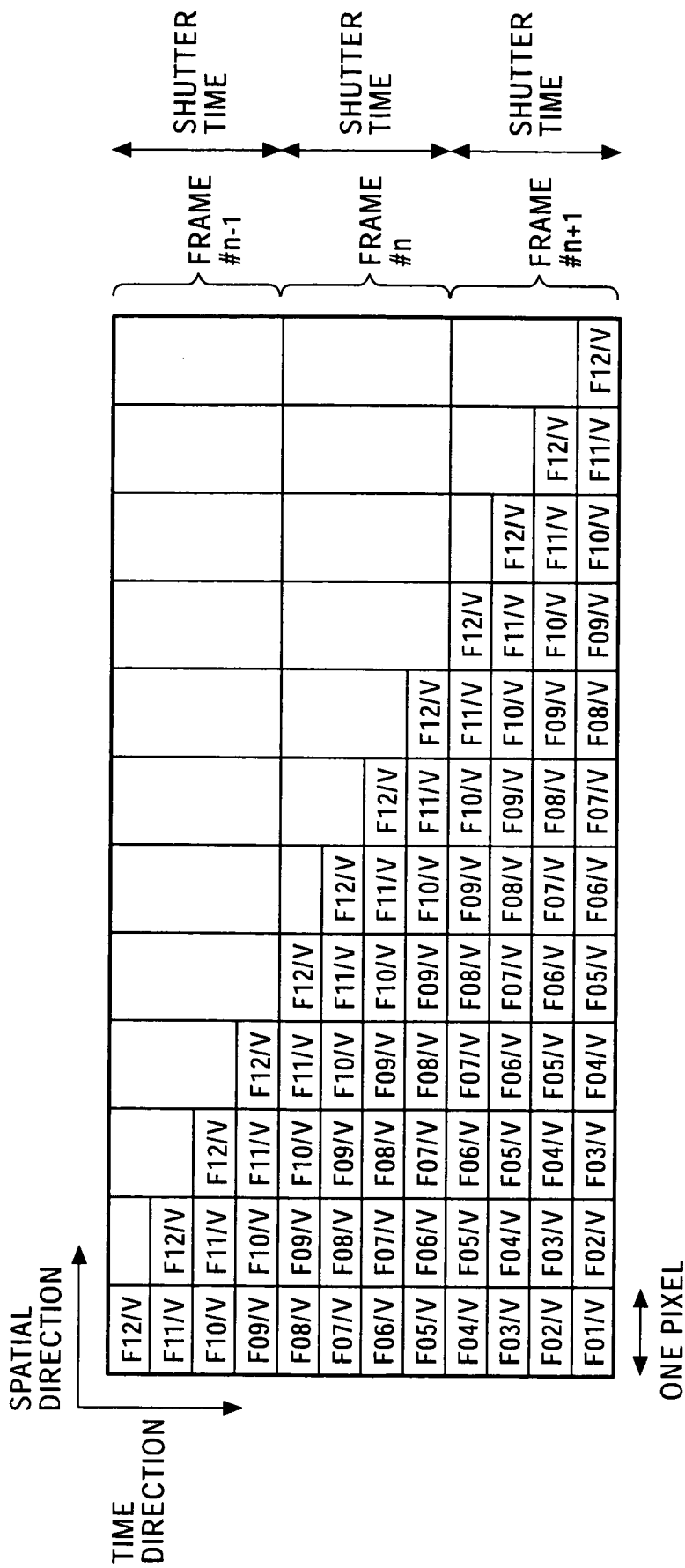
FIG. 16 illustrates a model in which pixel values are expanded in the time direction and the period corresponding to the shutter time is divided.

FIG. 16 is a model of an image obtained by extracting the foreground components from the pixel values shown in FIG. 15.

Figure 17:
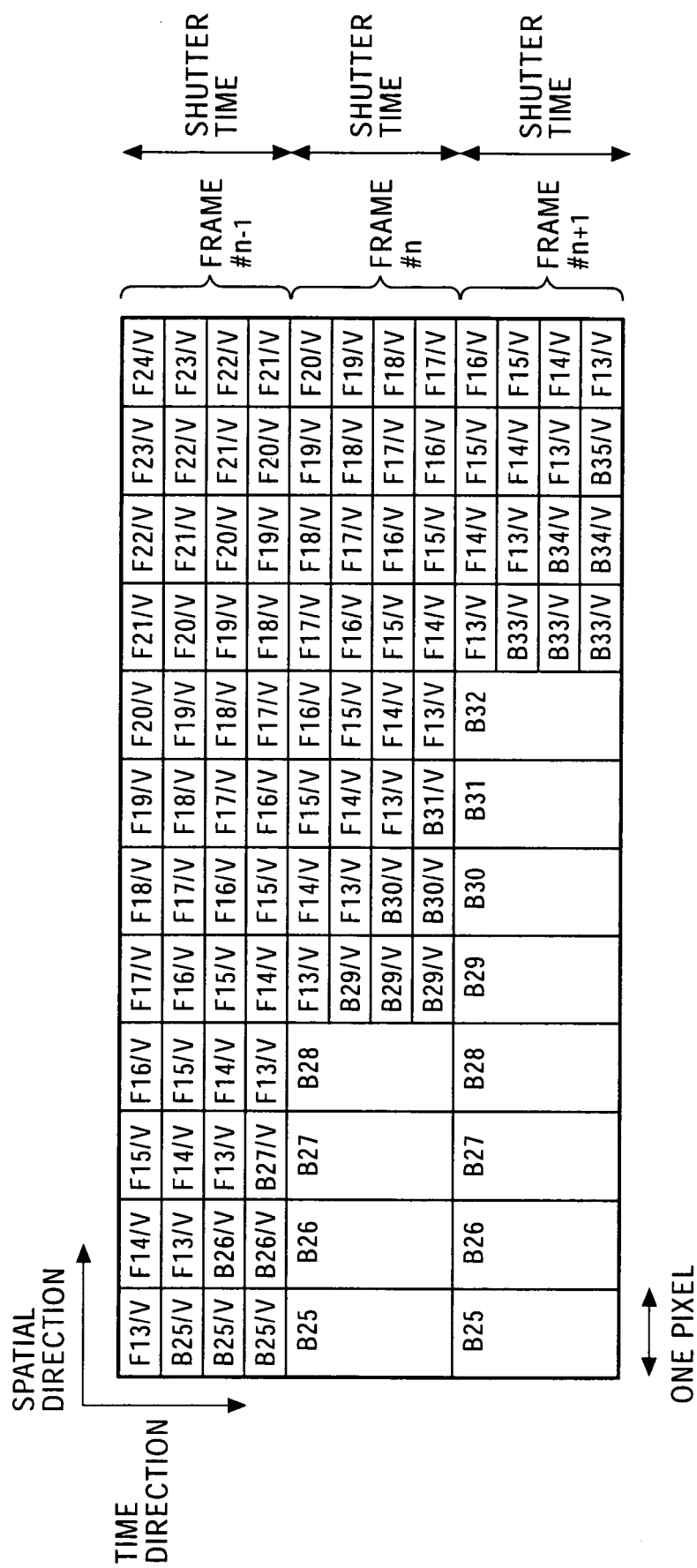
FIG. 17 illustrates a model in which pixel values are expanded in the time direction and the period corresponding to the shutter time is divided.

FIG. 17 illustrates a model obtained by expanding in the time direction the pixels which are aligned side-by-side in three frames of an image obtained by capturing an object corresponding to a foreground that is moving to the right in FIG. 17 together with an object corresponding to a stationary background and which are located at the same positions in the frames. The model shown in FIG. 17 contains an uncovered background area.

In FIG. 17, it can be assumed that the object corresponding to the foreground is a rigid body moving with constant velocity, and that it is moving such that it is displayed four pixels to the right in the subsequent frame. Accordingly, the amount of movement v is 4.

For example, the foreground component of the leftmost pixel of frame #n−1 in FIG. 17 corresponding to the first portion of the shutter time/v from when the shutter has opened is F13/v, and the foreground component of the second pixel from the left in FIG. 17 corresponding to the second portion of the shutter time/v from when the shutter has opened is also F13/v. The foreground component of the third pixel from the left in FIG. 17 corresponding to the third portion of the shutter time/v from when the shutter has opened and the foreground component of the fourth pixel from the left in FIG. 17 corresponding to the fourth portion of the shutter time/v from when the shutter has opened are F13/v.

The foreground component of the second pixel from the left of frame #n−1 in FIG. 17 corresponding to the first portion of the shutter time/v from when the shutter has opened is F14/v. The foreground component of the third pixel from the left in FIG. 17 corresponding to the second portion of the shutter time/v from when the shutter has opened is also F14/v. The foreground component of the third pixel from the left in FIG. 17 corresponding to the first portion of the shutter time/v from when the shutter has opened is F15/v.

Since the object corresponding to the background is stationary, the background components of the leftmost pixel of frame #n−1 in FIG. 17 corresponding to the second through fourth portions of the shutter time/v from when the shutter has opened are B25/v. The background components of the second pixel from the left of frame #n−1 in FIG. 17 corresponding to the third and fourth portions of the shutter time/v from when the shutter has opened are B26/v. The background component of the third pixel from the left of frame #n−1 in FIG. 17 corresponding to the fourth portion of the shutter time/v from when the shutter has opened is B27/v.

In frame #n−1 in FIG. 17, the leftmost pixel through the third pixel belong to the mixed area, which is an uncovered background area.

The fourth through twelfth pixels from the left of frame #n−1 in FIG. 17 belong to the foreground area. The foreground component of the frame is any one of F13/v through F24/v.

The leftmost pixel through the fourth pixel from the left of frame #n in FIG. 17 belong to the background area, and the pixel values thereof are B25 through B28, respectively.

It can be assumed that the object corresponding to the foreground is a rigid body moving with constant velocity, and that it is moving such that it is displayed four pixels to the right in the subsequent frame. Accordingly, the foreground component of the fifth pixel from the left of frame #n in FIG. 17 corresponding to the first portion of the shutter time/v from when the shutter has opened is F13/v, and the foreground component of the sixth pixel from the left in FIG. 17 corresponding to the second portion of the shutter time/v from when the shutter has opened is also F13/v. The foreground component of the seventh pixel from the left in FIG. 17 corresponding to the third portion of the shutter time/v from when the shutter has opened and the foreground component of the eighth pixel from the left in FIG. 17 corresponding to the fourth portion of the shutter time/v from when the shutter has opened are F13/v.

The foreground component of the sixth pixel from the left of frame #n in FIG. 17 corresponding to the first portion of the shutter time/v from when the shutter has opened is F14/v. The foreground component of the seventh pixel from the left in FIG. 17 corresponding to the second portion of the shutter time/v from when the shutter has opened is also F14/v. The foreground component of the eighth pixel from the left in FIG. 17 corresponding to the first portion of the shutter time/v from when the shutter has opened is F15/v.

Since the object corresponding to the background is stationary, the background components of the fifth pixel from the left of frame #n in FIG. 17 corresponding to the second through fourth portions of the shutter time/v from when the shutter has opened are B29/v. The background components of the sixth pixel from the left of frame #n in FIG. 17 corresponding to the third and fourth portions of the shutter time/v from when the shutter has opened are B30/v. The background component of the seventh pixel from the left of frame #n in FIG. 17 corresponding to the fourth portion of the shutter time/v from when the shutter has opened is B31/v.

In frame #n in FIG. 17, the fifth pixel through the seventh pixel from the left belong to the mixed area, which is an uncovered background area.

The eighth through twelfth pixels from the left of frame #n in FIG. 17 belong to the foreground area. The value in the foreground area of frame #n corresponding to the period of the shutter time/v is any one of F13/v through F20/v.

The leftmost pixel through the eighth pixel from the left of frame #n+1 in FIG. 17 belong to the background area, and the pixel values thereof are B25 through B32, respectively.

It can be assumed that the object corresponding to the foreground is a rigid body moving with constant velocity, and that it is moving such that it is displayed four pixels to the right in the subsequent frame. Accordingly, the foreground component of the ninth pixel from the left of frame #n+1 in FIG. 17 corresponding to the first portion of the shutter time/v from when the shutter has opened is F13/v, and the foreground component of the tenth pixel from the left in FIG. 17 corresponding to the second portion of the shutter time/v from when the shutter has opened is also F13/v. The foreground component of the eleventh pixel from the left in FIG. 17 corresponding to the third portion of the shutter time/v from when the shutter has opened and the foreground component of the twelfth pixel from the left in FIG. 17 corresponding to the fourth portion of the shutter time/v from when the shutter has opened are F13/v.

The foreground component of the tenth pixel from the left of frame #n+1 in FIG. 17 corresponding to the first portion of the shutter time/v from when the shutter has opened is F14/v. The foreground component of the eleventh pixel from the left in FIG. 17 corresponding to the second portion of the shutter time/v from when the shutter has opened is also F14/v. The foreground component of the twelfth pixel from the left in FIG. 17 corresponding to the first portion of the shutter time/v from when the shutter has opened is F15/v.

Since the object corresponding to the background is stationary, the background components of the ninth pixel from the left of frame #n+1 in FIG. 17 corresponding to the second through fourth portions of the shutter time/v from when the shutter has opened are B33/v. The background components of the tenth pixel from the left of frame #n+1 in FIG. 17 corresponding to the third and fourth portions of the shutter time/v from when the shutter has opened are B34/v. The background component of the eleventh pixel from the left of frame #n+1 in FIG. 17 corresponding to the fourth portion of the shutter time/v from when the shutter has opened is B35/v.

In frame #n+1 in FIG. 17, the ninth through eleventh pixels from the left in FIG. 17 belong to the mixed area, which is an uncovered background area.

The twelfth pixel from the left of frame #n+1 in FIG. 17 belongs to the foreground area. The foreground component in the shutter time/v in the foreground area of frame #n+1 is any one of F13 through F16, respectively.

Figure 18:
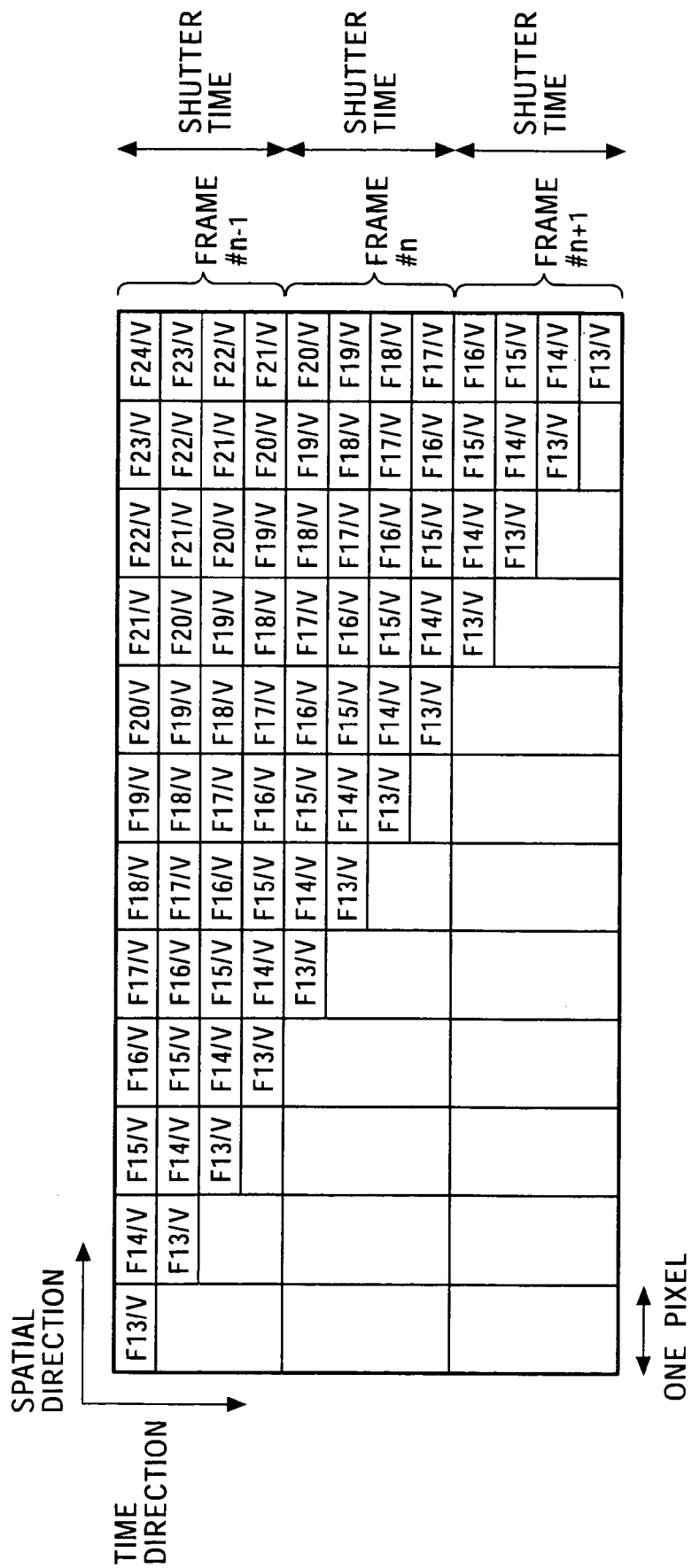
FIG. 18 illustrates a model in which pixel values are expanded in the time direction and the period corresponding to the shutter time is divided.

FIG. 18 illustrates a model of an image obtained by extracting the foreground components from the pixel values shown in FIG. 17.

Referring back to FIG. 2, the area specifying unit 103 specifies flags indicating to which of a foreground area, a background area, a covered background area, or an uncovered background area the individual pixels of the input image belong by using the pixel values of a plurality of frames, and supplies the flags to the mixture-ratio calculator 104 as the area information.

The mixture-ratio calculator 104 calculates the mixture ratio α for each pixel contained in the mixed area based on the pixel values of a plurality of frames and the area information, and supplies the calculated mixture ratio α to the foreground/background separator 105.

The foreground/background separator 105 extracts the foreground component image consisting of only the foreground components and the background component image consisting of only the background components based on the pixel values of a plurality of frames, the area information, and the mixture ratio α, and outputs the foreground component image and the background component image.

Figure 19:
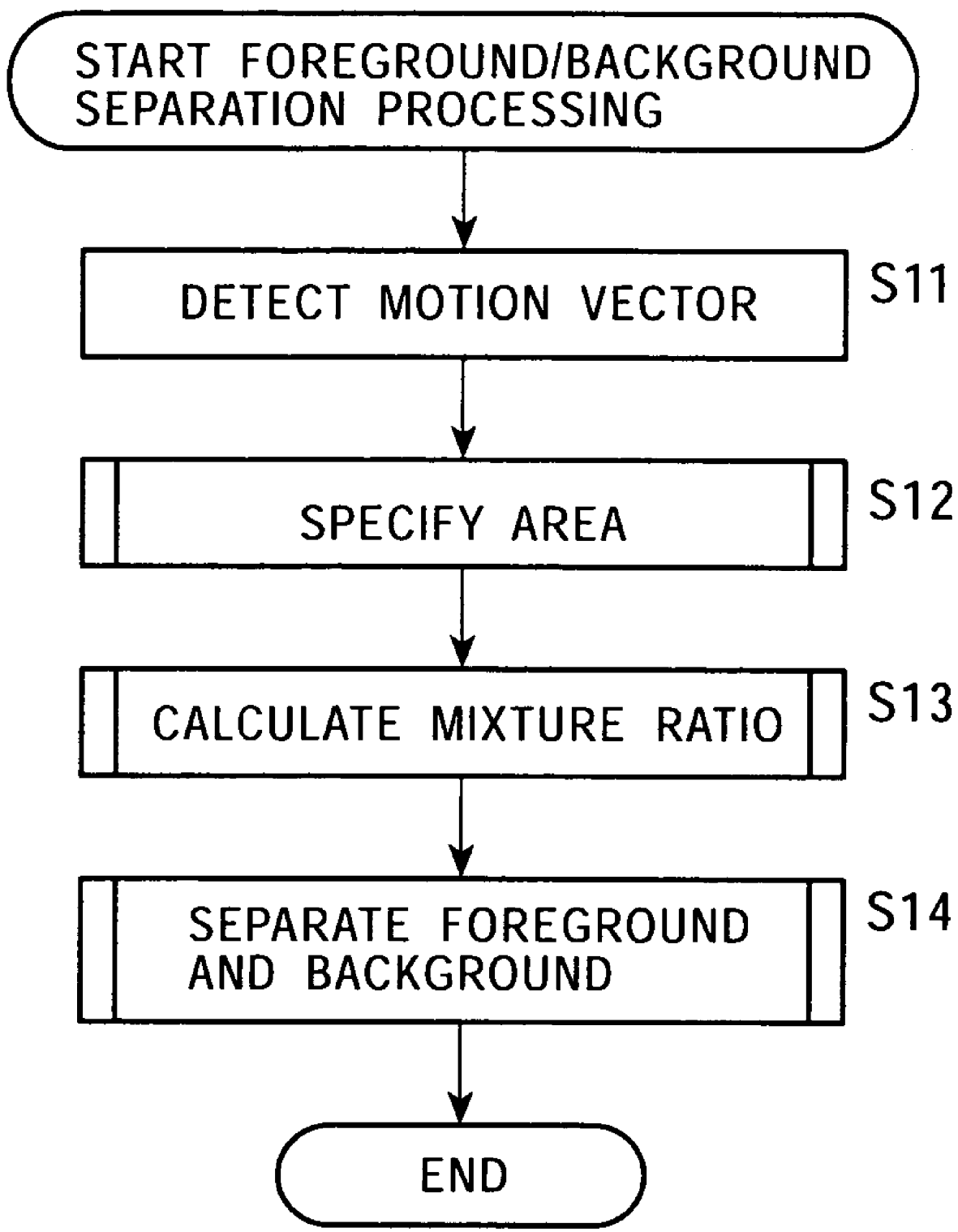
FIG. 19 is a flowchart illustrating the processing for adjusting the amount of motion blur.

The foreground/background separation processing performed by the image processing apparatus is described below with reference to the flowchart of FIG. 19. In step S11, the motion detector 102 calculates a motion vector of the image object corresponding to the foreground object according to a technique, such as block matching, gradient, phase correlation, or pel-recursive technique, and supplies the calculated motion vector and the motion-vector positional information to the area specifying unit 103 and the mixture-ratio calculator 104.

In step S12, the area specifying unit 103 executes area specifying processing, based on an input image, for generating area information indicating to which of a foreground area, a background area, a covered background area, or an uncovered background area each pixel of the input image belongs. Details of the area specifying processing are given below. The area specifying unit 103 supplies the generated area information to the mixture-ratio calculator 104.

In step S12, the area specifying unit 103 may generate, based on the input image, area information indicating to which of the foreground area, the background area, or the mixed area (regardless of whether each pixel belongs to a covered background area or an uncovered background area) each pixel of the input image belongs. In this case, the foreground/background separator 105 determines based on the direction of the motion vector whether the mixed area is a covered background area or an uncovered background area. For example, if the input image is disposed in the order of the foreground area, the mixed area, and the background area in the direction of the motion vector, it is determined that the mixed area is a covered background area. If the input image is disposed in the order of the background area, the mixed area, and the foreground area in the direction of the motion vector, it is determined that the mixed area is an uncovered background area.

In step S13, the mixture-ratio calculator 104 calculates the mixture ratio α for each pixel contained in the mixed area based on the motion vector and the positional information thereof. Details of the mixture ratio calculating processing are given below. The mixture-ratio calculator 104 supplies the calculated mixture ratio α to the foreground/background separator 105.

In step S14, the foreground/background separator 105 extracts the foreground components and the background components from the input image based on the area information and the mixture ratio α, and synthesizes the foreground component image based on the extracted foreground components and also synthesizes the background component image based on the extracted background components. The foreground/background separator 105 outputs the foreground component image and the background component image, and the processing is then completed. Details of the foreground/background separation processing are discussed below.

As described above, the image processing apparatus is able to calculate the mixture ratio α and to separate the foreground and the background based on the calculated mixture ratio α.

The configuration of each of the area specifying unit 103, the mixture-ratio calculator 104, and the foreground/background separator 105 is described below.

Figure 20:
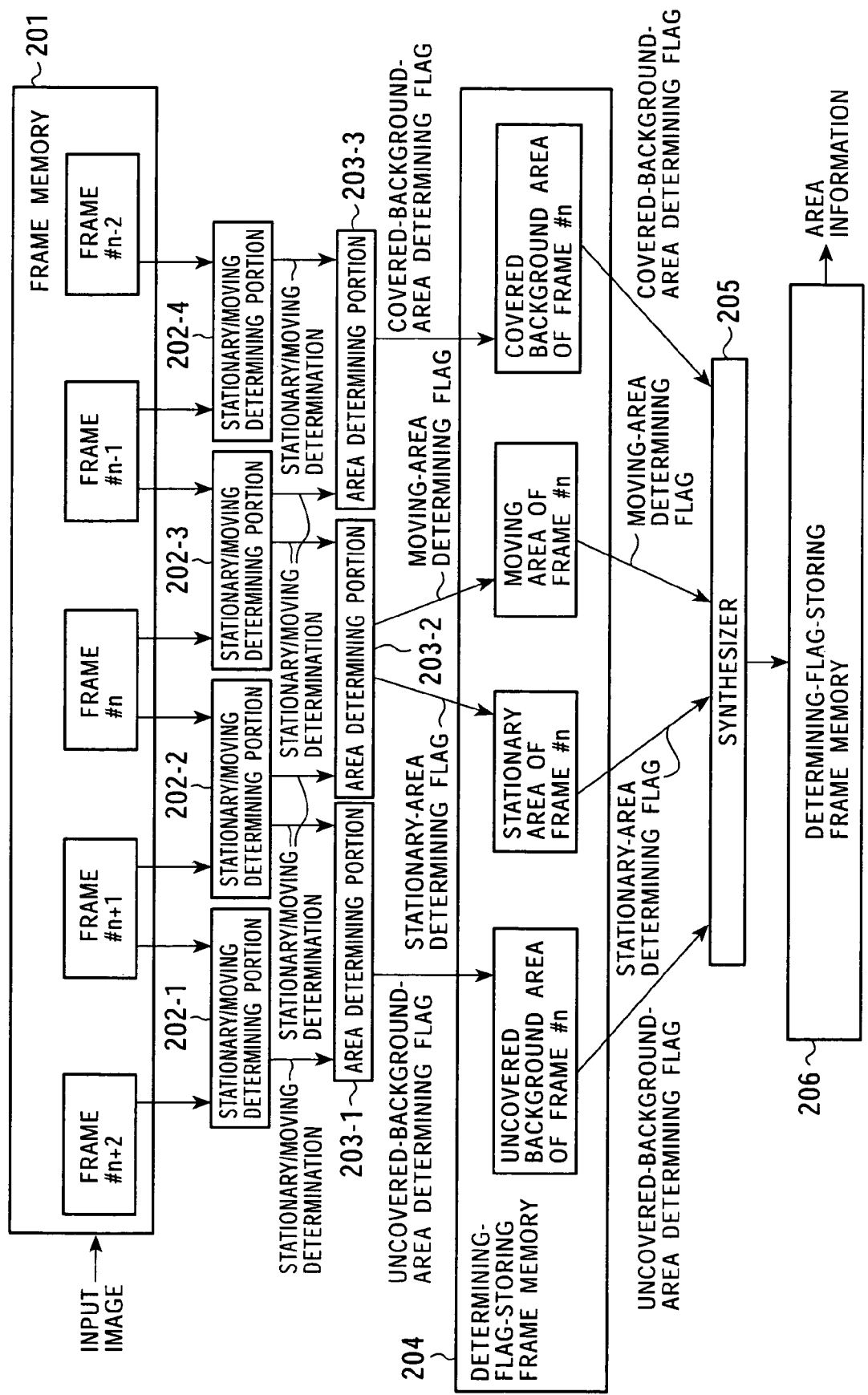
FIG. 20 is a block diagram illustrating an example of the configuration of an area specifying unit 103.

FIG. 20 is a block diagram illustrating an example of the configuration of the area specifying unit 103. The area specifying unit 103 shown in FIG. 20 does not use a motion vector. A frame memory 201 stores an input image in units of frames. When the image to be processed is frame #n, the frame memory 201 stores frame #n−2, which is the frame two frames before frame #n, frame #n−1, which is the frame one frame before frame #n, frame #n, frame #n+1, which is the frame one frame after frame #n, frame #n+2, which is the frame two frames after frame #n.

A stationary/moving determining portion 202-1 reads the pixel value of the pixel of frame #n+2 located at the same position as a designated pixel of frame #n in which the area to which the pixel belongs is determined, and reads the pixel value of the pixel of frame #n+1 located at the same position of the designated pixel of frame #n from the frame memory 201, and calculates the absolute value of the difference between the read pixel values. The stationary/moving determining portion 202-1 determines whether the absolute value of the difference between the pixel value of frame #n+2 and the pixel value of frame #n+1 is greater than a preset threshold Th. If it is determined that the difference is greater than the threshold Th, a stationary/moving determination indicating "moving" is supplied to an area determining portion 203-1. If it is determined that the absolute value of the difference between the pixel value of the pixel of frame #n+2 and the pixel value of the pixel of frame #n+1 is smaller than or equal to the threshold Th, the stationary/moving determining portion 202-1 supplies a stationary/moving determination indicating "stationary" to the area determining portion 203-1.

A stationary/moving determining portion 202-2 reads the pixel value of the designated pixel of frame #n in which the area to which the pixel belongs is determined, and reads the pixel value of the pixel of frame #n+1 located at the same position as the designated pixel of frame #n from the frame memory 201, and calculates the absolute value of the difference between the pixel values. The stationary/moving determining portion 202-2 determines whether the absolute value of the difference between the pixel value of frame #n+1 and the pixel value of frame #n is greater than the preset threshold Th. If it is determined that the absolute value of the difference between the pixel values is greater than the threshold Th, a stationary/moving determination indicating "moving" is supplied to the area determining portion 203-1 and an area determining portion 203-2. If it is determined that the absolute value of the difference between the pixel value of the pixel of frame #n+1 and the pixel value of the pixel of frame #n is smaller than or equal to the threshold Th, the stationary/moving determining portion 202-2 supplies a stationary/moving determination indicating "stationary" to the area determining portion 203-1 and the area determining portion 203-2.

A stationary/moving determining portion 202-3 reads the pixel value of the designated pixel of frame #n in which the area to which the pixel belongs is determined, and reads the pixel value of the pixel of frame #n−1 located at the same position as the designated pixel of frame #n from the frame memory 201, and calculates the absolute value of the difference between the pixel values. The stationary/moving determining portion 202-3 determines whether the absolute value of the difference between the pixel value of frame #n and the pixel value of frame #n−1 is greater than the preset threshold Th. If it is determined that the absolute value of the difference between the pixel values is greater than the threshold Th, a stationary/moving determination indicating "moving" is supplied to the area determining portion 203-2 and an area determining portion 203-3. If it is determined that the absolute value of the difference between the pixel value of the pixel of frame #n and the pixel value of the pixel of frame #n−1 is smaller than or equal to the threshold Th, the stationary/moving determining portion 202-3 supplies a stationary/moving determination indicating "stationary" to the area determining portion 203-2 and the area determining portion 203-3.

A stationary/moving determining portion 202-4 reads the pixel value of the pixel of frame #n−1 located at the same position as the designated pixel of frame #n in which the area to which the pixel belongs is determined, and reads the pixel value of the pixel of frame #n−2 located at the same position as the designated pixel of frame #n from the frame memory 201, and calculates the absolute value of the difference between the pixel values. The stationary/moving determining portion 202-4 determines whether the absolute value of the difference between the pixel value of frame #n−1 and the pixel value of frame #n−2 is greater than the preset threshold Th. If it is determined that the absolute value of the difference between the pixel values is greater than the threshold Th, a stationary/moving determination indicating "moving" is supplied to the area determining portion 203-3. If it is determined that the absolute value of the difference between the pixel value of the pixel of frame #n−1 and the pixel value of the pixel of frame #n−2 is smaller than or equal to the threshold Th, the stationary/moving determining portion 202-4 supplies a stationary/moving determination indicating "stationary" to the area determining portion 203-3.

When the stationary/moving determination supplied from the stationary/moving determining portion 202-1 indicates "stationary" and when the stationary/moving determination supplied from the stationary/moving determining portion 202-2 indicates "moving", the area determining portion 203-1 determines that the designated pixel of frame #n belongs to an uncovered background area, and sets "1", which indicates that the designated pixel belongs to an uncovered background area, in an uncovered-background-area determining flag associated with the designated pixel.

When the stationary/moving determination supplied from the stationary/moving determining portion 202-1 indicates "moving" or when the stationary/moving determination supplied from the stationary/moving determining portion 202-2 indicates "stationary", the area specifying unit 203-1 determines that the designated pixel of frame #n does not belong to an uncovered background area, and sets "0", which indicates that the designated pixel does not belong to an uncovered background area, in the uncovered-background-area determining flag associated with the designated pixel.

The area determining portion 203-1 supplies the uncovered-background-area determining flag in which "1" or "0" is set as discussed above to a determining-flag-storing frame memory 204.

When the stationary/moving determination supplied from the stationary/moving determining portion 202-2 indicates "stationary" and when the stationary/moving determination supplied from the stationary/moving determining portion 202-3 indicate "stationary", the area determining portion 203-2 determines that the designated pixel of frame #n belongs to the stationary area, and sets "1", which indicates that the pixel belongs to the stationary area, in a stationary-area determining flag associated with the designated pixel.

When the stationary/moving determination supplied from the stationary/moving determining portion 202-2 indicates "moving" or when the stationary/moving determination supplied from the stationary/moving determining portion 202-3 indicate "moving", the area determining portion 203-2 determines that the designated pixel of frame #n does not belong to the stationary area, and sets "0", which indicates that the pixel does not belong to the stationary area, in the stationary-area determining flag associated with the designated pixel.

The area determining portion 203-2 supplies the stationary-area determining flag in which "1" or "0" is set as discussed above to the determining-flag-storing frame memory 204.

When the stationary/moving determination supplied from the stationary/moving determining portion 202-2 indicates "moving" and when the stationary/moving determination supplied from the stationary/moving determining portion 202-3 indicate "moving", the area determining portion 203-2 determines that the designated pixel of frame #n belongs to the moving area, and sets "1", which indicates that the designated pixel belongs to the moving area, in a moving-area determining flag associated with the designated pixel.

When the stationary/moving determination supplied from the stationary/moving determining portion 202-2 indicates "stationary" or when the stationary/moving determination supplied from the stationary/moving determining portion 202-3 indicate "stationary", the area determining portion 203-2 determines that the designated pixel of frame #n does not belong to the moving area, and sets "0", which indicates that the pixel does not belong to the moving area, in the moving-area determining flag associated with the designated pixel.

The area determining portion 203-2 supplies the moving-area determining flag in which "1" or "0" is set as discussed above to the determining-flag-storing frame memory 204.

When the stationary/moving determination supplied from the stationary/moving determining portion 202-3 indicates "moving" and when the stationary/moving determination supplied from the stationary/moving determining portion 202-4 indicate "stationary", the area determining portion 203-3 determines that the designated pixel of frame #n belongs to a covered background area, and sets "1", which indicates that the designated pixel belongs to the covered background area, in a covered-background-area determining flag associated with the designated pixel.

When the stationary/moving determination supplied from the stationary/moving determining portion 202-3 indicates "stationary" or when the stationary/moving determination supplied from the stationary/moving determining portion 202-4 indicate "moving", the area determining portion 203-3 determines that the designated pixel of frame #n does not belong to a covered background area, and sets "0", which indicates that the designated pixel does not belong to a covered background area, in the covered-background-area determining flag associated with the designated pixel.

The area determining portion 203-3 supplies the covered-background-area determining flag in which "1" or "0" is set as discussed above to the determining-flag-storing frame memory 204.

The determining-flag-storing frame memory 204 thus stores the uncovered-background-area determining flag supplied from the area determining portion 203-1, the stationary-area determining flag supplied from the area determining portion 203-2, the moving-area determining flag supplied from the area determining portion 203-2, and the covered-background-area determining flag supplied from the area determining portion 203-3.

The determining-flag-storing frame memory 204 supplies the uncovered-background-area determining flag, the stationary-area determining flag, the moving-area determining flag, and the covered-background-area determining flag stored therein to a synthesizer 205. The synthesizer 205 generates area information indicating to which of the uncovered background area, the stationary area, the moving area, or the covered background area each pixel belongs based on the uncovered-background-area determining flag, the stationary-area determining flag, the moving-area determining flag, and the covered-background-area determining flag supplied from the determining-flag-storing frame memory 204, and supplies the area information to a determining-flag-storing frame memory 206.

The determining-flag-storing frame memory 206 stores the area information supplied from the synthesizer 205, and also outputs the area information stored therein.

An example of the processing performed by the area specifying unit 103 is described below with reference to FIGS. 21 through 25.

Figure 21:
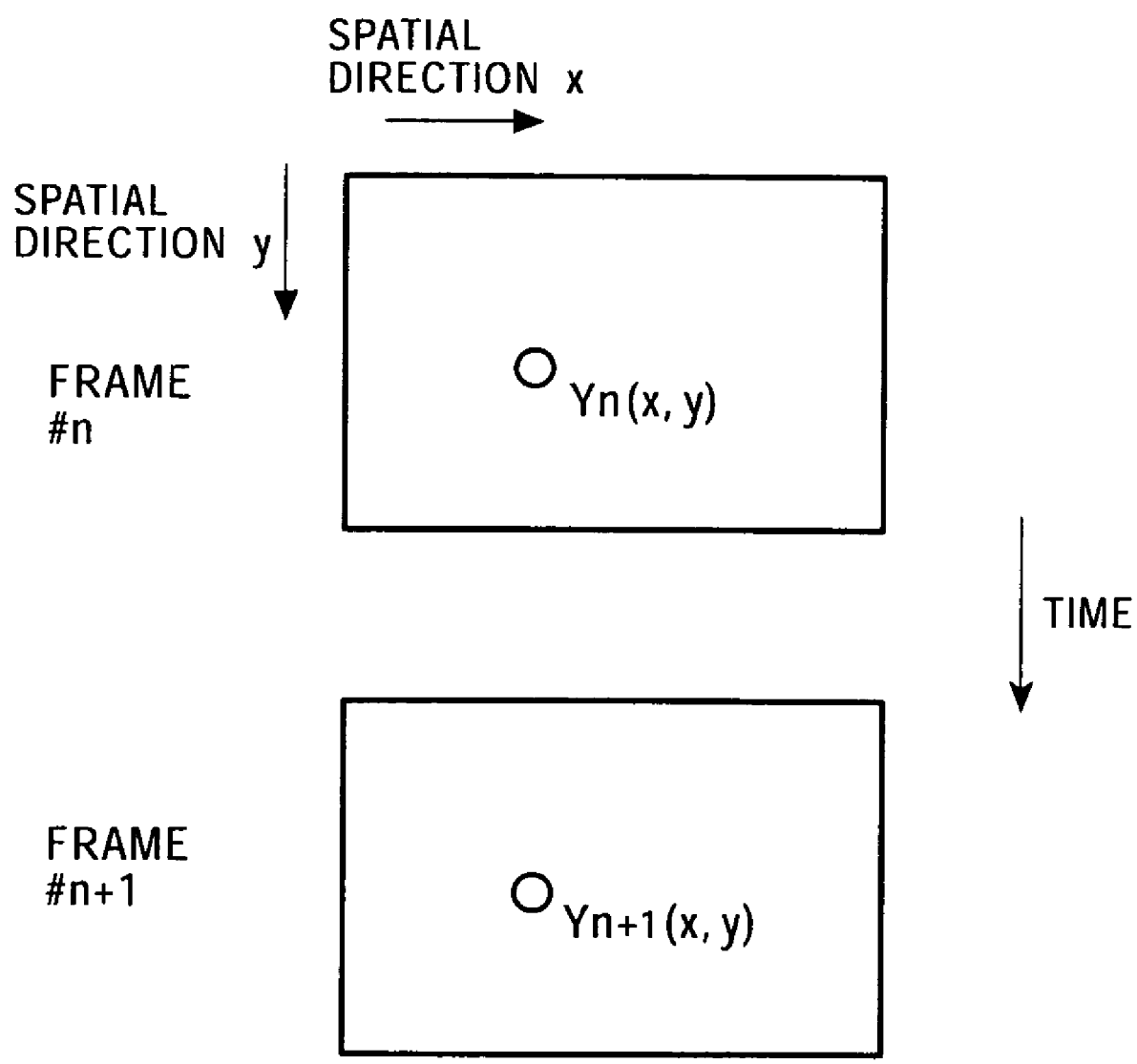
FIG. 21 illustrates an image when an object corresponding to a foreground is moving.

When the object corresponding to the foreground is moving, the position of the image corresponding to the object on the screen changes in every frame. As shown in FIG. 21, the image corresponding to the object located at the position indicated by Yn(x,y) in frame #n is positioned at Yn+1(x,y) in frame #n+1, which is subsequent to frame #n.

Figure 22:
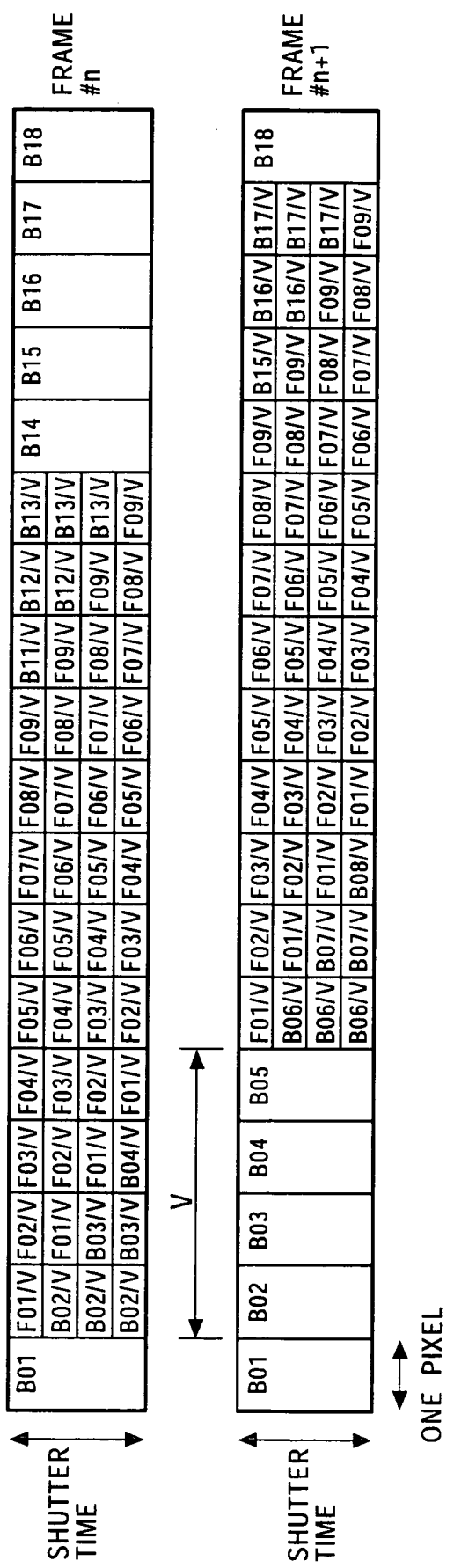
FIG. 22 illustrates a model in which pixel values are expanded in the time direction and the period corresponding to the shutter time is divided.

A model obtained by expanding in the time direction the pixel values of the pixels aligned side-by-side in the moving direction of the image corresponding to the foreground object is shown in FIG. 22. For example, if the moving direction of the image corresponding to the foreground object is horizontal with respect to the screen, the model shown in FIG. 22 is a model obtained by expanding in the time direction the pixel values of the pixels disposed on a line side-by-side.

In FIG. 22, the line in frame #n is equal to the line in frame #n+1.

The foreground components corresponding to the object contained in the second pixel to the thirteenth pixel from the left in frame #n are contained in the sixth pixel through the seventeenth pixel from the left in frame #n+1.

In frame #n, the pixels belonging to the covered background area are the eleventh through thirteenth pixels from the left, and the pixels belonging to the uncovered background area are the second through fourth pixels from the left. In frame #n+1, the pixels belonging to the covered background area are the fifteenth through seventeenth pixels from the left, and the pixels belonging to the uncovered background area are the sixth through eighth pixels from the left.

In the example shown in FIG. 22, since the foreground components contained in frame #n are moved by four pixels in frame #n+1, the amount of movement v is 4. The number of virtual divided portions is 4 in accordance with the amount of movement v.

A description is now given of a change in pixel values of the pixels belonging to the mixed area in the frames before and after a designated frame.

Figure 23:
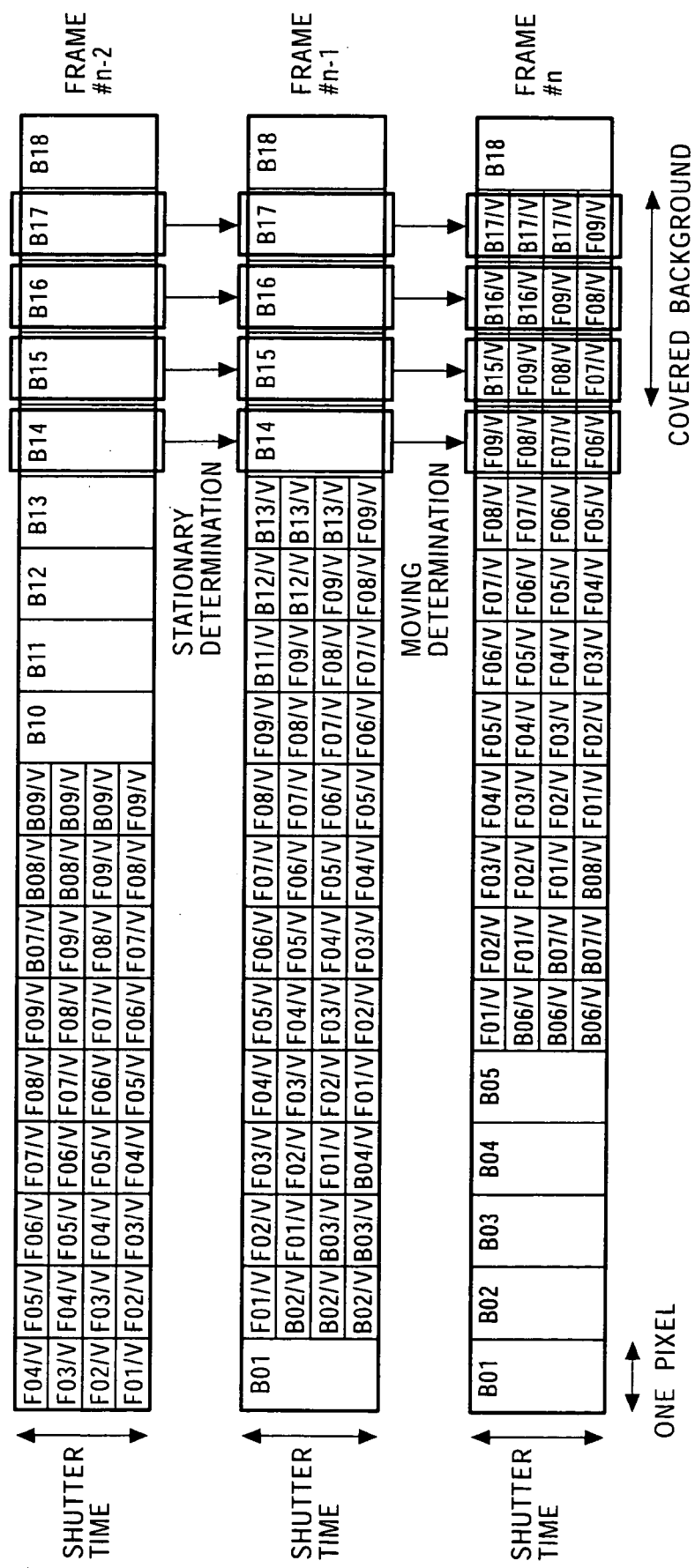
FIG. 23 illustrates a model in which pixel values are expanded in the time direction and the period corresponding to the shutter time is divided.

In FIG. 23, the pixels belonging to a covered background area in frame #n in which the background is stationary and the amount of movement v in the foreground is 4 are the fifteenth through seventeenth pixels from the left. Since the amount of movement v is 4, the fifteenth through seventeenth frames from the left in the previous frame #n−1 contain only background components and belong to the background area. The fifteenth through seventeenth pixels from the left in frame #n−2, which is one before frame #n−1, contain only background components and belong to the background area.

Since the object corresponding to the background is stationary, the pixel value of the fifteenth pixel from the left in frame #n−1 does not change from the pixel value of the fifteenth pixel from the left in frame #n−2. Similarly, the pixel value of the sixteenth pixel from the left in frame #n−1 does not change from the pixel value of the sixteenth pixel from the left in frame #n−2, and the pixel value of the seventeenth pixel from the left in frame #n−1 does not change from the pixel value of the seventeenth pixel from the left in frame #n−2.

That is, the pixels in frame #n−1 and frame #n−2 corresponding to the pixels belonging to the covered background area in frame #n consist of only background components, and the pixel values thereof do not change. Accordingly, the absolute value of the difference between the pixel values is almost 0. Thus, the stationary/moving determination made for the pixels in frame #n−1 and frame #n−2 corresponding to the pixels belonging to the mixed area in frame #n by the stationary/moving determining portion 202-4 is "stationary".

Since the pixels belonging to the covered background area in frame #n contain foreground components, the pixel values thereof are different from those of frame #n−1 consisting of only background components. Accordingly, the stationary/moving determination made for the pixels belonging to the mixed area in frame #n and the corresponding pixels in frame #n−1 by the stationary/moving determining portion 202-3 is "moving".

When the stationary/moving determination result indicating "moving" is supplied from the stationary/moving determining portion 202-3, and when the stationary/moving determination result indicating "stationary" is supplied from the stationary/moving determining portion 202-4, as discussed above, the area determining portion 203-3 determines that the corresponding pixels belong to a covered background area.

Figure 24:
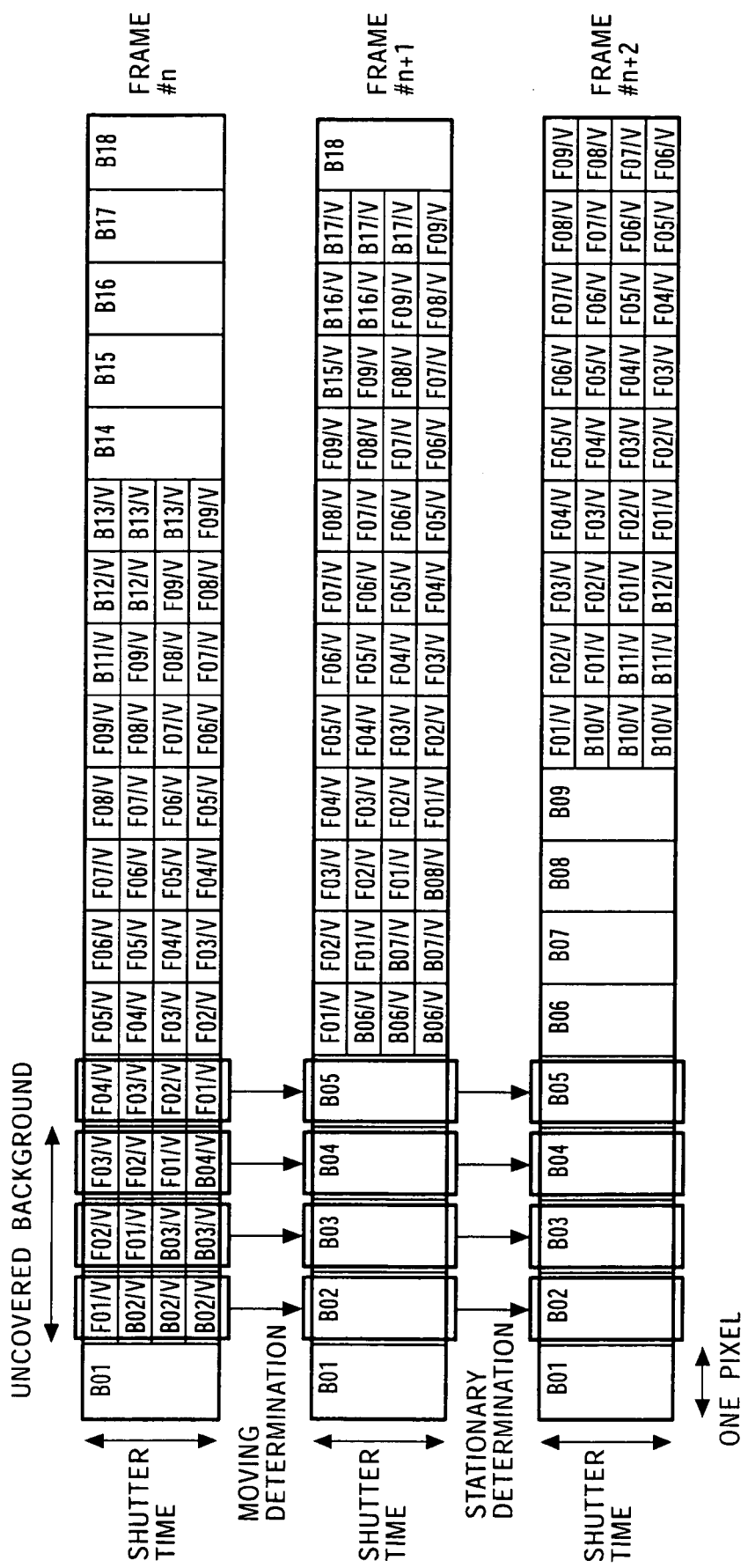
FIG. 24 illustrates a model in which pixel values are expanded in the time direction and the period corresponding to the shutter time is divided.

In FIG. 24, in frame #n in which the background is stationary and the amount of movement v in the foreground is 4, the pixels contained in an uncovered background area are the second through fourth pixels from the left. Since the amount of movement v is 4, the second through fourth pixels from the left in the subsequent frame #n+1 contain only background components and belong to the background area. In frame #n+2, which is subsequent to frame #n+1, the second through fourth pixels from the left contain only background components and belong to the background area.

Since the object corresponding to the background is stationary, the pixel value of the second pixel from the left in frame #n+2 does not change from the pixel value of the second pixel from the left in frame #n+1. Similarly, the pixel value of the third pixel from the left in frame #n+2 does not change from the pixel value of the third pixel from the left in frame #n+1, and the pixel value of the fourth pixel from the left in frame #n+2 does not change from the pixel value of the fourth pixel from the left in frame #n+1.

That is, the pixels in frame #n+1 and frame #n+2 corresponding to the pixels belonging to the uncovered background area in frame #n consist of only background components, and the pixel values thereof do not change. Accordingly, the absolute value of the difference between the pixel values is almost 0. Thus, the stationary/moving determination made for the pixels in frame #n+1 and frame #n+2 corresponding to the pixels belonging to the mixed area in frame #n by the stationary/moving determining portion 202-1 is "stationary".

Since the pixels belonging to the uncovered background area in frame #n contain foreground components, the pixel values thereof are different from those of frame #n+1 consisting of only background components. Accordingly, the stationary/moving determination made for the pixels belonging to the mixed area in frame #n and the corresponding pixels in frame #n+1 by the stationary/moving determining portion 202-2 is "moving".

When the stationary/moving determination result indicating "moving" is supplied from the stationary/moving determining portion 202-2, and when the stationary/moving determination result indicating "stationary" is supplied from the stationary/moving determining portion 202-1, as discussed above, the area determining portion 203-1 determines that the corresponding pixels belong to an uncovered background area.

FIG. 25 illustrates determination conditions for frame #n made by the area specifying unit 103. When the determination result for the pixel in frame #n−2 located at the same image position as a pixel in frame #n to be processed and for the pixel in frame #n−1 located at the same position as the pixel in frame #n is stationary, and when the determination result for the pixel in frame #n and the pixel in frame #n−1 located at the same image position as the pixel in frame #n is moving, the area specifying unit 103 determines that the pixel in frame #n belongs to a covered background area.

When the determination result for the pixel in frame #n and the pixel in frame #n−1 located at the same image position as the pixel in frame #n is stationary, and when the determination result for the pixel in frame #n and the pixel in frame #n+1 located at the same image position as the pixel in frame #n is stationary, the area specifying unit 103 determines that the pixel in frame #n belongs to the stationary area.

When the determination result for the pixel in frame #n and the pixel in frame #n−1 located at the same image position as the pixel in frame #n is moving, and when the determination result for the pixel in frame #n and the pixel in frame #n+1 located at the same image position as the pixel in frame #n is moving, the area specifying unit 103 determines that the pixel in frame #n belongs to the moving area.

When the determination result for the pixel in frame #n and the pixel in frame #n+1 located at the same image position as the pixel in frame #n is moving, and when the determination result for the pixel in frame #n+1 located at the same image position as the pixel in frame #n and the pixel in frame #n+2 located at the same image position as the pixel in frame #n is stationary, the area specifying unit 103 determines that the pixel in frame #n belongs to an uncovered background area.

Figure 26A:
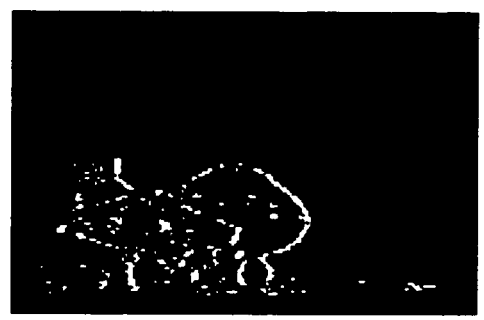
FIG. 26A illustrates an example of the result obtained by specifying the area by the area specifying unit 103.
Figure 26B:
FIG. 26B illustrates an example of the result obtained by specifying the area by the area specifying unit 103.

FIGS. 26A through 26D illustrate examples of the area determination results obtained by the area specifying unit 103. In FIG. 26A, the pixels which are determined to belong to a covered background area are indicated in white. In FIG. 26B, the pixels which are determined to belong to an uncovered background area are indicated in white.

Figure 26C:
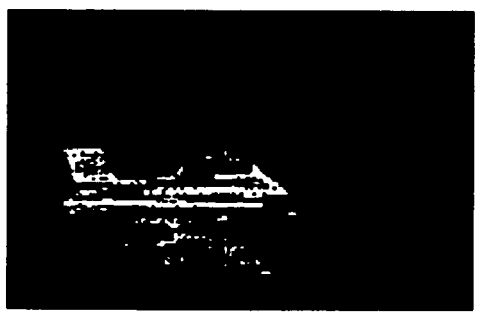
FIG. 26C illustrates an example of the result obtained by specifying the area by the area specifying unit 103.
Figure 26D:
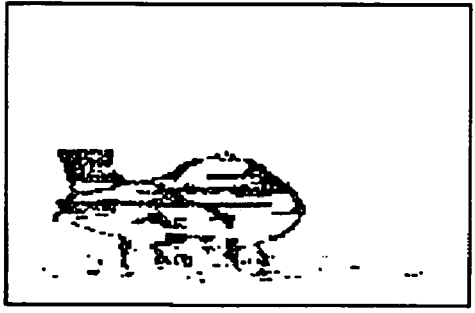
FIG. 26D illustrates an example of the result obtained by specifying the area by the area specifying unit 103.

In FIG. 26C, the pixels which are determined to belong to a moving area are indicated in white. In FIG. 26D, the pixels which are determined to belong to a stationary area are indicated in white.

Figure 27:
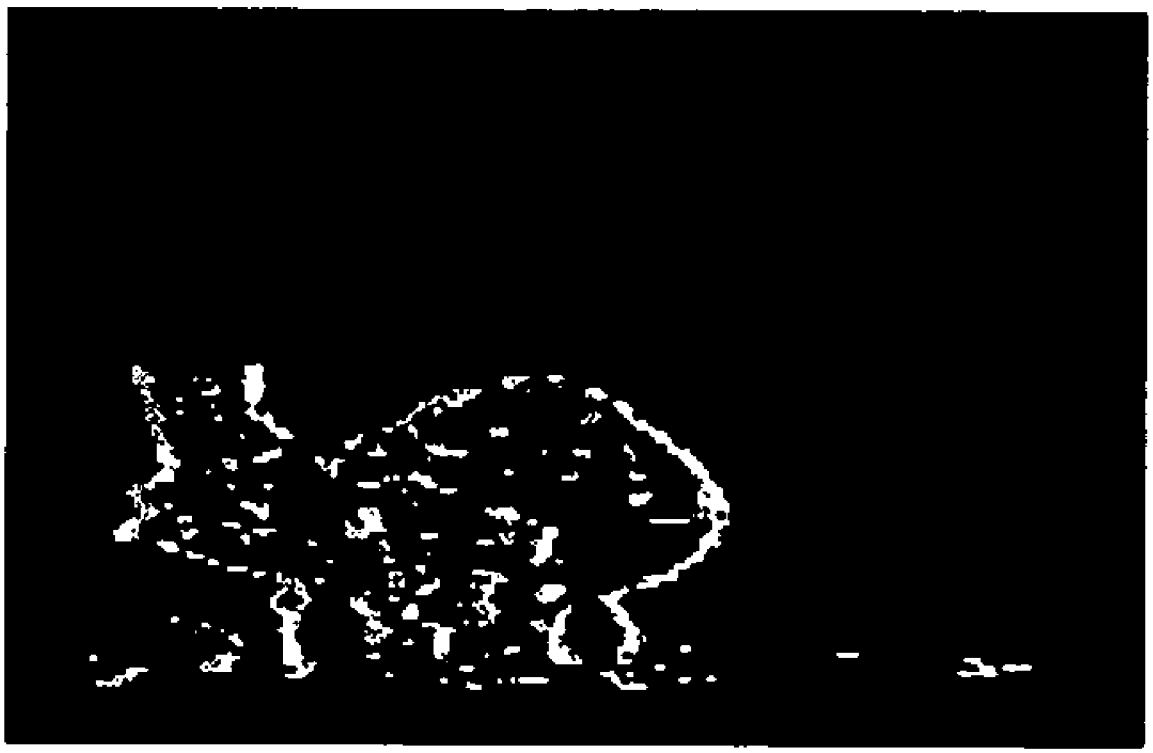
FIG. 27 illustrates an example of the result obtained by specifying the area by the area specifying unit 103.

FIG. 27 illustrates the area information indicating the mixed area, in the form of an image, selected from the area information output from the determining-flag-storing frame memory 206. In FIG. 27, the pixels which are determined to belong to the covered background area or the uncovered background area, i.e., the pixels which are determined to belong to the mixed area, are indicated in white. The area information indicating the mixed area output from the determining-flag-storing frame memory 206 designates the mixed area and the portions having a texture surrounded by the portions without a texture in the foreground area.

Figure 28:
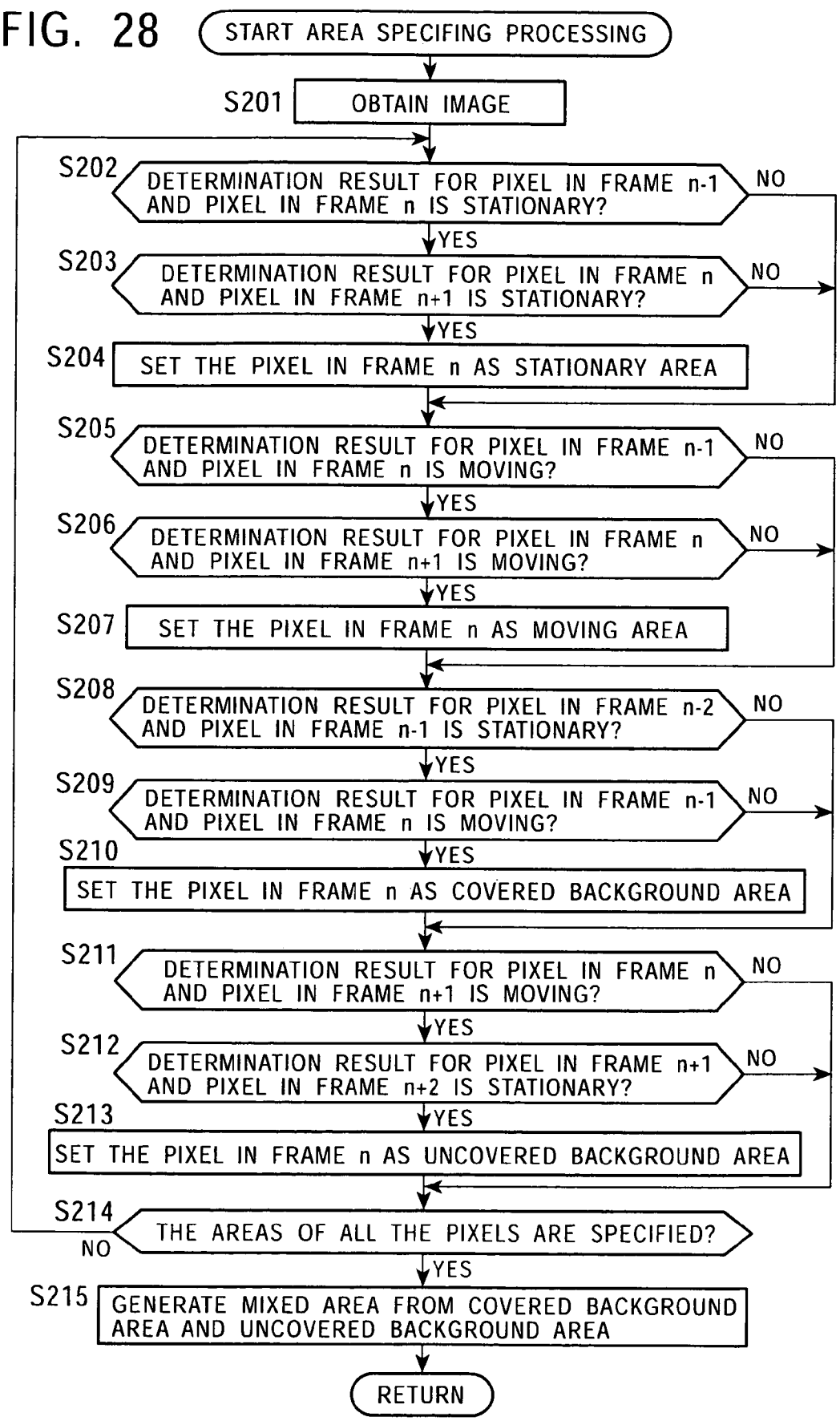
FIG. 28 is a flowchart illustrating the area specifying processing.

The area specifying processing performed by the area specifying unit 103 is described below with reference to the flowchart of FIG. 28. In step S201, the frame memory 201 obtains an image of frame #n−2 through frame #n+2 including frame #n.

In step S202, the stationary/moving determining portion 202-3 determines whether the determination result for the pixel in frame #n−1 and the pixel in frame #n located at the same position is stationary. If it is determined that the determination result is stationary, the process proceeds to step S203 in which the stationary/moving determining portion 202-2 determines whether the determination result for the pixel in frame #n and the pixel in frame #n+1 located at the same position is stationary.

If it is determined in step S203 that the determination result for the pixel in frame #n and the pixel in frame #n+1 located at the same position is stationary, the process proceeds to step S204. In step S204, the area determining portion 203-2 sets "1", which indicates that the pixel to be processed belongs to the stationary area, in the stationary-area determining flag associated with the pixel to be processed. The area determining portion 203-2 supplies the stationary-area determining flag to the determining-flag-storing frame memory 204, and the process proceeds to step S205.

If it is determined in step S202 that the determination result for the pixel in frame #n−1 and the pixel in frame #n located at the same position is moving, or if it is determined in step S203 that the determination result for the pixel in frame #n and the pixel in frame #n+1 located at the same position is moving, the pixel to be processed does not belong to a stationary area. Accordingly, the processing of step S204 is skipped, and the process proceeds to step S205.

In step S205, the stationary/moving determining portion 202-3 determines whether the determination result for the pixel in frame #n−1 and the pixel in frame #n located at the same position is moving. If it is determined that the determination result is moving, the process proceeds to step S206 in which the stationary/moving determining portion 202-2 determines whether the determination result for the pixel in frame #n and the pixel in frame #n+1 located at the same position is moving.

If it is determined in step S206 that the determination result for the pixel in frame #n and the pixel in frame #n+1 located at the same position is moving, the process proceeds to step S207. In step S207, the area determining portion 203-2 sets "1", which indicates that the pixel to be processed belongs to a moving area, in the moving-area determining flag associated with the pixel to be processed. The area determining area 203-2 supplies the moving-area determining flag to the determining-flag-storing frame memory 204, and the process proceeds to step S208.

If it is determined in step S205 that the determination result for the pixel in frame #n−1 and the pixel in frame #n located at the same position is stationary, or if it is determined in step S206 that the determination result for the pixel in frame #n and the pixel in frame #n+1 located at the same position is stationary, the pixel in frame #n does not belong to a moving area. Accordingly, the processing of step S207 is skipped, and the process proceeds to step S208.

In step S208, the stationary/moving determining portion 202-4 determines whether the determination result for the pixel in frame #n−2 and the pixel in frame #n−1 located at the same position is stationary. If it is determined that the determination result is stationary, the process proceeds to step S209 in which the stationary/moving determining portion 202-3 determines whether the determination result for the pixel in frame #n−1 and the pixel in frame #n located at the same position is moving.

If it is determined in step S209 that the determination result for the pixel in frame #n−1 and the pixel in frame #n located at the same position is moving, the process proceeds to step S210. In step S210, the area determining portion 203-3 sets "1", which indicates that the pixel to be processed belongs to a covered background area, in the covered-background-area determining flag associated with the pixel to be processed. The area determining portion 203-3 supplies the covered-background-area determining flag to the determining-flag-storing frame memory 204, and the process proceeds to step S211.

If it is determined in step S208 that the determination result for the pixel in frame #n−2 and the pixel in frame #n−1 located at the same position is moving, or if it is determined in step S209 that the pixel in frame #n−1 and the pixel in frame #n located at the same position is stationary, the pixel in frame #n does not belong to a covered background area. Accordingly, the processing of step S210 is skipped, and the process proceeds to step S211.

In step S211, the stationary/moving determining portion 202-2 determines whether the determination result for the pixel in frame #n and the pixel in frame #n+1 located at the same position is moving. If it is determined in step S211 that the determination result is moving, the process proceeds to step S212 in which the stationary/moving determining portion 202-1 determines whether the determination result for the pixel in frame #n+1 and the pixel in frame #n+2 located at the same position is stationary.

If it is determined in step S212 that the determination result for the pixel in frame #n+1 and the pixel in frame #n+2 located at the same position is stationary, the process proceeds to step S213. In step S213, the area determining portion 203-1 sets "1", which indicates that the pixel to be processed belongs to an uncovered background area, in the uncovered-background-area determining flag associated with the pixel to be processed. The area determining portion 203-1 supplies the uncovered-background-flag determining flag to the determining-flag-storing frame memory 204, and the process proceeds to step S214.

If it is determined in step S211 that the determination result for the pixel in frame #n and the pixel in frame #n+1 located at the same position is stationary, or if it is determined in step S212 that the determination result for the pixel in frame #n+1 and the pixel in frame #n+2 is moving, the pixel in frame #n does not belong to an uncovered background area. Accordingly, the processing of step S213 is skipped, and the process proceeds to step S214.

In step S214, the area specifying unit 103 determines whether the areas of all the pixels in frame #n are specified. If it is determined that the areas of all the pixels in frame #n are not yet specified, the process returns to step S202, and the area specifying processing is repeated for the remaining pixels.

If it is determined in step S214 that the areas of all the pixels in frame #n are specified, the process proceeds to step S215. In step S215, the synthesizer 205 generates area information indicating the mixed area based on the uncovered-background-area determining flag and the covered-background-area determining flag stored in the determining-flag-storing frame memory 204, and also generates area information indicating to which of the uncovered background area, the stationary area, the moving area, or the covered background area each pixel belongs, and sets the generated area information in the determining-flag-storing frame memory 206. The processing is then completed.

As discussed above, the area specifying unit 103 is capable of generating area information indicating to which of the moving area, the stationary area, the uncovered background area, or the covered background area each of the pixels contained in a frame belongs.

The area specifying unit 103 may apply logical OR to the area information corresponding to the uncovered background area and the area information corresponding to the covered background area so as to generate area information corresponding to the mixed area, and then may generate area information consisting of flags indicating to which of the moving area, the stationary area, or the mixed area the individual pixels contained in the frame belong.

When the object corresponding to the foreground has a texture, the area specifying unit 103 is able to specify the moving area more precisely.

The area specifying unit 103 is able to output the area information indicating the moving area as the area information indicating the foreground area, and outputs the area information indicating the stationary area as the area information indicating the background area.

The embodiment has been described, assuming that the object corresponding to the background is stationary. However, the above-described area specifying processing can be applied even if the image corresponding to the background area contains motion. For example, if the image corresponding to the background area is uniformly moving, the area specifying unit 103 shifts the overall image in accordance with this motion, and performs processing in a manner similar to the case in which the object corresponding to the background is stationary. If the image corresponding to the background area contains locally different motions, the area specifying unit 103 selects the pixels corresponding to the motions, and executes the above-described processing.

Figure 29:
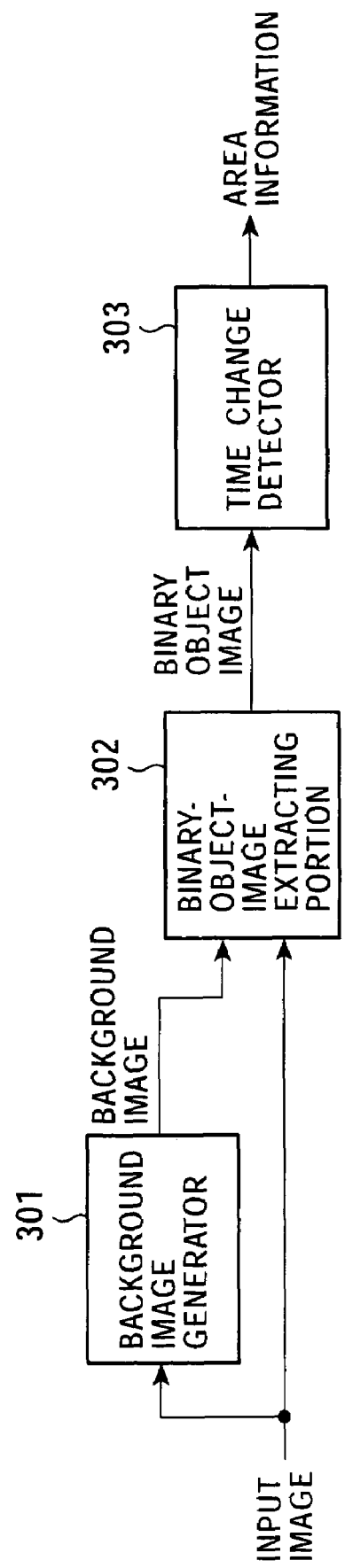
FIG. 29 is a block diagram illustrating another example of the configuration of the area specifying unit 103.

FIG. 29 is a block diagram illustrating another example of the configuration of the area specifying unit 103. The area specifying unit 103 shown in FIG. 29 does not use a motion vector. A background image generator 301 generates a background image corresponding to an input image, and supplies the generated background image to a binary-object-image extracting portion 302. The background image generator 301 extracts, for example, an image object corresponding to a background object contained in the input image, and generates the background image.

Figure 30:
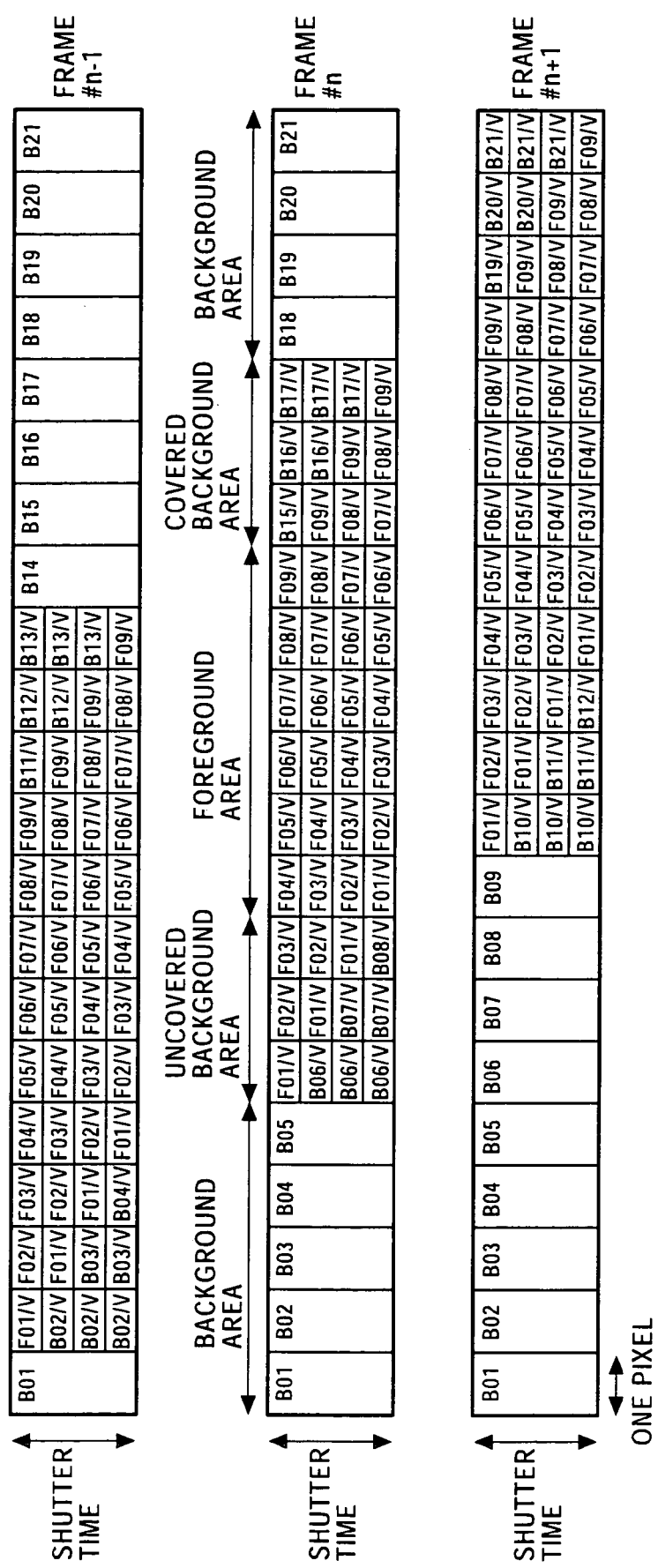
FIG. 30 illustrates a model in which pixel values are expanded in the time direction and the period corresponding to the shutter time is divided.

An example of a model obtained by expanding in the time direction the pixel values of pixels aligned side-by-side in the moving direction of an image corresponding to a foreground object is shown in FIG. 30. For example, if the moving direction of the image corresponding to the foreground object is horizontal with respect to the screen, the model shown in FIG. 30 is a model obtained by expanding the pixel values of pixels disposed side-by-side on a single line in the time domain.

In FIG. 30, the line in frame #n is the same as the line in frame #n−1 and the line in frame #n+1.

In frame #n, the foreground components corresponding to the object contained in the sixth through seventeenth pixels from the left are contained in the second through thirteenth pixels from the left in frame #n−1 and are also contained in the tenth through twenty-first pixel from the left in frame #n+1.

In frame #n−1, the pixels belonging to the covered background area are the eleventh through thirteenth pixels from the left, and the pixels belonging to the uncovered background area are the second through fourth pixels from the left. In frame #n, the pixels belonging to the covered background area are the fifteenth through seventeenth pixels from the left, and the pixels belonging to the uncovered background area are the sixth through eighth pixels from the left. In frame #n+1, the pixels belonging to the covered background area are the nineteenth through twenty-first pixels from the left, and the pixels belonging to the uncovered background area are the tenth through twelfth pixels from the left.

In frame #n−1, the pixels belonging to the background area are the first pixel from the left, and the fourteenth through twenty-first pixels from the left. In frame #n, the pixels belonging to the background area are the first through fifth pixels from the left, and the eighteenth through twenty-first pixels from the left. In frame #n+1, the pixels belonging to the background area are the first through ninth pixels from the left.

Figure 31:
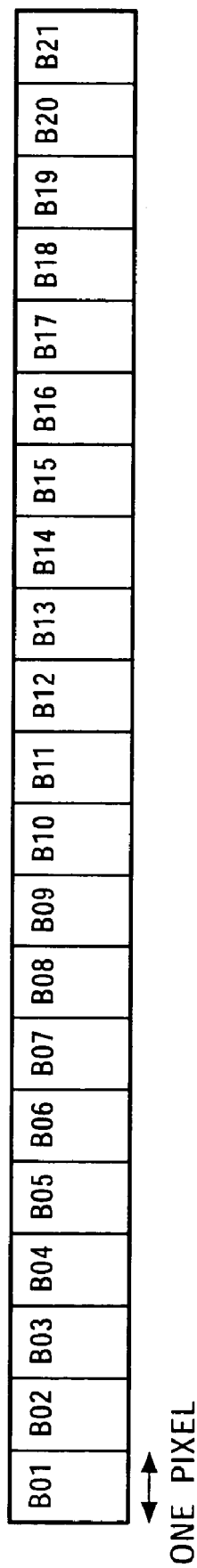
FIG. 31 illustrates an example of a background image.

An example of the background image corresponding to the example shown in FIG. 30 generated by the background image generator 301 is shown in FIG. 31. The background image consists of the pixels corresponding to the background object, and does not contain image components corresponding to the foreground object.

The binary-object-image extracting portion 302 generates a binary object image based on the correlation between the background image and the input image, and supplies the generated binary object image to a time change detector 303.

Figure 32:
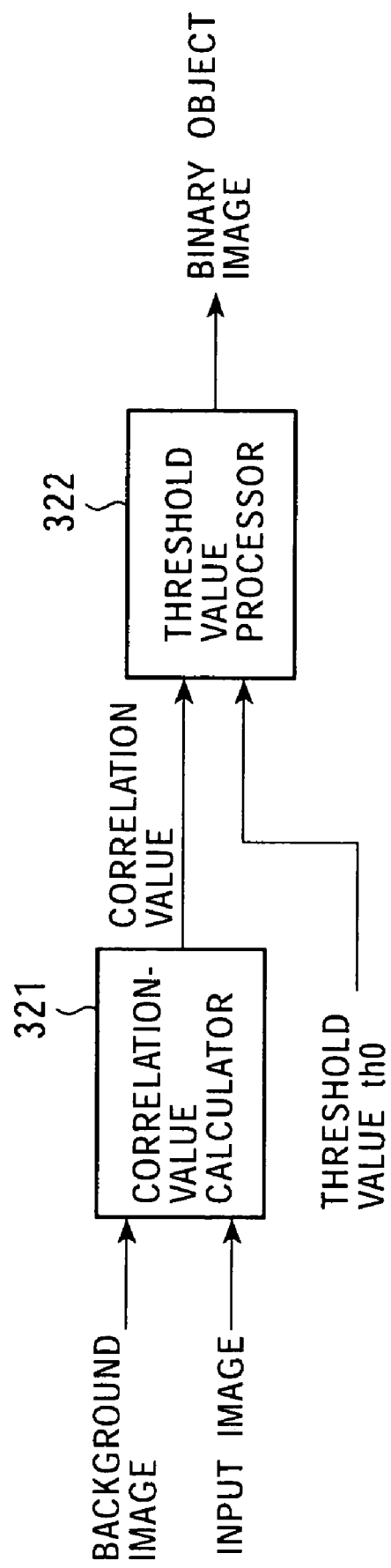
FIG. 32 is a block diagram illustrating the configuration of a binary-object-image extracting portion 302.

FIG. 32 is a block diagram illustrating the configuration of the binary-object-image extracting portion 302. A correlation-value calculator 321 calculates the correlation between the background image supplied from the background image generator 301 and the input image so as to generate a correlation value, and supplies the generated correlation value to a threshold-value processor 322.

The correlation-value calculator 321 applies equation (4) to, for example, 3×3-background image blocks having $X_4$ at the center, as shown in FIG. 33A, and to, for example, 3×3-background image blocks having $Y_4$ at the center which corresponds to the background image blocks, as shown in FIG. 33B, thereby calculating a correlation value corresponding to $Y_4$.

$$\text{Correlation value} = \frac{\sum_{i=0}^{8}(Xi-\overline{X})\sum_{i=0}^{8}(Yi-\overline{Y})}{\sqrt{\sum_{i=0}^{8}(Xi-\overline{X})^2 \cdot \sum_{i=0}^{8}(Yi-\overline{Y})^2}} \quad (4)$$

$$\overline{X} = \frac{\sum_{i=0}^{8} Xi}{9} \quad (5)$$

$$\overline{Y} = \frac{\sum_{i=0}^{8} Yi}{9} \quad (6)$$

The correlation-value calculator 321 supplies the correlation value calculated for each pixel as discussed above to the threshold-value processor 322.

Alternatively, the correlation-value calculator 321 may apply equation (7) to, for example, 3×3-background image blocks having $X_4$ at the center, as shown in FIG. 34A, and to, for example, 3×3-background image blocks having $Y_4$ at the center which corresponds to the background image blocks, as shown in FIG. 34B, thereby calculating the sum of absolute values of differences corresponding to $Y_4$.

$$\text{Sum of absolute values of differences} = \sum_{i=0}^{8} |(Xi - Yi)| \quad (7)$$

The correlation-value calculator 321 supplies the sum of the absolute values of the differences calculated as described above to the threshold-value processor 322 as the correlation value.

The threshold-value processor 322 compares the pixel value of the correlation image with a threshold th0. If the correlation value is smaller than or equal to the threshold th0, 1 is set in the pixel value of the binary object image. If the correlation value is greater than the threshold th0, 0 is set in the pixel value of the binary object image. The threshold-value processor 322 then outputs the binary object image whose pixel value is set to 0 or 1. The threshold-value processor 322 may store the threshold th0 therein in advance, or may use the threshold th0 input from an external source.

Figure 35:
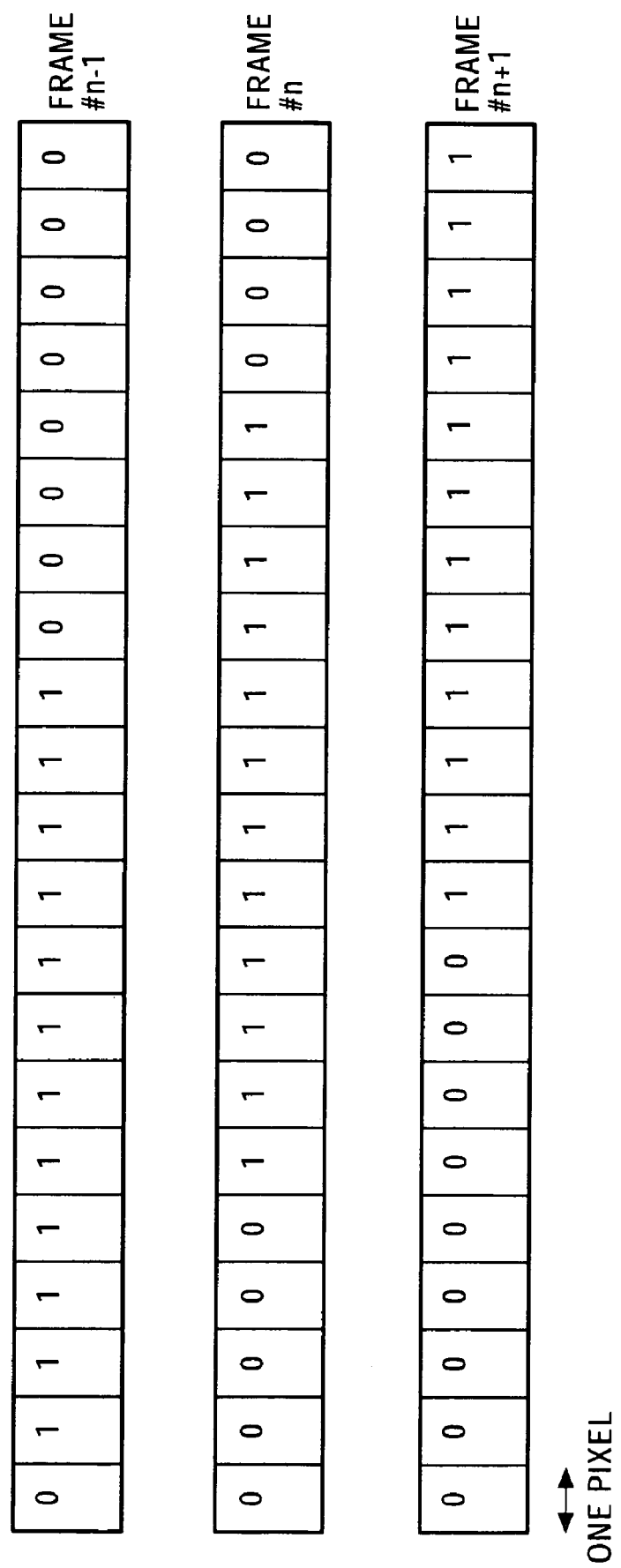
FIG. 35 illustrates an example of the binary object image.

FIG. 35 illustrates the binary object image corresponding to the model of the input image shown in FIG. 30. In the binary object image, 0 is set in the pixel values of the pixels having a higher correlation with the background image.

Figure 36:
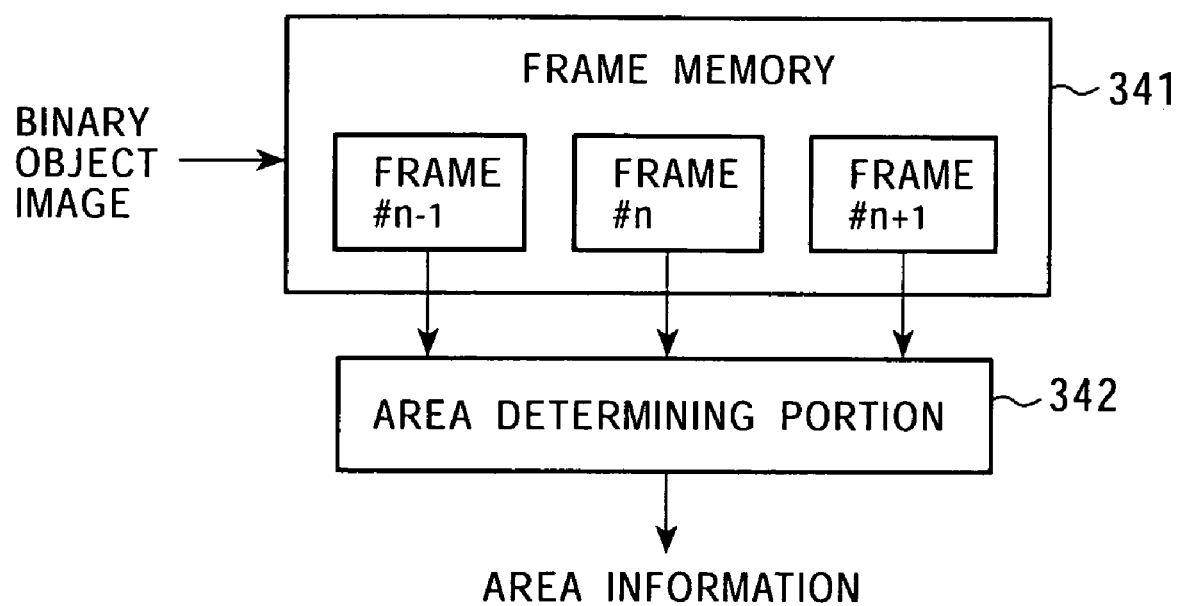
FIG. 36 is a block diagram illustrating the configuration of a time change detector 303.

FIG. 36 is a block diagram illustrating the configuration of the time change detector 303. When determining the area of a pixel in frame #n, a frame memory 341 stores a binary object image of frame #n−1, frame #n, and frame #n+1 supplied from the binary-object-image extracting portion 302.

An area determining portion 342 determines the area of each pixel of frame #n based on the binary object image of frame #n−1, frame #n, and frame #n+1 so as to generate area information, and outputs the generated area information.

FIG. 37 illustrates the determinations made by the area determining portion 342. When the designated pixel of the binary object image in frame #n is 0, the area determining portion 342 determines that the designated pixel in frame #n belongs to the background area.

When the designated pixel of the binary object image in frame #n is 1, and when the corresponding pixel of the binary object image in frame #n−1 is 1, and when the corresponding pixel of the binary object image in frame #n+1 is 1, the area determining portion 342 determines that the designated pixel in frame #n belongs to the foreground area.

When the designated pixel of the binary object image in frame #n is 1, and when the corresponding pixel of the binary object image in frame #n−1 is 0, the area determining portion 342 determines that the designated pixel in frame #n belongs to a covered background area.

When the designated pixel of the binary object image in frame #n is 1, and when the corresponding pixel of the binary object image in frame #n+1 is 0, the area determining portion 342 determines that the designated pixel in frame #n belongs to an uncovered background area.

Figure 38:
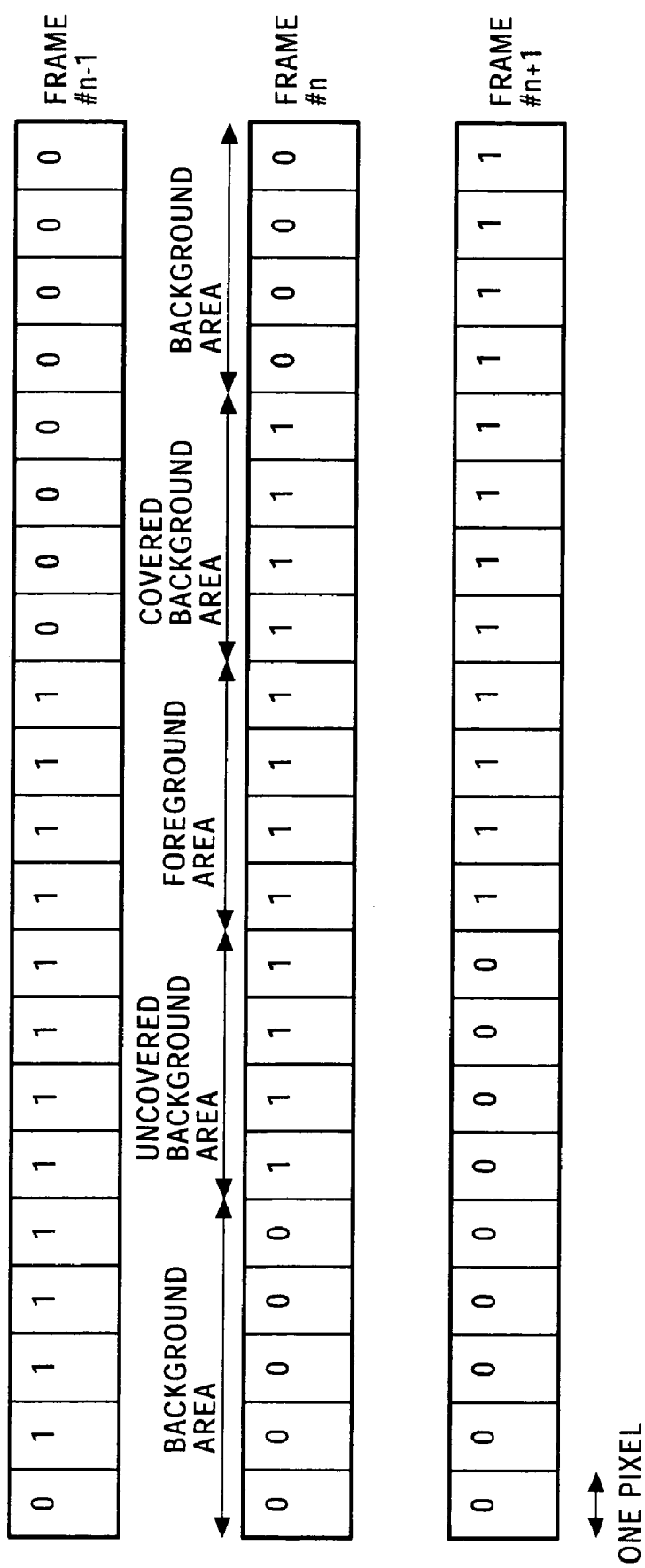
FIG. 38 illustrates an example of determinations made by the time change detector 303.

FIG. 38 illustrates an example of the determinations made by the time change detector 303 on the binary object image corresponding to the model of the input image shown in FIG. 30. The time change detector 303 determines that the first through fifth pixels from the left in frame #n belong to the background area since the corresponding pixels of the binary object image in frame #n are 0.

The time change detector 303 determines that the sixth through ninth pixels from the left belong to the uncovered background area since the pixels of the binary object image in frame #n are 1, and the corresponding pixels in frame #n+1 are 0.

The time change detector 303 determines that the tenth through thirteenth pixels from the left belong to the foreground area since the pixels of the binary object image in frame #n are 1, the corresponding pixels in frame #n−1 are 1, and the corresponding pixels in frame #n+1 are 1.

The time change detector 303 determines that the fourteenth through seventeenth pixels from the left belong to the covered background area since the pixels of the binary object image in frame #n are 1, and the corresponding pixels in frame #n−1 are 0.

The time change detector 303 determines that the eighteenth through twenty-first pixels from the left belong to the background area since the corresponding pixels of the binary object image in frame #n are 0.

Figure 39:
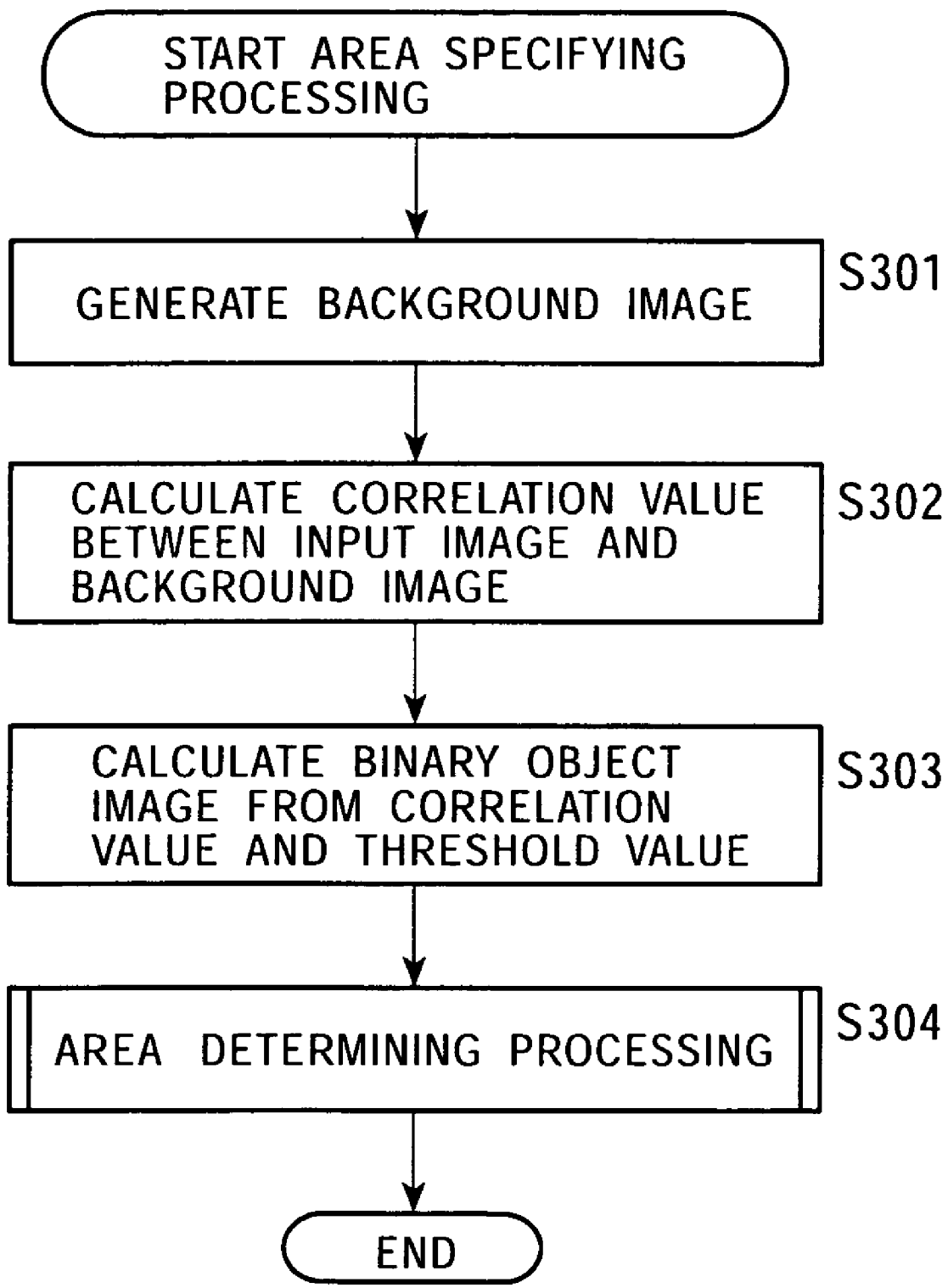
FIG. 39 is a flowchart illustrating the area specifying processing performed by the area specifying unit 103.

The area specifying processing performed by the area specifying unit 103 is described below with reference to the flowchart of FIG. 39. In step S301, the background image generator 301 of the area specifying unit 103 extracts, for example, an image object corresponding to a background object contained in an input image based on the input image so as to generate a background image, and supplies the generated background image to the binary-object-image extracting portion 302.

In step S302, the binary-object-image extracting portion 302 calculates a correlation value between the input image and the background image supplied from the background image generator 301 according to, for example, calculation discussed with reference to FIGS. 33A and 33B. In step S303, the binary-object-image extracting portion 302 computes a binary object image from the correlation value and the threshold th0 by, for example, comparing the correlation value with the threshold th0.

In step S304, the time change detector 303 executes the area determining processing, and the processing is completed.

Figure 40:
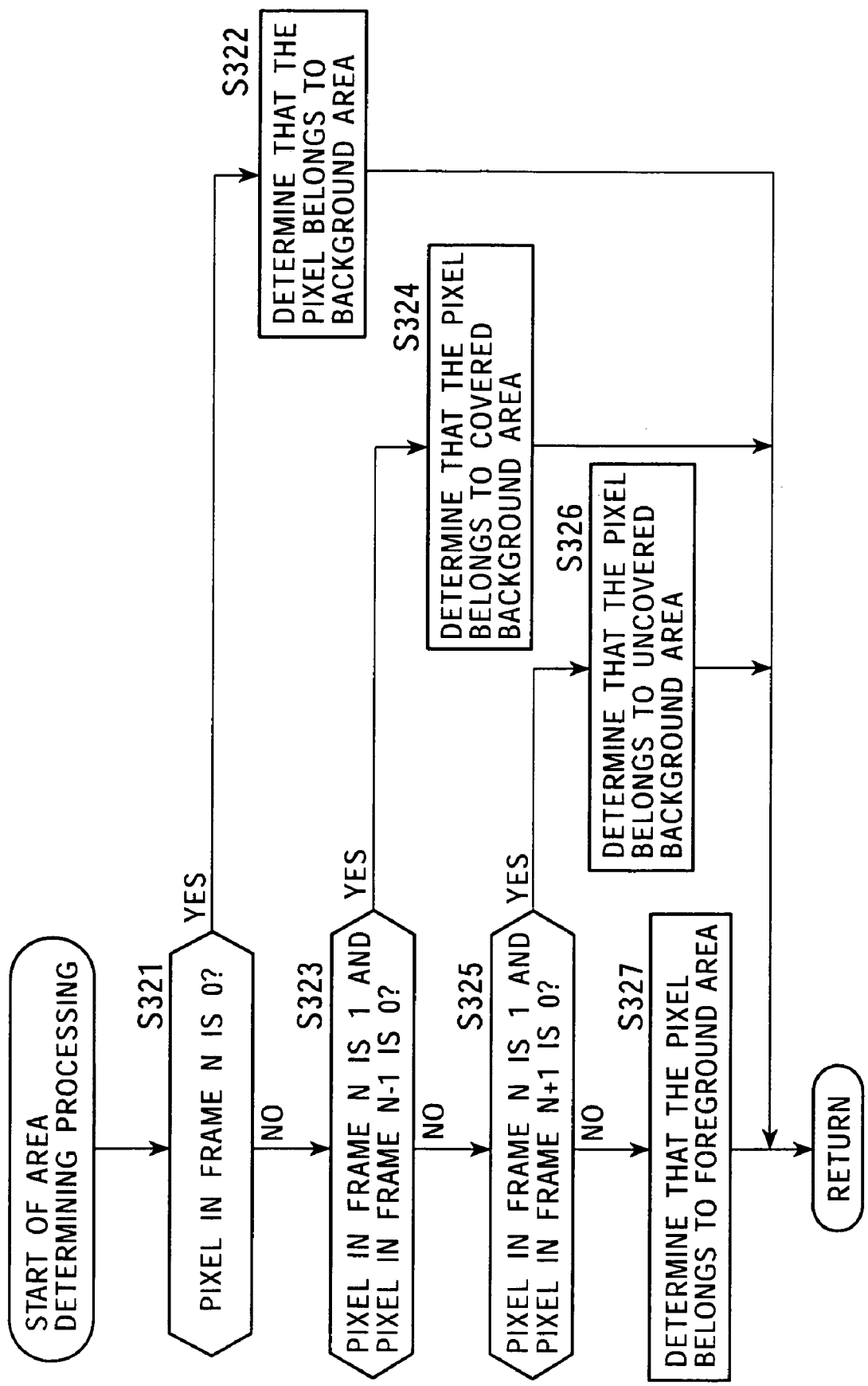
FIG. 40 is a flowchart illustrating details of the area specifying processing.

Details of the area determining processing in step S304 are described below with reference to the flowchart of FIG. 40. In step S321, the area determining portion 342 of the time change detector 303 determines whether the designated pixel in frame #n stored in the frame memory 341 is 0. If it is determined that the designated pixel in frame #n is 0, the process proceeds to step S322. In step S322, it is determined that the designated pixel in frame #n belongs to the background area, and the processing is completed.

If it is determined in step S321 that the designated pixel in frame #n is 1, the process proceeds to step S323. In step S323, the area determining portion 342 of the time change detector 303 determines whether the designated pixel in frame #n stored in the frame memory 341 is 1, and whether the corresponding pixel in frame #n−1 is 0. If it is determined that the designated pixel in frame #n is 1 and the corresponding pixel in frame #n−1 is 0, the process proceeds to step S324. In step S324, it is determined that the designated pixel in frame #n belongs to the covered background area, and the processing is completed.

If it is determined in step S323 that the designated pixel in frame #n is 0, or that the corresponding pixel in frame #n−1 is 1, the process proceeds to step S325. In step S325, the area determining portion 342 of the time change detector 303 determines whether the designated pixel in frame #n stored in the frame memory 341 is 1, and whether the corresponding pixel in frame #n+1 is 0. If it is determined that the designated pixel in frame #n is 1 and the corresponding pixel in frame #n+1 is 0, the process proceeds to step S326. In step S326, it is determined that the designated pixel in frame #n belongs to the uncovered background area, and the processing is completed.

If it is determined in step S325 that the designated pixel in frame #n is 0, or that the corresponding pixel in frame #n+1 is 1, the process proceeds to step S327. In step S327, the area determining portion 342 of the time change detector 303 determines that the designated pixel in frame #n belongs to the foreground area, and the processing is completed.

As discussed above, the area specifying unit 103 is able to specify, based on the correlation value between the input image and the corresponding background image, to which of the foreground area, the background area, the covered background area, or the uncovered background area each pixel of the input image belongs, and generates area information corresponding to the specified result.

Figure 41:
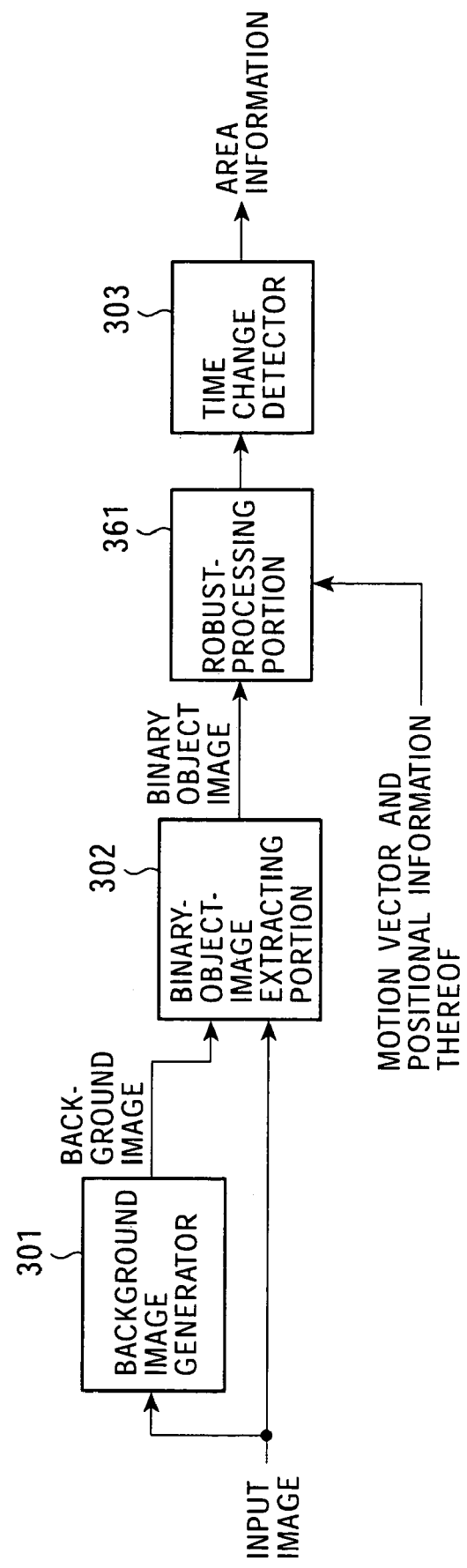
FIG. 41 is a block diagram illustrating still another configuration of the area specifying unit 103.

FIG. 41 is a block diagram illustrating another configuration of the area specifying unit 103. The area specifying unit 103 shown in FIG. 41 uses a motion vector and positional information thereof supplied from the motion detector 102. The same elements as those shown in FIG. 29 are designated with like reference numerals, and an explanation thereof is thus omitted.

A robust-processing portion 361 generates a robust binary object image based on binary object images of N frames supplied from the binary-object-image extracting portion 302, and outputs the robust binary object image to the time change detector 303.

Figure 42:
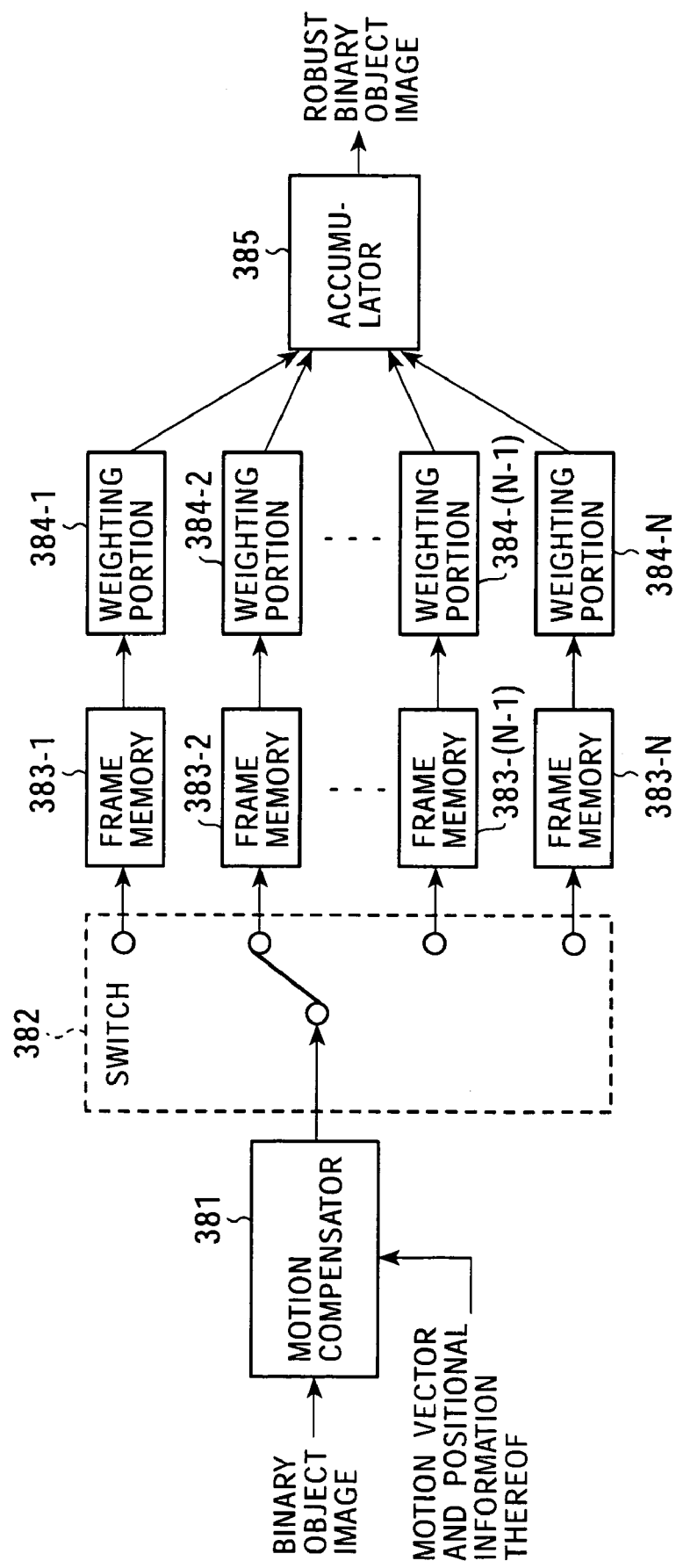
FIG. 42 is a block diagram illustrating the configuration of a robust-processing portion 361.

FIG. 42 is a block diagram illustrating the configuration of the robust-processing portion 361. A motion compensator 381 compensates for the motion of the binary object images of N frames based on the motion vector and the positional information thereof supplied from the motion detector 102, and outputs a motion-compensated binary object image to a switch 382.

Figure 43:
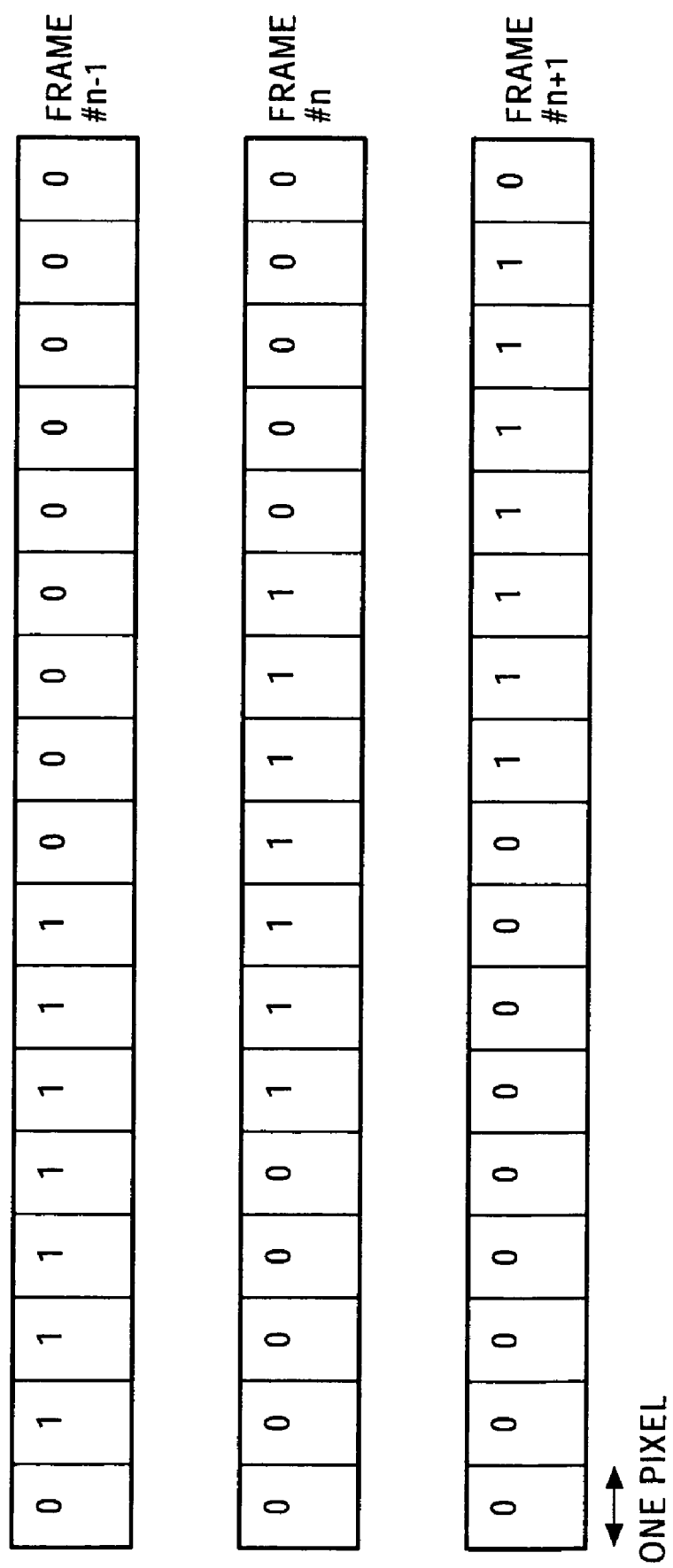
FIG. 43 illustrates motion compensation performed by a motion compensator 381.
Figure 44:
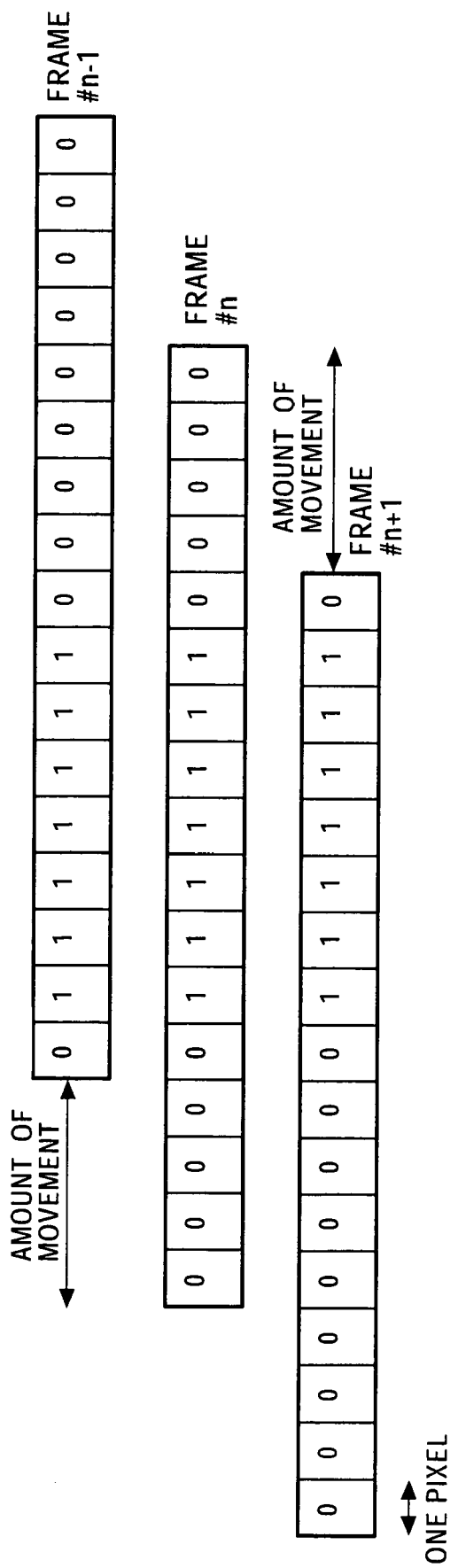
FIG. 44 illustrates motion compensation performed by the motion compensator 381.

The motion compensation performed by the motion compensator 381 is discussed below with reference to examples shown in FIGS. 43 and 44. It is now assumed, for example, that the area in frame #n is to be processed. When binary object images of frame #n−1, frame #n, and frame #n+1 shown in FIG. 43 are input, the motion compensator 381 compensates for the motion of the binary object image of frame #n−1 and the binary object image of frame #n+1, as indicated by the example shown in FIG. 44, based on the motion vector supplied from the motion detector 102, and supplies the motion-compensated binary object images to the switch 38.2.

The switch 382 outputs the motion-compensated binary object image of the first frame to a frame memory 383-1, and outputs the motion-compensated binary object image of the second frame to a frame memory 383-2. Similarly, the switch 382 outputs the motion-compensated binary object images of the third through (N−1)-th frame to frame memories 383-3 through 383-(N−1), and outputs the motion-compensated binary object image of the N-th frame to a frame memory 383-N.

The frame memory 383-1 stores the motion-compensated binary object image of the first frame, and outputs the stored binary object image to a weighting portion 384-1. The frame memory 383-2 stores the motion-compensated binary object image of the second frame, and outputs the stored binary object image to a weighting portion 384-2.

Similarly, the frame memories 383-3 through 383-(N−1) store the motion-compensated binary object images of the third through (N−1)-th frames, and outputs the stored binary object images to weighting portions 384-3 through 384-(N−1). The frame memory 383-N stores the motion-compensated binary object image of the N-th frame, and outputs the stored binary object image to a weighting portion 384-N.

The weighting portion 384-1 multiplies the pixel value of the motion-compensated binary object image of the first frame supplied from the frame memory 383-1 by a predetermined weight w1, and supplies a weighted binary object image to an accumulator 385. The weighting portion 384-2 multiplies the pixel value of the motion-compensated binary object image of the second frame supplied from the frame memory 383-2 by a predetermined weight w2, and supplies the weighted binary object image to the accumulator 385.

Likewise, the weighting portions 384-3 through 384-(N−1) multiply the pixel values of the motion-compensated binary object images of the third through (N−1)-th frames supplied from the frame memories 383-3 through 383-(N−1) by predetermined weights w3 through w(N−1), and supplies the weighted binary object images to the accumulator 385. The weighting portion 384-N multiplies the pixel value of the motion-compensated binary object image of the N-th frame supplied from the frame memory 383-N by a predetermined weight wN, and supplies the weighted binary object image to the accumulator 385.

The accumulator 385 accumulates the pixel values of the motion-compensated binary object images multiplied by the weights w1 through wN of the first through N-th frames, and compares the accumulated pixel value with the predetermined threshold th0, thereby generating the binary object image.

As discussed above, the robust-processing portion 361 generates a robust binary object image from N binary object images, and supplies it to the time change detector 303. Accordingly, the area specifying unit 103 configured as shown in FIG. 41 is able to specify the area more precisely than that shown in FIG. 29 even if noise is contained in the input image.

The area specifying processing performed by the area specifying unit 103 configured as shown in FIG. 41 is described below with reference to the flowchart of FIG. 45. The processings of step S341 through step S343 are similar to those of step S301 through step S303 discussed with reference to the flowchart of FIG. 39, and an explanation thereof is thus omitted.

In step S344, the robust-processing portion 361 performs the robust processing.

In step S345, the time change detector 303 performs the area determining processing, and the processing is completed. Details of the processing of step S345 are similar to the processing discussed with reference to the flowchart of FIG. 40, and an explanation thereof is thus omitted.

Figure 45:
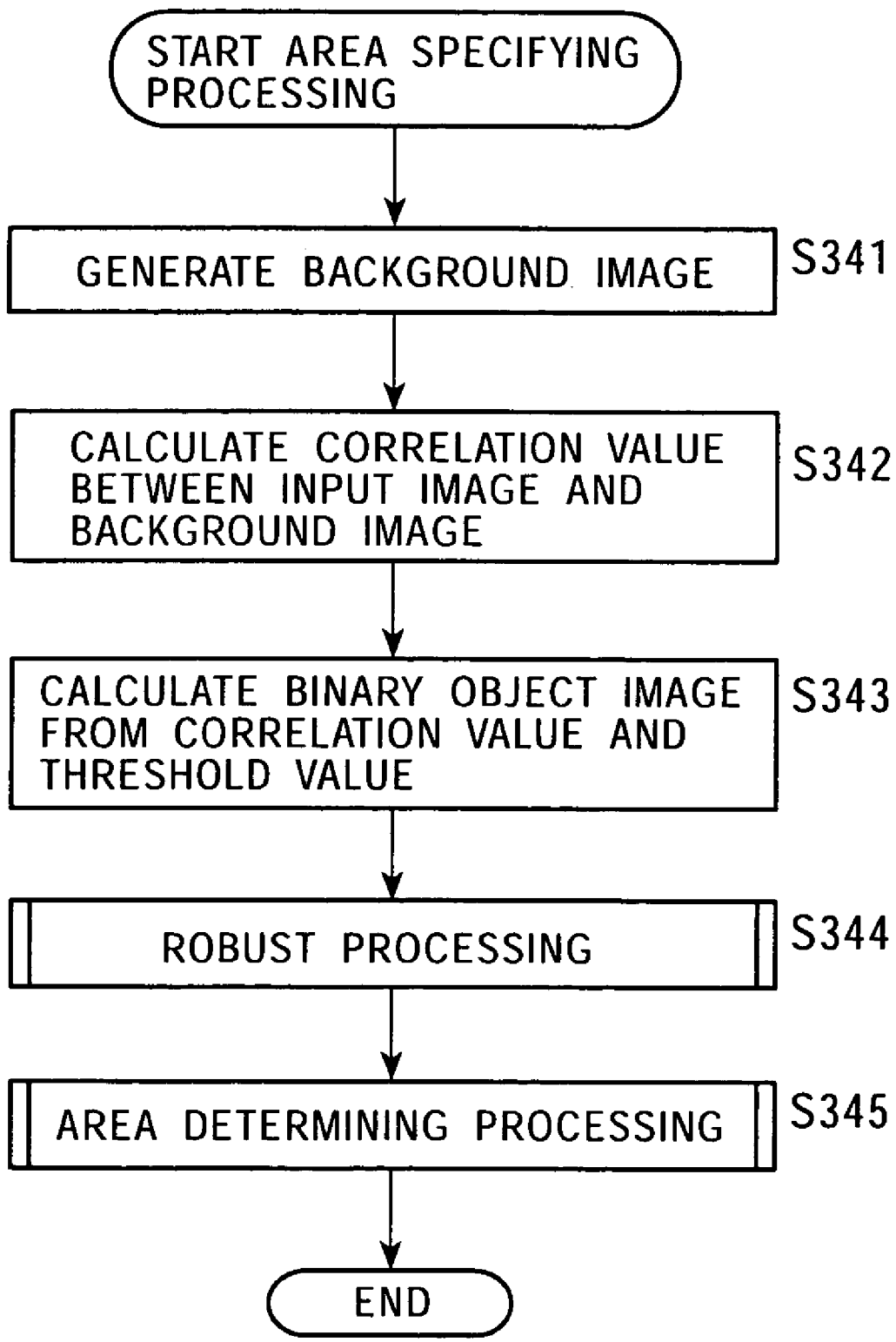
FIG. 45 is a flowchart illustrating the area specifying processing.
Figure 46:
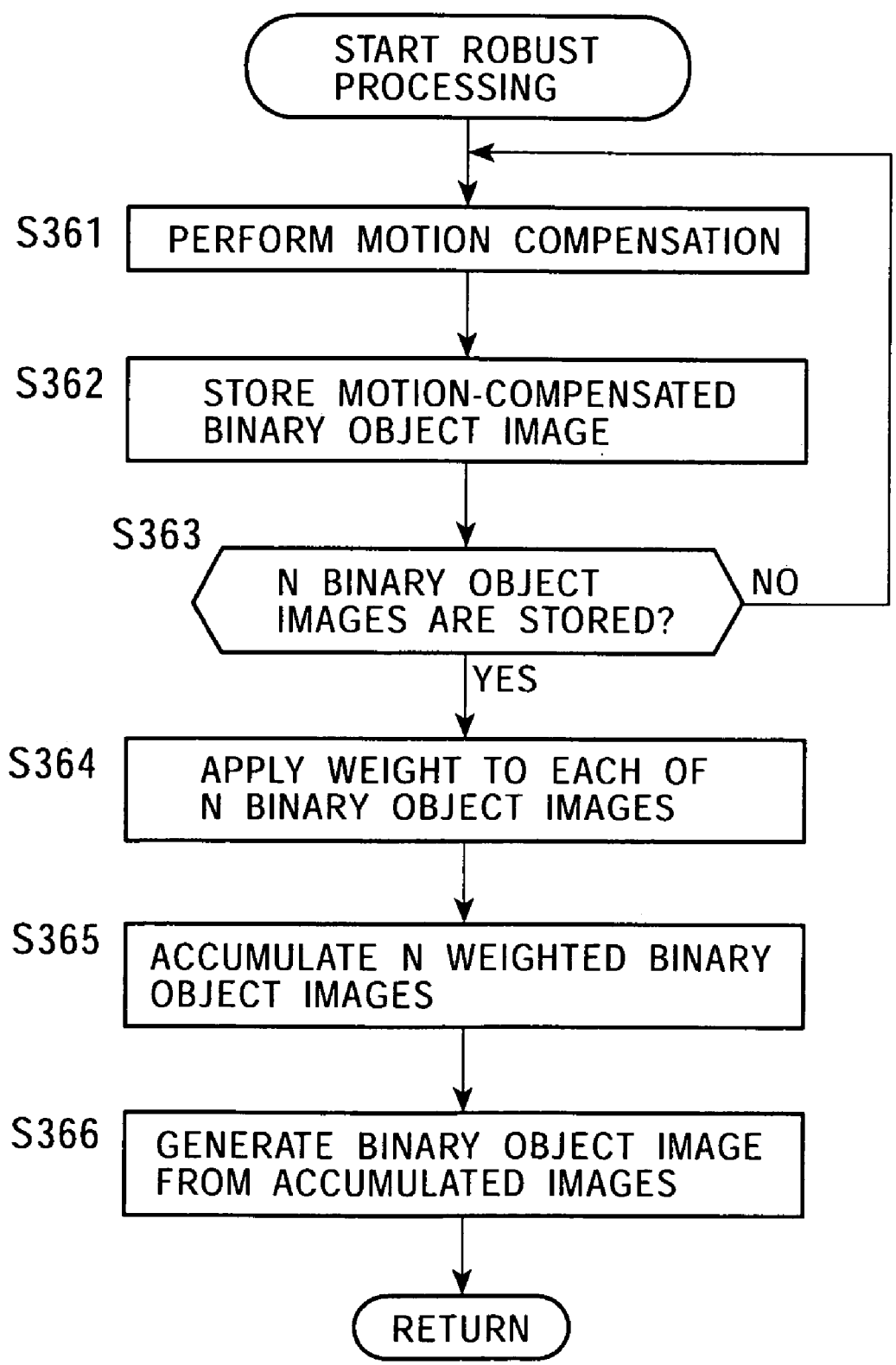
FIG. 46 is a flowchart illustrating details of the robust processing.

Details of the robust processing corresponding to the processing of step S344 in FIG. 45 are given below with reference to the flowchart of FIG. 46. In step S361, the motion compensator 381 performs the motion compensation of an input binary object image based on the motion vector and the positional information thereof supplied from the motion detector 102. In step S362, one of the frame memories 383-1 through 383-N stores the corresponding motion-compensated binary object image supplied via the switch 382.

In step S363, the robust-processing portion 361 determines whether N binary object images are stored. If it is determined that N binary object images are not stored, the process returns to step S361, and the processing for compensating for the motion of the binary object image and the processing for storing the binary object image are repeated.

If it is determined in step S363 that N binary object images are stored, the process proceeds to step S364 in which weighting is performed. In step S364, the weighting portions 384-1 through 384-N multiply the corresponding N binary object images by the weights w1 through wN.

In step S365, the accumulator 385 accumulates the N weighted binary object images.

In step S366, the accumulator 385 generates a binary object image from the accumulated images by, for example, comparing the accumulated value with a predetermined threshold th1, and the processing is completed.

As discussed above, the area specifying unit 103 configured as shown in FIG. 41 is able to generate area information based on the robust binary object image.

As is seen from the foregoing description, the area specifying unit 103 is able to generate area information indicating to which of the moving area, the stationary area, the uncovered background area, or the covered background area each pixel contained in a frame belongs.

Figure 47:
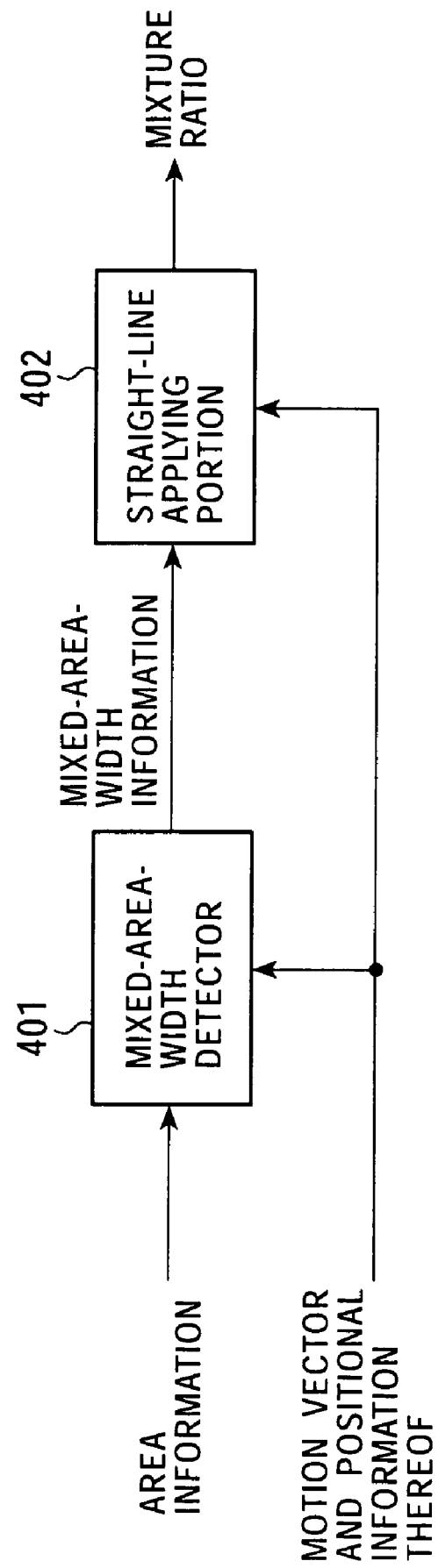
FIG. 47 is a block diagram illustrating the configuration of a mixture-ratio calculator 104.

FIG. 47 is a block diagram illustrating the configuration of the mixture-ratio calculator 104. A mixed-area-width detector 401 detects the width of the mixed area to which the designated pixel belongs by using the pixel interval as the unit based on the area information supplied from the area specifying unit 103 and the motion vector and the positional information thereof supplied from the motion detector 102. The mixed-area-width detector 401 supplies the detected width to a straight-line applying portion 402 as the mixed-area-width information.

The straight-line applying portion 402 calculates the ratio of the width of the mixed area to the distance from the designated pixel to the pixel positioned at the edge of the mixed area based on the mixed-area-width information supplied from the mixed-area-width detector 401 and the motion vector and the positional information thereof supplied from the motion detector 102. The straight-line applying portion 402 calculates the mixture ratio α of the designated pixel based on the ratio of the width of the mixed area to the distance from the designated pixel to the pixel positioned at the edge of the mixed area.

Since it can be assumed that the object corresponding to the foreground is moving with constant velocity within the shutter time, the mixture ratio α of the pixels belonging to a mixed area exhibits the following characteristics. That is, the mixture ratio α linearly changes according to the positional change in the pixels. If the positional change in the pixels is one-dimensional, a change in the mixture ratio α can be represented linearly. If the positional change in the pixels is two-dimensional, a change in the mixture ratio α can be represented on a plane.

Since the period of one frame is short, it can be assumed that the object corresponding to the foreground is a rigid body moving with constant velocity.

The gradient of the mixture ratio α is inversely proportional to the amount of movement v within the shutter time of the foreground.

Figure 48:
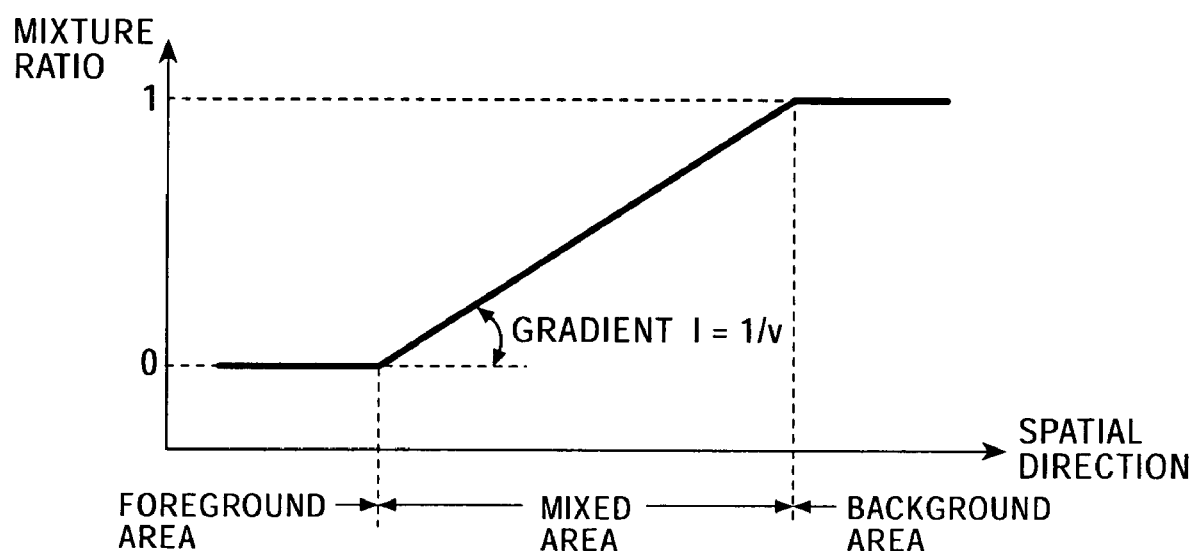
FIG. 48 illustrates an example of the ideal mixture ratio $\alpha$.

An example of the ideal mixture ratio α is shown in FIG. 48. The gradient 1 of the ideal mixture ratio α in the mixed area can be represented by the reciprocal of the amount of movement v.

As shown in FIG. 48, the ideal mixture ratio α has the value of 1 in the background area, the value of 0 in the foreground area, and the value of greater than 0 and smaller than 1 in the mixed area.

The processing of the mixture-ratio calculator 104 is described below with reference to FIGS. 49 through 53.

Figure 49:
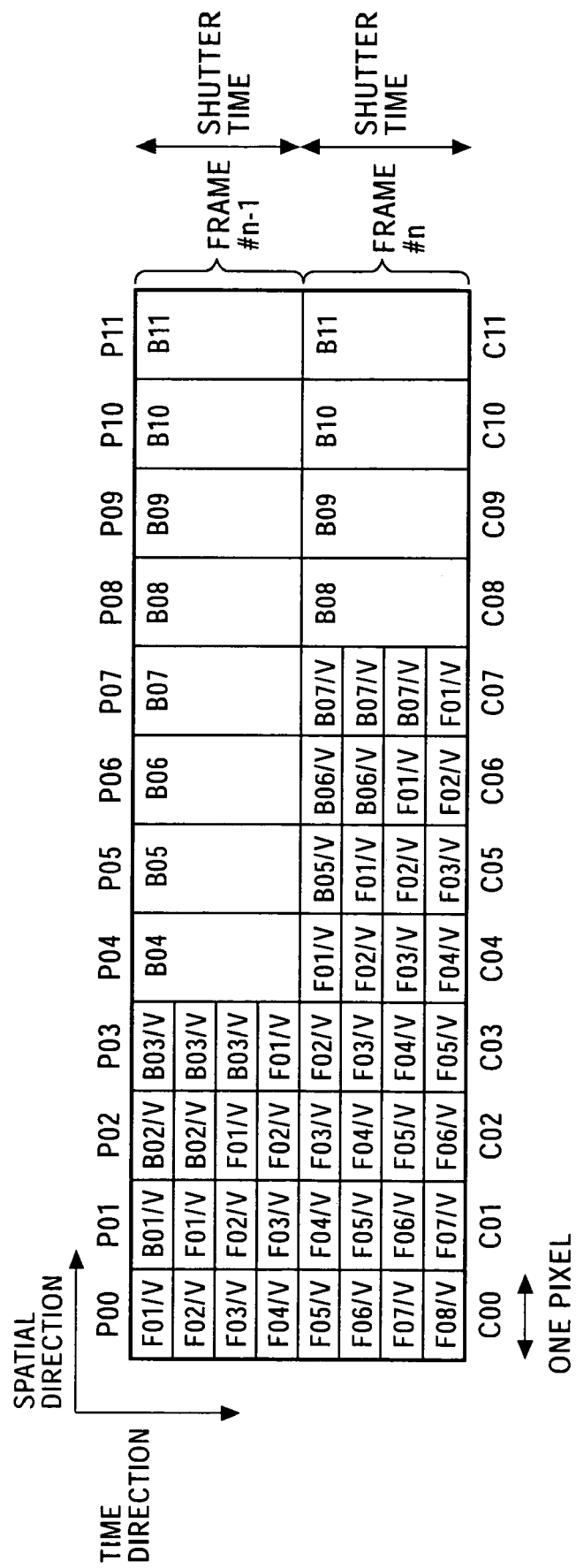
FIG. 49 illustrates a model in which pixel values are expanded in the time direction and the period corresponding to the shutter time is divided.

FIG. 49 illustrates a model in which pixel values corresponding to an image including a covered background area and having the amount of movement v of 4 are expanded in the time direction and the period corresponding to the shutter time is divided.

The relationship among the pixel value Mx of a designated pixel belonging to the covered background area of frame #n, the pixel value Bx of the pixel belonging to the background area of frame #n−1 corresponding to the designated pixel of frame #n, and the mixture ratio αx of the designated pixel can be expressed by equation (8):

$$Mx = \alpha x \cdot Bx + fx \qquad (8)$$

where x indicates the position in the coordinate axis x in the moving direction, and fx designates the sum of the foreground components contained in the pixel value of the designated pixel.

Figure 50:
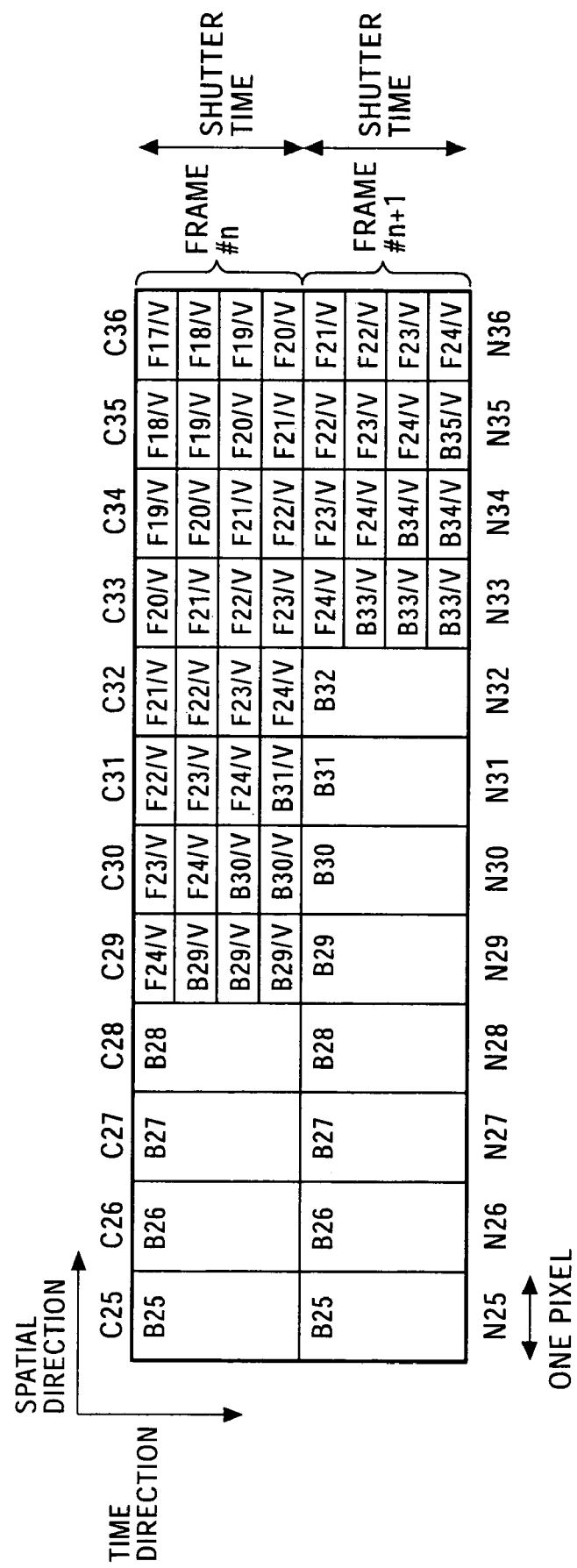
FIG. 50 illustrates a model in which pixel values are expanded in the time direction and the period corresponding to the shutter time is divided.

FIG. 50 illustrates a model in which pixel values corresponding to an image including an uncovered background area and having the amount of movement v of 4 are expanded in the time direction and the period corresponding to the shutter time is divided.

Similarly, the relationship among the pixel value Mx of a designated pixel belonging to the uncovered background area of frame #n, the pixel value Bx of the pixel belonging to the background area of frame #n+1 corresponding to the designated pixel of frame #n, and the mixture ratio αx of the designated pixel can be expressed by equation (8).

As shown in FIGS. 49 and 50, when the amount of movement is indicated by v, the width of the mixed area in the moving direction of the foreground object can be determined by subtracting one from the amount of movement v.

For example, in FIG. 49, the pixels belonging to the covered background area of frame #n are the sixth through eighth pixels from the left, and the width of the covered background area is found to be 3 by using the pixel interval as the unit. In FIG. 49, the amount of movement v is 4, and the width of the covered background area is equal to the result obtained by subtracting one from the amount of movement v.

In FIG. 50, the pixels belonging to the uncovered background area of frame #n are the fifth through seventh pixels from the left, and the width of the uncovered background area is found to be 3 by using the pixel interval as the unit. In FIG. 50, the amount of movement v is 4, and the width of the uncovered background area is equal to the result obtained by subtracting one from the amount of movement v.

When the amount of movement is indicated by v, the mixture ratio α of the pixel which is positioned on the straight line in the direction of the motion vector, which belongs to the covered background area of frame #n, and which is located adjacent to the pixel belonging to the background area (the pixel at the leading end of the motion vector) can be determined by equation (9).

$$\alpha = (v-1)/v \qquad (9)$$

Figure 51:
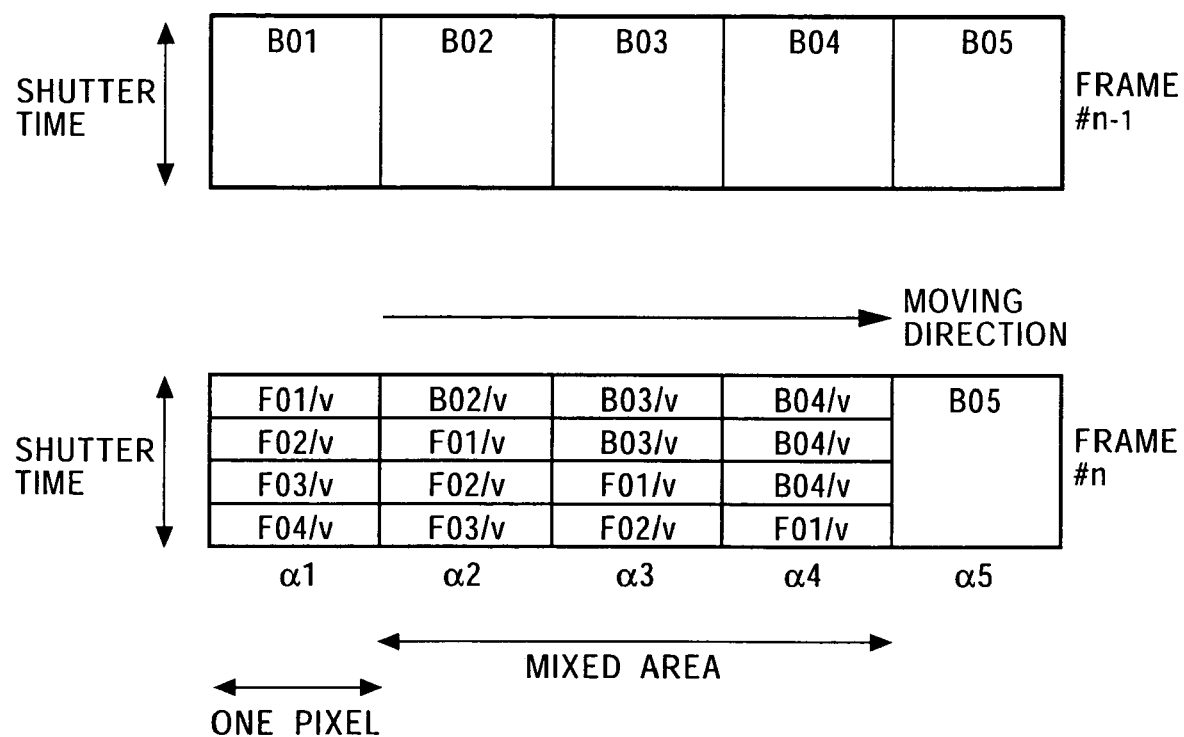
FIG. 51 illustrates a model in which pixel values are expanded in the time direction and the period corresponding to the shutter time is divided.

For example, the mixture ratio α of the fourth pixel from the left of frame #n shown in FIG. 51 is ¾ when the amount of movement v is 4.

When the amount of movement is indicated by v, the mixture ratio α of the second pixel from the pixel belonging to the background area, which is positioned on the straight line in the direction of the motion vector, and which belongs to the covered background area of frame #n can be determined by subtracting 1/v from the mixture ratio α of the pixel which is positioned on the straight line in the direction of the motion vector, which belongs to the covered background area of frame #n, and which is located adjacent to the pixel belonging to the background area.

For example, when the amount of movement v is 4, the mixture ratio α of the third pixel from the left in frame #n shown in FIG. 51 is ½, which is equal to the value obtained by subtracting ¼ from the mixture ratio α of the fourth pixel from the left of frame #n.

Similarly, when the amount of movement is indicated by v, the mixture ratio α of the third pixel from the pixel belonging to the background area, which is positioned on the straight line in the direction of the motion vector, and which belongs to the covered background area of frame #n can be determined by subtracting 2/v from the mixture ratio α of the pixel which is positioned on the straight line in the direction of the motion vector, which belongs to the covered background area of frame #n, and which is located adjacent to the pixel belonging to the background area.

For example, when the amount of movement v is 4, the mixture ratio α of the second pixel from the left in frame #n shown in FIG. 51 is ¼, which is equal to the value obtained by subtracting ½ from the mixture ratio α of the fourth pixel from the left of frame #n.

Accordingly, the mixture ratio αx of the pixel belonging to the covered background area when the distance from this pixel to the pixel adjacent to the pixel belonging to the background area is x can be calculated by equation (10) based on the distance x.

$$\alpha x = (v-1)/v - x \cdot (1/v) \qquad (10)$$

Similarly, when the amount of movement is indicated by v, the mixture ratio α of the pixel which is positioned on the straight line in the direction of the motion vector, which belongs to the uncovered background area of frame #n, and which is located adjacent to the pixel belonging to the background area (the pixel at the trailing end of the motion vector) can be determined by equation (11).

$$\alpha = (v-1)/v \qquad (11)$$

For example, when the amount of movement v is 4, the mixture ratio α of the second pixel from the left in frame #n is ¾.

When the amount of movement is indicated by v, the mixture ratio α of the second pixel from the pixel belonging to the background area, which is positioned on the straight line in the direction of the motion vector, and which belongs to the uncovered background area of frame #n can be determined by subtracting 1/v from the mixture ratio α of the pixel which is positioned on the straight line in the direction of the motion vector, which belongs to the uncovered background area of frame #n, and which is located adjacent to the pixel belonging to the background area.

Figure 52:
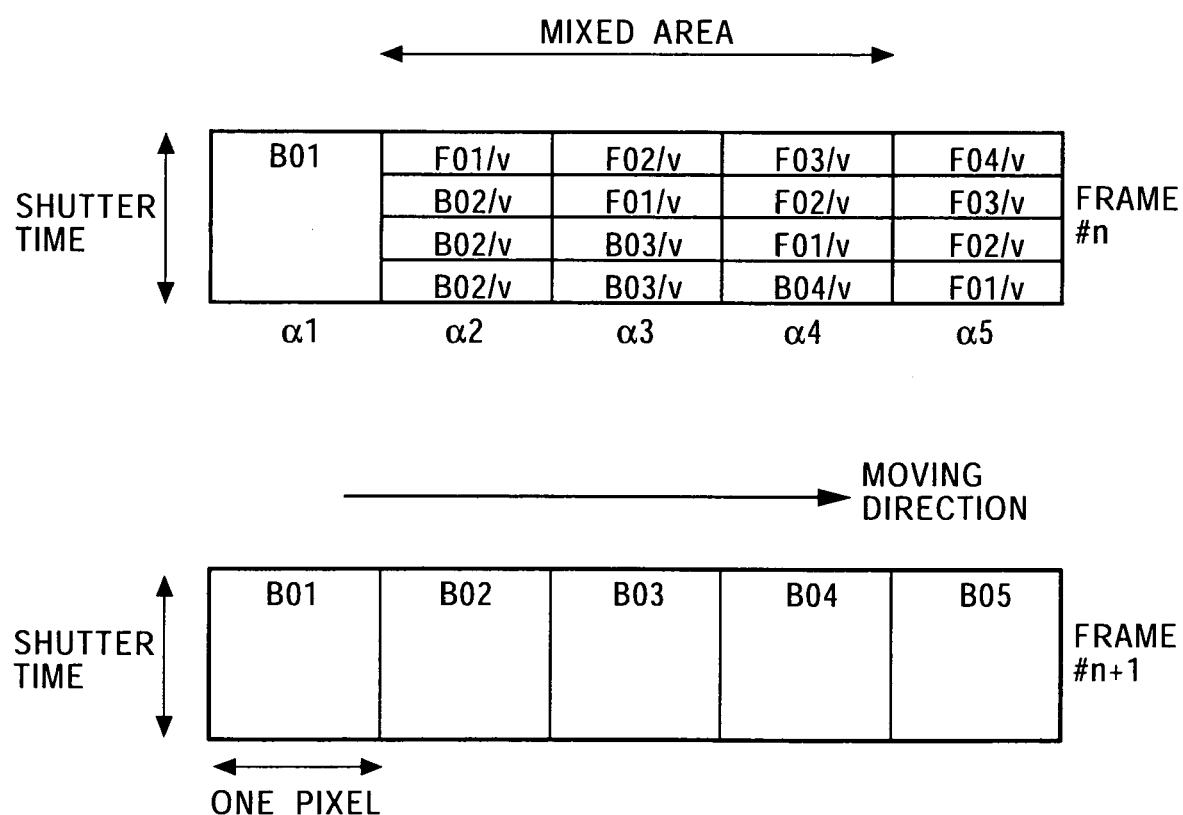
FIG. 52 illustrates a model in which pixel values are expanded in the time direction and the period corresponding to the shutter time is divided.

For example, when the amount of movement v is 4, the mixture ratio α of the third pixel from the left in frame #n shown in FIG. 52 is ½, which is equal to the value obtained by subtracting ¼ from the mixture ratio α of the second pixel from the left in frame #n.

Likewise, when the amount of movement is indicated by v, the mixture ratio α of the third pixel from the pixel belonging to the background area, which is positioned on the straight line in the direction of the motion vector, and which belongs to the uncovered background area of frame #n can be determined by subtracting 2/v from the mixture ratio α of the pixel which is positioned on the straight line in the direction of the motion vector, which belongs to the uncovered background area of frame #n, and which is located adjacent to the pixel belonging to the background area.

For example, when the amount of movement v is 4, the mixture ratio α of the fourth pixel from the left in frame #n shown in FIG. 52 is ¼, which is equal to the value obtained by subtracting ½ from the mixture ratio α of the second pixel from the left in frame #n.

Accordingly, the mixture ratio αx of the pixel belonging to the uncovered background area when the distance from this pixel to the pixel adjacent to the pixel belonging to the background area is x can be calculated by equation (12) based on the distance x.

$$\alpha x = (v-1)/v - x \cdot (1/v) \qquad (12)$$

Generally, since the shutter time is sufficiently short, it can be assumed that the object corresponding to the foreground is a rigid body moving with constant velocity within the shutter time. Accordingly, it can also be assumed that the mixture ratio in the mixed area linearly changes on the straight line in the moving direction.

Thus, according to the above-described calculation method for the mixture ratio α, the mixture ratio can be calculated with sufficiently high precision.

Figure 53:
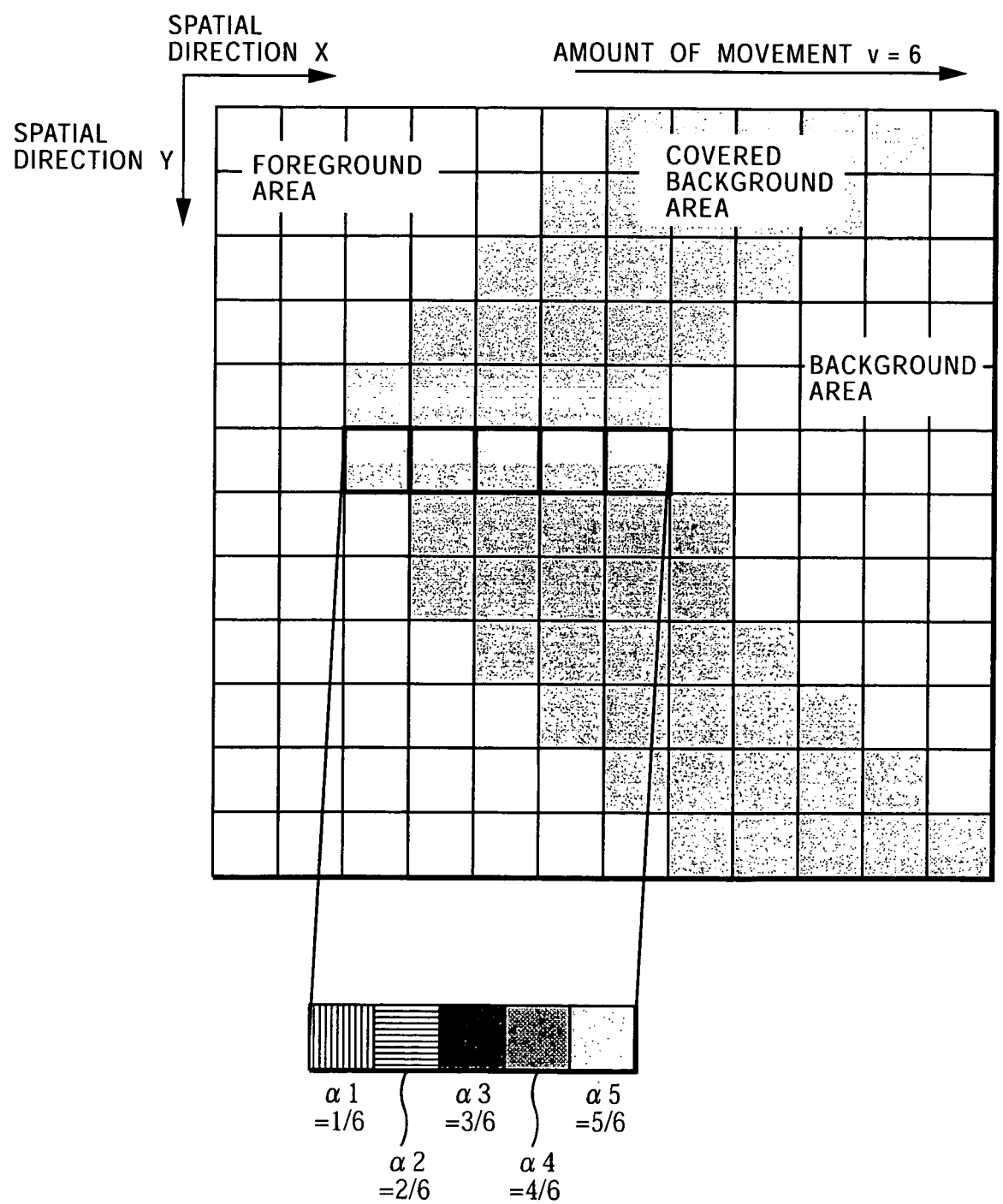
FIG. 53 illustrates the processing for calculating the mixture ratio $\alpha$.

FIG. 53 illustrates the calculation processing for the mixture ratio α in an image.

When the amount of movement is indicated by v, and when the designated pixel is a pixel belonging to a covered background area, the mixture ratio α of the pixel positioned on the straight line in the moving direction and positioned at the trailing end of the moving direction is indicated by 1/v, and the mixture ratio α of the pixel positioned on the straight line in the moving direction and positioned at the leading end of the moving direction is indicated by (v−1)/v. The mixture ratios α of the pixels positioned on the straight line of the moving direction between the pixel at the leading end of the moving direction and the pixel at the trailing end of the moving direction can be linearly calculated with a gradient of 1/v (by proportional calculations).

For example, when the amount of movement v is 6, and when the designated pixel is a pixel belonging to the covered background area, the mixture ratio α5 of the pixel positioned on the straight line in the moving direction at the leading end of the moving direction is determined to be ⅚, and the mixture ratio α1 positioned on the straight line in the moving direction at the trailing end of the moving direction is determined to be ⅙.

The mixture ratios α2, α3, and α4 of the pixels between the pixel at the leading end of the moving direction and the pixel at the trailing end of the moving direction can be linearly calculated in correspondence with the pixel positions with a gradient of 1/v, and are determined to be ⅖, ⅗, and ⅘, respectively.

When the amount of movement is indicated by v, and when the designated pixel is a pixel belonging to the uncovered background area, the mixture ratio α of the pixel positioned on the straight line in the moving direction at the leading end of the moving direction is determined to be 1/v, and the mixture ratio α the pixel positioned on the straight line in the moving direction at the trailing end of the moving direction is determined to be (v−1)/v. The mixture ratios α of the pixels positioned on the straight line in the moving direction between the pixel at the leading end of the moving direction and the pixel at the trailing end of the moving direction can be linearly calculated (by proportional calculations).

Figure 54:
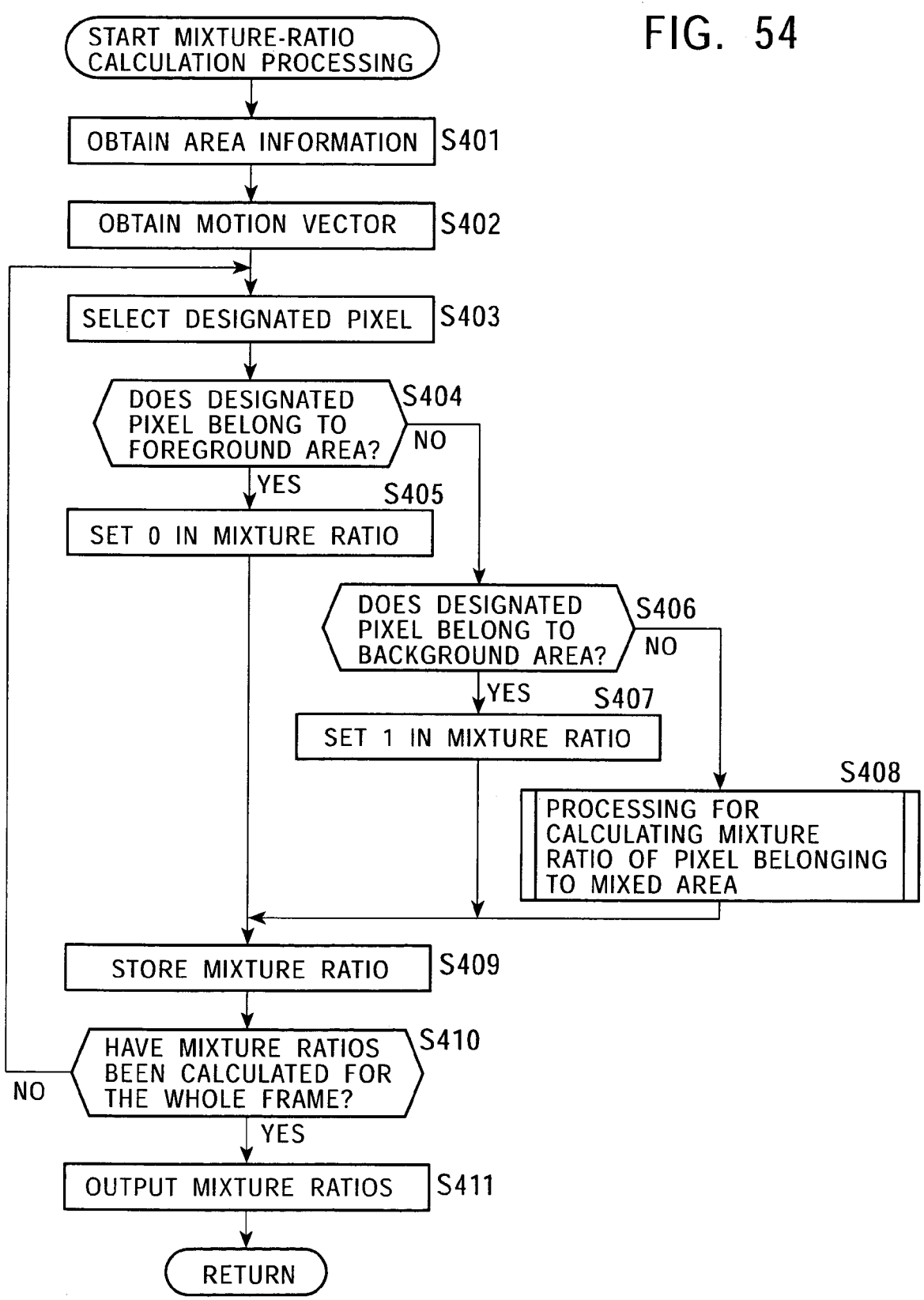
FIG. 54 is a flowchart illustrating the processing for calculating the mixture ratio $\alpha$.

The processing for calculating the mixture ratio α performed by the mixture-ratio calculator 104 is described below with reference to the flowchart of FIG. 54.

In step S401, the mixture-ratio-width detector 401 obtains the area information supplied from the area specifying unit 103. In step S402, the mixture-ratio-width detector 401 and the straight-line applying portion 402 obtain the motion vector and the positional information thereof supplied from the motion detector 102.

In step S403, the straight-line applying portion 402 designates a pixel. In step S404, the straight-line applying portion 402 determines whether the designated pixel belongs to the foreground area based on the area information. If it is determined that the designated pixel belongs to the foreground area, the process proceeds to step S405 in which 0 is set in the mixture ratio, and the process proceeds to step S409.

If it is determined in step S404 that the designated pixel does not belong to the foreground area, the process proceeds to step S406. In step S406, the straight-line applying portion 402 determines whether the designated pixel belongs to the background area based on the area information. If it is determined that the designated pixel belongs to the background area, the process proceeds to step S407 in which 1 is set in the mixture ratio α. The process then proceeds to step S409.

If it is determined in step S406 that the designated pixel does not belong to the background area, the process proceeds to step S408. In step S408, the straight-line applying portion 402 executes processing for calculating the mixture ratio α of the pixel belonging to the mixed area, and the process proceeds to step S409. Details of the processing for calculating the mixture ratio α of the pixel belonging to the mixed area are given below.

In step S409, the straight-line applying portion 402 stores the calculated mixture ratio α in correspondence with the designated pixel.

In step S410, the straight-line applying portion 402 determines whether the mixture ratios α have been calculated for the whole frame. If it is determined that the mixture ratios α have not been calculated for the whole frame, the process returns to step S403 in which another pixel is selected to repeat the processing for calculating the mixture ratio α.

If it is determined in step S410 that the mixture ratios α have been calculated for the whole frame, the process proceeds to step S411 in which the straight-line applying portion 402 outputs the mixture ratios α. The processing is then completed.

Figure 55:
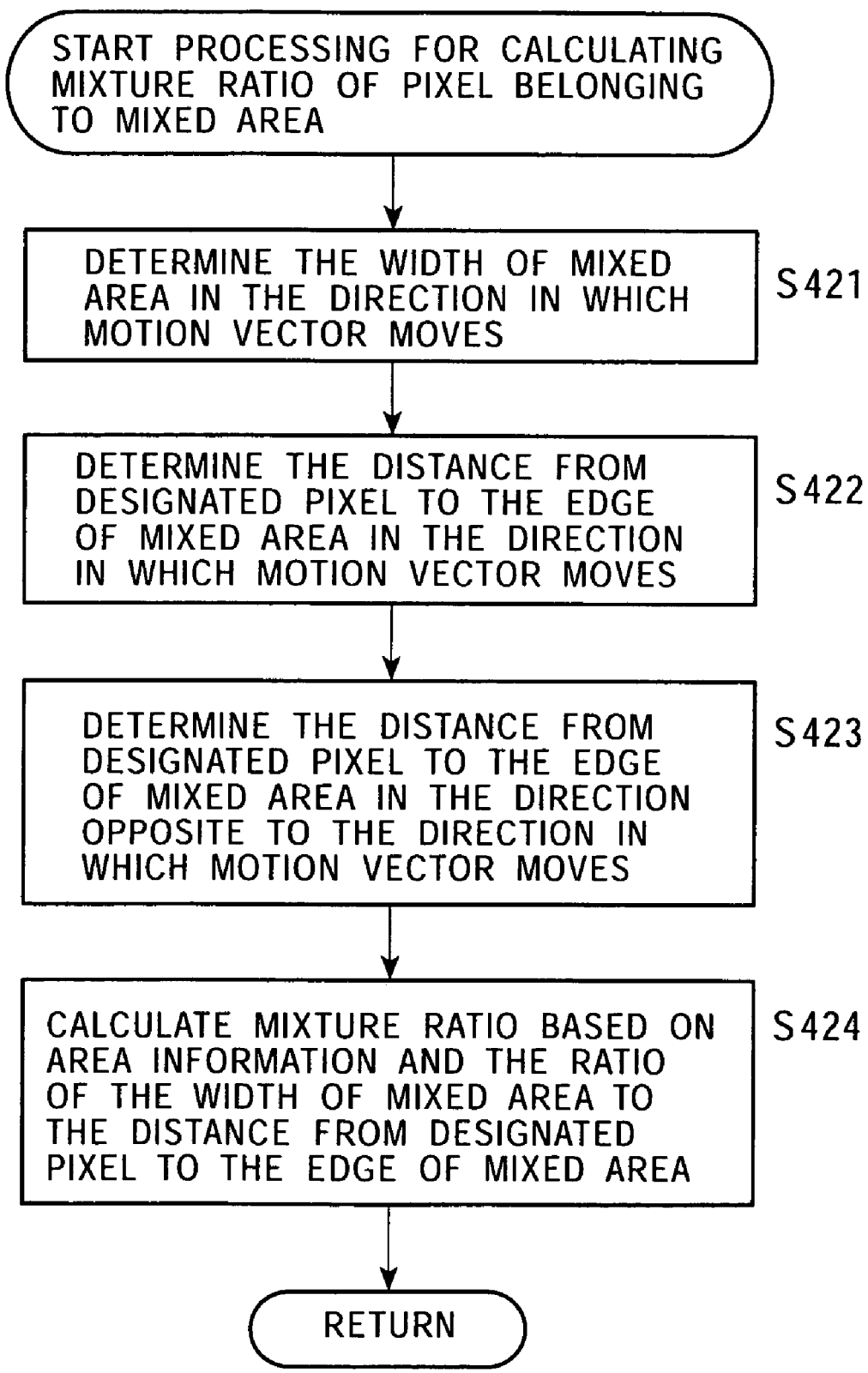
FIG. 55 is a flowchart illustrating the processing for calculating the mixture ratio $\alpha$ of a pixel belonging to the mixed area.

A description is given, with reference to the flowchart of FIG. 55, of the processing for calculating the mixture ratio α of the pixel belonging to the mixed area performed by the mixed-area-width detector 401 and the straight-line applying portion 402 corresponding to the processing of step S408.

In step S421, the mixed-area-width detector 401 determines the width of the mixed area in the moving direction of the motion vector based on the motion vector and the positional information thereof supplied from the motion detector 102 and the area information supplied from the area specifying unit 103. The mixed-area-width detector 401 supplies the width of the mixed area to the straight-line applying portion 402 as the mixed-area-width information. The mixed-area-width detector 401 may calculate the width of the mixed area based on the magnitude of the motion vector.

In step S422, the straight-line applying portion 402 determines the distance from the designated pixel to the edge of the mixed area in the moving direction of the motion vector.

In step S423, the straight-line applying portion 402 determines the distance from the designated pixel to the edge of the mixed area in the direction opposite to the moving direction of the motion vector.

In step S424, the straight-line applying portion 402 calculates the mixture ratio α based on the area information and the ratio of the width of the mixed area to the distance from the designated pixel to the edge of the mixed area. The processing is then completed.

For example, when the designated pixel belongs to the covered background area, the straight-line applying portion 402 calculates the mixture ratio α according to the calculation expressed by equation (10) based on the ratio of the width of the mixed area to the distance from the designated pixel to the edge of the mixed area in the moving direction of the motion vector.

For example, when the designated pixel belongs to the uncovered background area, the straight-line applying portion 402 calculates the mixture ratio α according to the calculation expressed by equation (12) based on the ratio of the width of the mixed area to the distance from the designated pixel to the edge of the mixed area in the direction opposite to the moving direction of the motion vector.

As discussed above, the mixture-ratio calculator 102 is able to calculate the mixture ratio α, which indicates a feature quantity corresponding to each pixel, based on the area information supplied from the area specifying unit 103, and the motion vector and the positional information thereof supplied from the motion detector 102.

By using the mixture ratio α, it is possible to separate the foreground components and the background components contained in the pixel value while maintaining the information of the motion blur contained in the image corresponding to the moving object.

If the image is synthesized based on the mixture ratio α, it is possible to create an image containing motion blur which matches the speed of the moving object and which faithfully reflects the real world.

Figure 56:
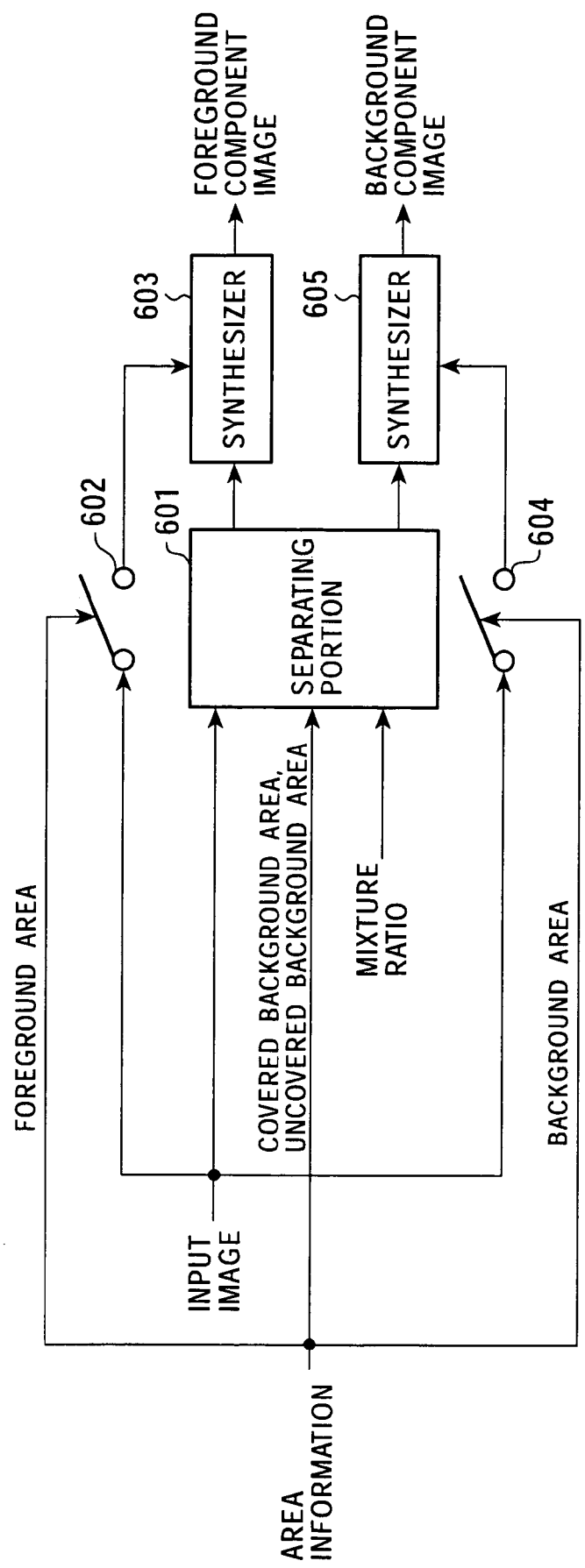
FIG. 56 is a block diagram illustrating an example of the configuration of a foreground/background separator 105.

The foreground/background separator 105 is discussed below. FIG. 56 is a block diagram illustrating an example of the configuration of the foreground/background separator 105. The input image supplied to the foreground/background separator 105 is supplied to a separating portion 601, a switch 602, and a switch 604. The area information supplied from the area specifying unit 103 and indicating the information of the covered background area and the uncovered background area is supplied to the separating portion 601. The area information indicating the foreground area is supplied to the switch 602. The area information indicating the background area supplied to the switch 604.

The mixture ratio α supplied from the mixture-ratio calculator 104 is supplied to the separating portion 601.

The separating portion 601 separates the foreground components from the input image based on the area information indicating the covered background area, the area information indicating the uncovered background area, and the mixture ratio α, and supplies the separated foreground components to a synthesizer 603. The separating portion 601 also separates the background components from the input image, and supplies the separated background components to a synthesizer 605.

The switch 602 is closed when a pixel corresponding to the foreground is input based on the area information indicating the foreground area, and supplies only the pixels corresponding to the foreground contained in the input image to the synthesizer 603.

The switch 604 is closed when a pixel corresponding to the background is input based on the area information indicating the background area, and supplies only the pixels corresponding to the background contained in the input image to the synthesizer 605.

The synthesizer 603 synthesizes a foreground component image based on the foreground components supplied from the separating portion 601 and the pixels corresponding to the foreground supplied from the switch 602, and outputs the synthesized foreground component image. Since the foreground area and the mixed area do not overlap, the synthesizer 603 applies, for example, logical OR to the foreground components and the foreground pixels, thereby synthesizing the foreground component image.

In the initializing processing executed at the start of the synthesizing processing for the foreground component image, the synthesizer 603 stores an image whose pixel values are all 0 in a built-in frame memory. Then, in the synthesizing processing for the foreground component image, the synthesizer 603 stores the foreground component image (overwrites the previous image by the foreground component image). Accordingly, 0 is stored in the pixels corresponding to the background area in the foreground component image output from the synthesizer 603.

The synthesizer 605 synthesizes a background component image based on the background components supplied from the separating portion 601 and the pixels corresponding to the background supplied from the switch 604, and outputs the synthesized background component image. Since the background area and the mixed area do not overlap, the synthesizer 605 applies, for example, logical OR to the background components and the background pixels, thereby synthesizing the background component image.

In the initializing processing executed at the start of the synthesizing processing for the background component image, the synthesizer 605 stores an image whose pixel values are all 0 in a built-in frame memory. Then, in the synthesizing processing for the background component image, the synthesizer 605 stores the background component image (overwrites the previous image by the background component image). Accordingly, 0 is stored in the pixels corresponding to the foreground area in the background component image output from the synthesizer 605.

Figure 57B:
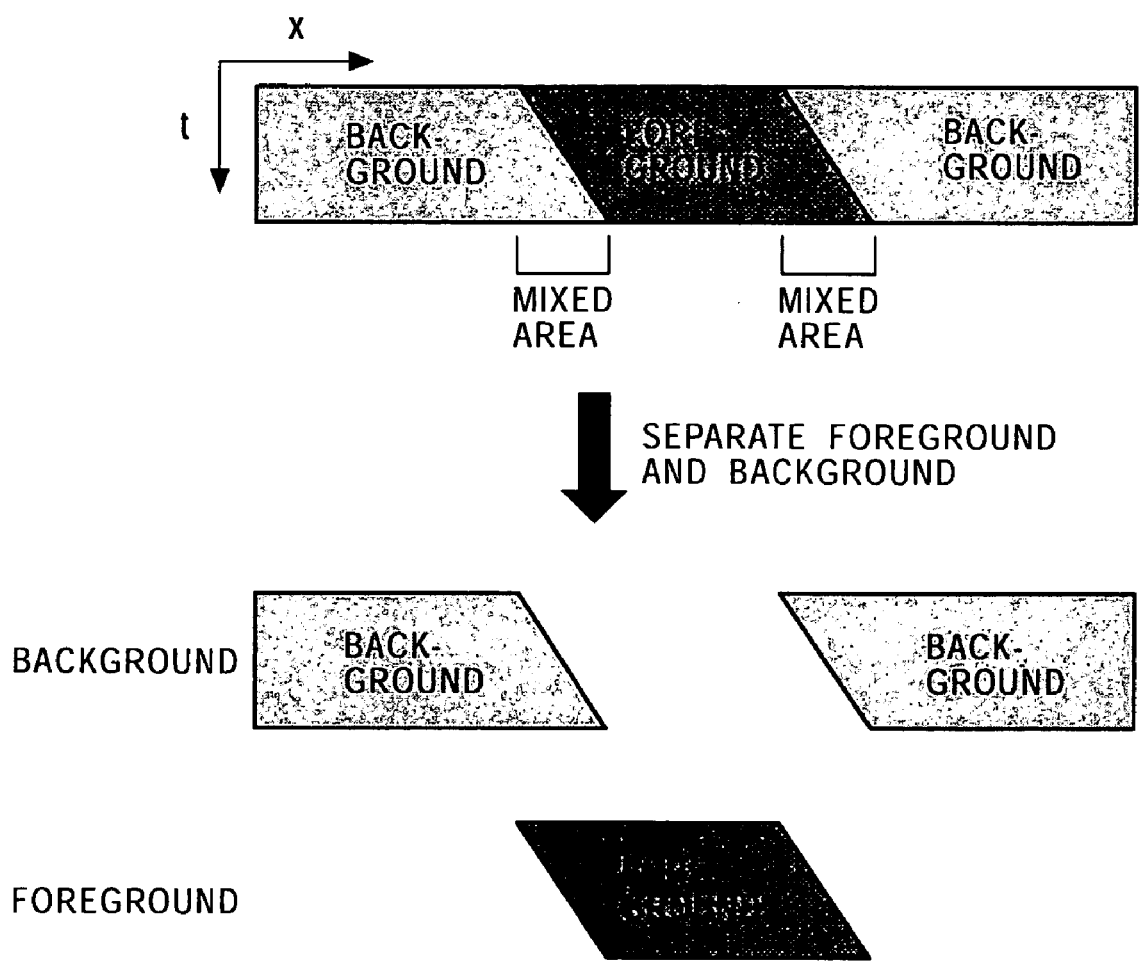
FIG. 57B illustrates a model of an input image, a foreground component image, and a background component image.

FIG. 57A illustrates the input image input into the foreground/background separator 105 and the foreground component image and the background component image output from the foreground/background separator 105. FIG. 57B illustrates a model corresponding to the input image input into the foreground/background separator 105 and the foreground component image and the background component image output from the foreground/background separator 105.

FIG. 57A is a schematic diagram illustrating the image to be displayed, and FIG. 57B is a model obtained by expanding in the time direction the pixels disposed in one line including the pixels belonging to the foreground area, the pixels belonging to the background area, and the pixels belonging to the mixed area corresponding to FIG. 57A.

As shown in FIGS. 57A and 57B, the background component image output from the foreground/background separator 105 consists of the pixels belonging to the background area and the background components contained in the pixels of the mixed area.

As shown in FIGS. 57A and 57B, the foreground component image output from the foreground/background separator 105 consists of the pixel belonging to the foreground area and the foreground components contained in the pixels of the mixed area.

The pixel values of the pixels in the mixed area are separated into the background components and the foreground components by the foreground/background separator 105. The separated background components form the background component image together with the pixels belonging to the background area. The separated foreground components form the foreground component image together with the pixels belonging to the foreground area.

As discussed above, in the foreground component image, the pixel values of the pixels corresponding to the background area are set to 0, and significant pixel values are set in the pixels corresponding to the foreground area and the pixels corresponding to the mixed area. Similarly, in the background component image, the pixel values of the pixels corresponding to the foreground area are set to 0, and significant pixel values are set in the pixels corresponding to the background area and the pixels corresponding to the mixed area.

A description is given below of the processing executed by the separating portion 601 for separating the foreground components and the background components from the pixels belonging to the mixed area.

Figure 58:
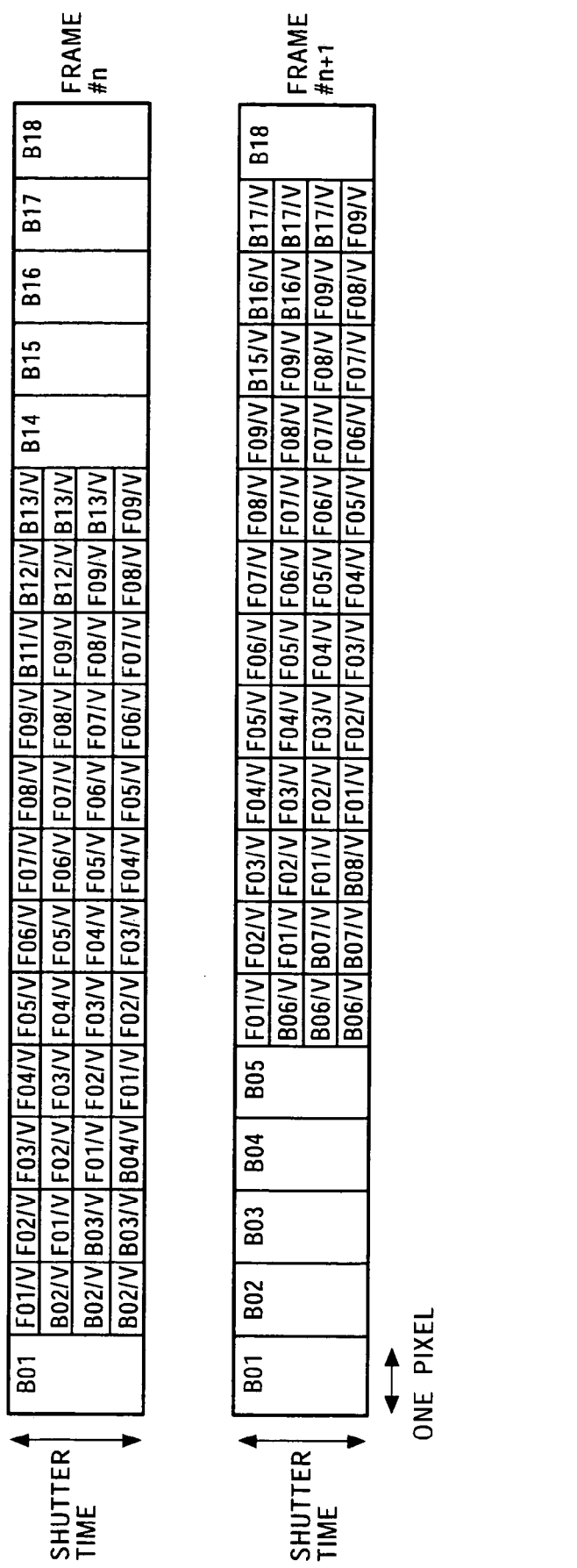
FIG. 58 illustrates a model in which pixel values are expanded in the time direction and the period corresponding to the shutter time is divided.

FIG. 58 illustrates a model of an image indicating foreground components and background components in two frames including a foreground object moving from the left to the right in FIG. 58. In the model of the image shown in FIG. 58, the amount of movement v is 4, and the number of virtual divided portions is 4.

In frame #n, the leftmost pixel and the fourteenth through eighteenth pixels from the left consist of only the background components and belong to the background area. In frame #n, the second through fourth pixels from the left contain the background components and the foreground components, and belong to the uncovered background area. In frame #n, the eleventh through thirteenth pixels from the left contain background components and foreground components, and belong to the covered background area. In frame #n, the fifth through tenth pixels from the left consist of only the foreground components, and belong to the foreground area.

In frame #n+1, the first through fifth pixels from the left and the eighteenth pixel from the left consist of only the background components, and belong to the background area. In frame #n+1, the sixth through eighth pixels from the left contain background components and foreground components, and belong to the uncovered background area. In frame #n+1, the fifteenth through seventeenth pixels from the left contain background components and foreground components, and belong to the covered background area. In frame #n+1, the ninth through fourteenth pixels from the left consist of only the foreground components, and belong to the foreground area.

Figure 59:
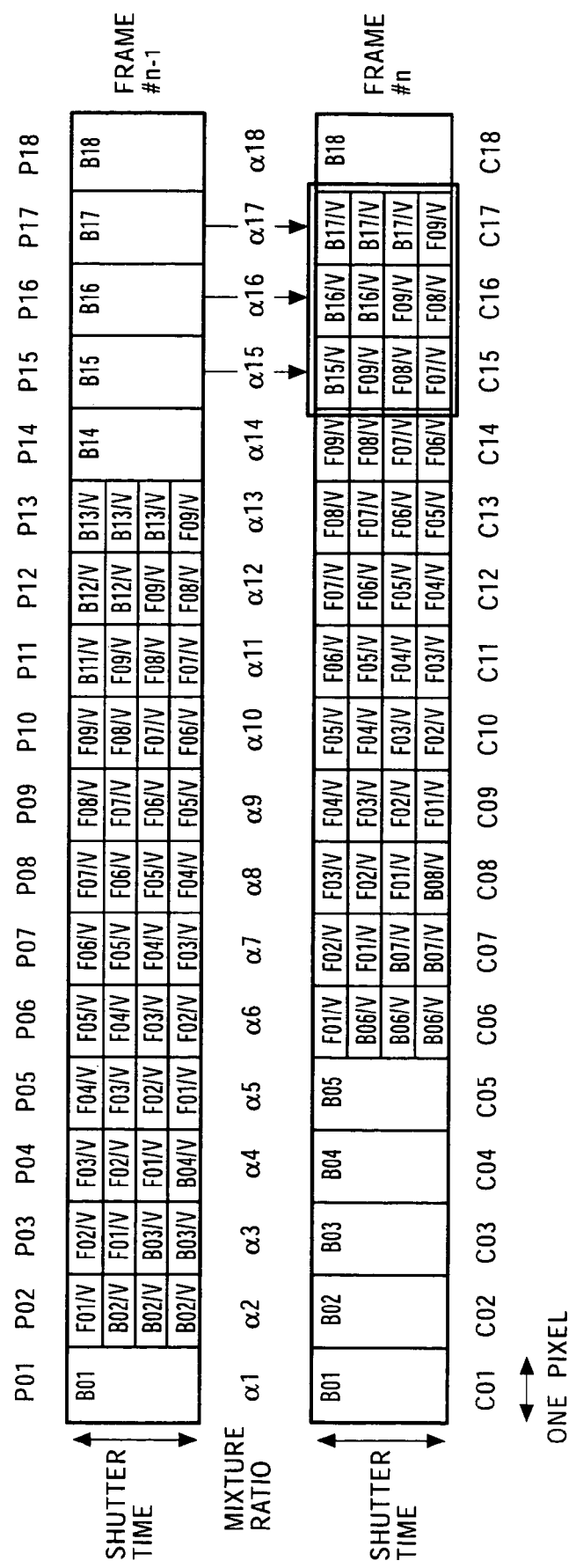
FIG. 59 illustrates a model in which pixel values are expanded in the time direction and the period corresponding to the shutter time is divided.

FIG. 59 illustrates the processing for separating the foreground components from the pixels belonging to the covered background area. In FIG. 59, α1 through α18 indicate mixture ratios of the individual pixels of frame #n. In FIG. 59, the fifteenth through seventeenth pixels from the left belong to the covered background area.

The pixel value C15 of the fifteenth pixel from the left in frame #n can be expressed by equation (13):

$$C15 = B15/v + F09/v + F08/v + F07/v \qquad (13)$$
$$= \alpha15 \cdot B15 + F09/v + F08/v + F07/v$$
$$= \alpha15 \cdot P15 + F09/v + F08/v + F07/v$$

where α15 indicates the mixture ratio of the fifteenth pixel from the left in frame #n, and P15 designates the pixel value of the fifteenth pixel from the left in frame #n−1.

The sum f15 of the foreground components of the fifteenth pixel from the left in frame #n can be expressed by equation (14) based on equation (13).

$$f15 = F09/v + F08/v + F07/v \qquad (14)$$
$$= C15 - \alpha15 \cdot P15$$

Similarly, the sum f16 of the foreground components of the sixteenth pixel from the left in frame #n can be expressed by equation (15), and the sum f17 of the foreground components of the seventeenth pixel from the left in frame #n can be expressed by equation (16).

$$f16 = C16 - \alpha16 \cdot P16 \qquad (15)$$

$$f17 = C17 - \alpha17 \cdot P17 \qquad (16)$$

In this manner, the foreground components fc contained in the pixel value C of the pixel belonging to the covered background area can be expressed by equation (17):

$$fc = C - \alpha \cdot P \qquad (17)$$

where P designates the pixel value of the corresponding pixel in the previous frame.

Figure 60:
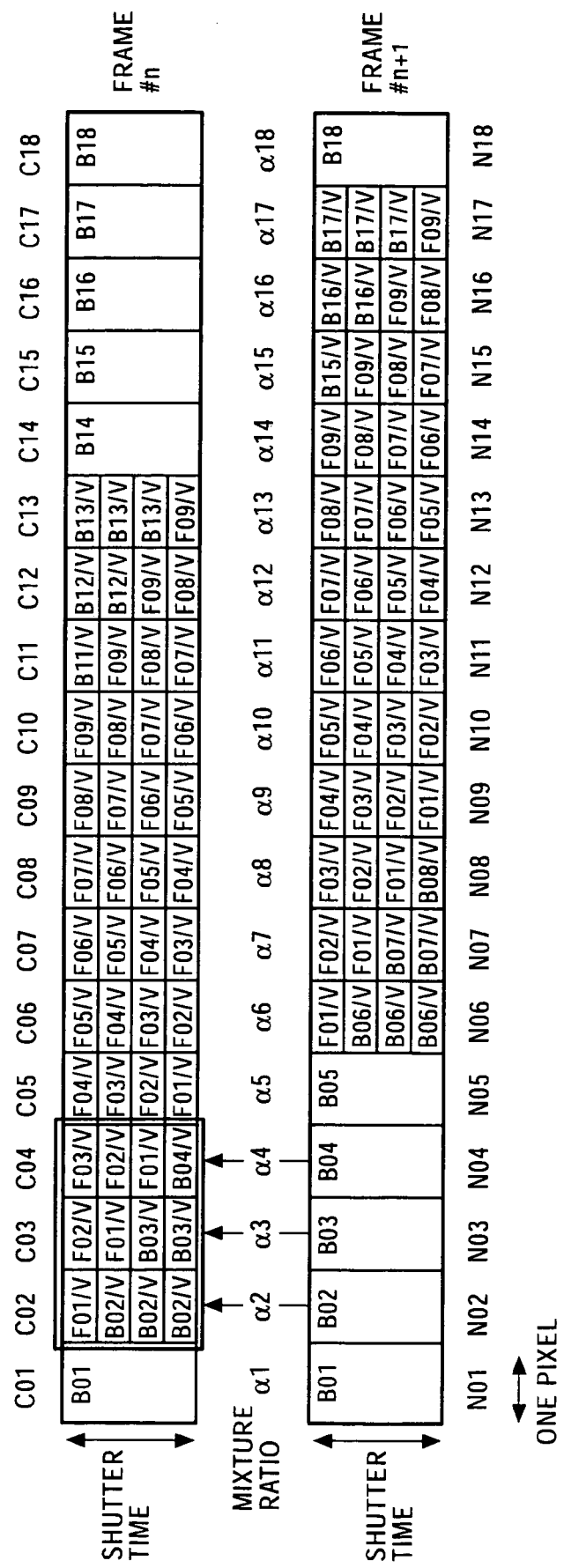
FIG. 60 illustrates a model in which pixel values are expanded in the time direction and the period corresponding to the shutter time is divided.

FIG. 60 illustrates the processing for separating the foreground components from the pixels belonging to the uncovered background area. In FIG. 60, α1 through α18 indicate mixture ratios of the individual pixels of frame #n. In FIG. 60, the second through fourth pixels from the left belong to the uncovered background area.

The pixel value C02 of the second pixel from the left in frame #n can be expressed by equation (18):

$$C02 = B02/v + B02/v + B02/v + F01/v \qquad (18)$$
$$= \alpha2 \cdot B02 + F01/v$$
$$= \alpha2 \cdot N02 + F01/v$$

where α2 indicates the mixture ratio of the second pixel from the left in frame #n, and N02 designates the pixel value of the second pixel from the left in frame #n+1.

The sum F02 of the foreground components of the second pixel from the left in frame #n can be expressed by equation (19) based on equation (18).

$$f02 = F01/v \qquad (19)$$
$$= C02 - \alpha2 \cdot N02$$

Similarly, the sum F03 of the foreground components of the third pixel from the left in frame #n can be expressed by equation (20), and the sum F04 of the foreground components of the fourth pixel from the left in frame #n can be expressed by equation (21).

$$f03 = C03 - \alpha3 \cdot N03 \qquad (20)$$

$$f04 = C04 - \alpha4 \cdot N04 \qquad (21)$$

In this manner, the foreground components fu contained in the pixel value C of the pixel belonging to the uncovered background area can be expressed by equation (22):

$$fu = C - \alpha \cdot N \qquad (22)$$

where N designates the pixel value of the corresponding pixel in the subsequent frame.

As discussed above, the separating portion 601 is able to separate the foreground components from the pixels belonging to the mixed area and the background components from the pixels belonging to the mixed area based on the information indicating the covered background area and the information indicating the uncovered background area contained in the area information, and the mixture ratio α for each pixel.

Figure 61:
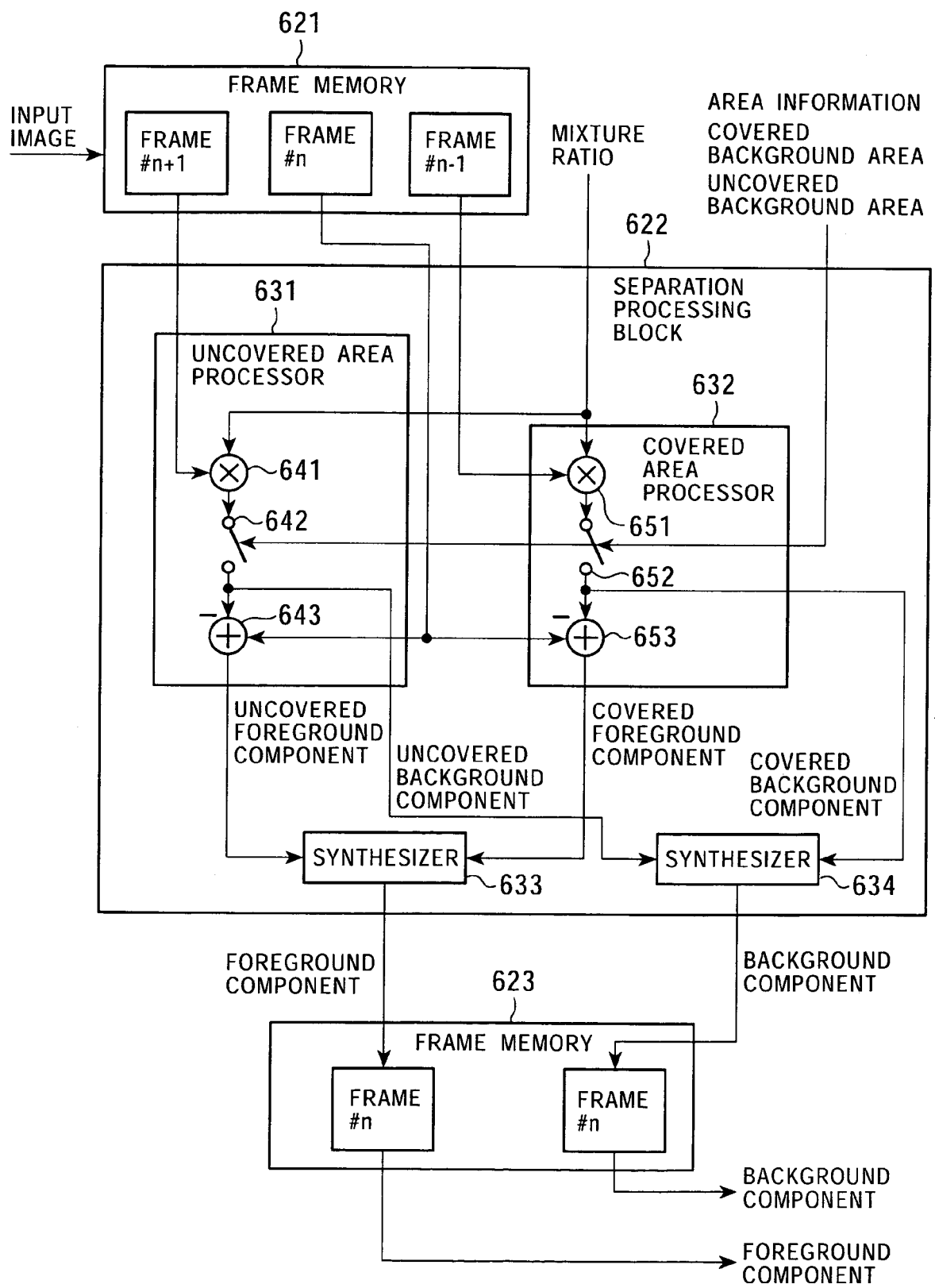
FIG. 61 is a block diagram illustrating an example of the configuration of a separating portion 601.

FIG. 61 is a block diagram illustrating an example of the configuration of the separating portion 601 for executing the above-described processing. An image input into the separating portion 601 is supplied to a frame memory 621, and the area information indicating the covered background area and the uncovered background area supplied from the mixture-ratio calculator 104 and the mixture ratio α are supplied to a separation processing block 622.

The frame memory 621 stores the input images in units of frames. When a frame to be processed is frame #n, the frame memory 621 stores frame #n−1, which is the frame one frame before frame #n, frame #n, and frame #n+1, which is the frame one frame after frame #n.

The frame memory 621 supplies the corresponding pixels in frame #n−1, frame #n, and frame #n+1 to the separation processing block 622.

The separation processing block 622 applies the calculations discussed with reference to FIGS. 59 and 60 to the pixel values of the corresponding pixels in frame #n−1, frame #n, and frame #n+1 supplied from the frame memory 621 based on the area information indicating the covered background area and the uncovered background area and the mixture ratio α so as to separate the foreground components and the background components from the pixels belonging to the mixed area in frame #n, and supplies them to a frame memory 623.

The separation processing block 622 is formed of an uncovered area processor 631, a covered area processor 632, a synthesizer 633, and a synthesizer 634.

A multiplier 641 of the uncovered area processor 631 multiplies the pixel value of the pixel in frame #n+1 supplied from the frame memory 621 by the mixture ratio α, and outputs the resulting pixel value to a switch 642. The switch 642 is closed when the pixel of frame #n (corresponding to the pixel in frame #n+1) supplied from the frame memory 621 belongs to the uncovered background area, and supplies the pixel value multiplied by the mixture ratio α supplied from the multiplier 641 to a calculator 643 and the synthesizer 634. The value obtained by multiplying the pixel value of the pixel in frame #n+1 by the mixture ratio α output from the switch 642 is equivalent to the background components of the pixel value of the corresponding pixel in frame #n.

The calculator 643 subtracts the background components supplied from the switch 642 from the pixel value of the pixel in frame #n supplied from the frame memory 621 so as to obtain the foreground components. The calculator 643 supplies the foreground components of the pixel in frame #n belonging to the uncovered background area to the synthesizer 633.

A multiplier 651 of the covered area processor 632 multiplies the pixel value of the pixel in frame #n−1 supplied from the frame memory 621 by the mixture ratio α, and outputs the resulting pixel value to a switch 652. The switch 652 is closed when the pixel of frame #n (corresponding to the pixel in frame #n−1) supplied from the frame memory 621 belongs to the covered background area, and supplies the pixel value multiplied by the mixture ratio α supplied from the multiplier 651 to a calculator 653 and the synthesizer 634. The value obtained by multiplying the pixel value of the pixel in frame #n−1 by the mixture ratio α output from the switch 652 is equivalent to the background components of the pixel value of the corresponding pixel in frame #n.

The calculator 653 subtracts the background components supplied from the switch 652 from the pixel value of the pixel in frame #n supplied from the frame memory 621 so as to obtain the foreground components. The calculator 653 supplies the foreground components of the pixel in frame #n belonging to the covered background area to the synthesizer 633.

The synthesizer 633 combines the foreground components of the pixels belonging to the uncovered background area in frame #n and supplied from the calculator 643 with the foreground components of the pixels belonging to the covered background area and supplied from the calculator 653, and supplies the synthesized foreground components to the frame memory 623.

The synthesizer 634 combines the background components of the pixels belonging to the uncovered background area in frame #n and supplied from the switch 642 with the background components of the pixels belonging to the covered background area and supplied from the switch 652, and supplies the synthesized background components to the frame memory 623.

The frame memory 623 stores the foreground components and the background components of the pixels in the mixed area of frame #n supplied from the separation processing block 622.

The frame memory 623 outputs the stored foreground components of the pixels in the mixed area in frame #n and the stored background components of the pixels in the mixed area in frame #n.

By utilizing the mixture ratio α, which indicates the feature quantity, the foreground components and the background components contained in the pixel values can be completely separated.

The synthesizer 603 combines the foreground components of the pixels in the mixed area in frame #n output from the separating portion 601 with the pixels belonging to the foreground area so as to generate a foreground component image. The synthesizer 605 combines the background components of the pixels in the mixed area in frame #n output from the separating portion 601 with the pixels belonging to the background area so as to generate a background component image.

FIG. 62A illustrates an example of the foreground component image corresponding to frame #n in FIG. 58. FIG. 62B illustrates an example of the background component image corresponding to frame #n in FIG. 58.

FIG. 62A illustrates an example of the foreground component image corresponding to frame #n in FIG. 58. The leftmost pixel and the fourteenth pixel from the left consist of only the background components before the foreground and the background are separated, and thus, the pixel values are set to 0.

The second and fourth pixels from the left belong to the uncovered background area before the foreground and the background are separated. Accordingly, the background components are set to 0, and the foreground components are maintained. The eleventh through thirteenth pixels from the left belong to the covered background area before the foreground and the background are separated. Accordingly, the background components are set to 0, and the foreground components are maintained. The fifth through tenth pixels from the left consist of only the foreground components, which are thus maintained.

FIG. 62B illustrates an example of the background component image corresponding to frame #n in FIG. 58. The leftmost pixel and the fourteenth pixel from the left consist of only the background components before the foreground and the background are separated, and thus, the background components are maintained.

The second through fourth pixels from the left belong to the uncovered background area before the foreground and the background are separated. Accordingly, the foreground components are set to 0, and the background components are maintained. The eleventh through thirteenth pixels from the left belong to the covered background area before the foreground and the background are separated. Accordingly, the foreground components are set to 0, and the background components are maintained. The fifth through tenth pixels from the left consist of only the foreground components, and thus, the pixel values are set to 0.

Figure 63:
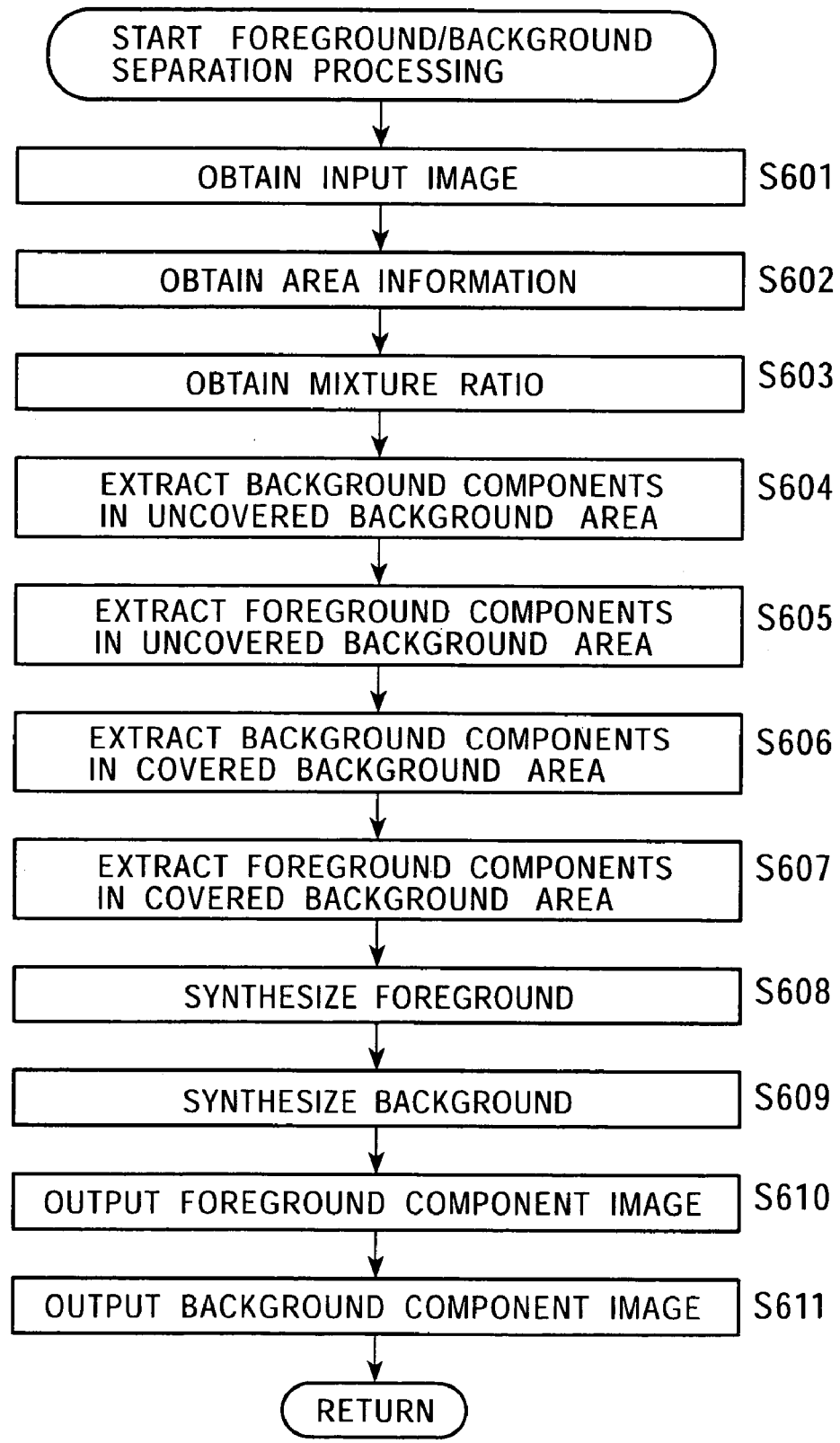
FIG. 63 is a flowchart illustrating the processing for separating a foreground and a background.

The processing for separating the foreground and the background executed by the foreground/background separator 105 is described below with reference to the flowchart of FIG. 63. In step S601, the frame memory 621 of the separating portion 601 obtains an input image, and stores frame #n for which the foreground and the background are separated together with the previous frame #n−1 and the subsequent frame #n+1.

In step S602, the separation processing block 622 of the separating portion 601 obtains area information supplied from the mixture-ratio calculator 104. In step S603, the separation processing block 622 of the separating portion 601 obtains the mixture ratio α supplied from the mixture-ratio calculator 104.

In step S604, the uncovered area processor 631 extracts the background components from the pixel values of the pixels belonging to the uncovered background area supplied from the frame memory 621 based on the area information and the mixture ratio α.

In step S605, the uncovered area processor 631 extracts the foreground components from the pixel values of the pixels belonging to the uncovered background area supplied from the frame memory 621 based on the area information and the mixture ratio α.

In step S606, the covered area processor 632 extracts the background components from the pixel values of the pixels belonging to the covered background area supplied from the frame memory 621 based on the area information and the mixture ratio α.

In step S607, the covered area processor 632 extracts the foreground components from the pixel values of the pixels belonging to the covered background area supplied from the frame memory 621 based on the area information and the mixture ratio α.

In step S608, the synthesizer 633 combines the foreground components of the pixels belonging to the uncovered background area extracted in the processing of step S605 with the foreground components of the pixels belonging to the covered background area extracted in the processing of step S607. The synthesized foreground components are supplied to the synthesizer 603. The synthesizer 603 further combines the pixels belonging to the foreground area supplied via the switch 602 with the foreground components supplied from the separating portion 601 so as to generate a foreground component image.

In step S609, the synthesizer 634 combines the background components of the pixels belonging to the uncovered background area extracted in the processing of step S604 with the background components of the pixels belonging to the covered background area extracted in the processing of step S606. The synthesized background components are supplied to the synthesizer 605. The synthesizer 605 further combines the pixels belonging to the background area supplied via the switch 604 with the background components supplied from the separating portion 601 so as to generate a background component image.

In step S610, the synthesizer 603 outputs the foreground component image. In step S611, the synthesizer 605 outputs the background component image. The processing is then completed.

As discussed above, the foreground/background separator 105 is able to separate the foreground components and the background components from the input image based on the area information and the mixture ratio α, and outputs the foreground component image consisting of only the foreground components and the background component image consisting of only the background components.

Figure 64:
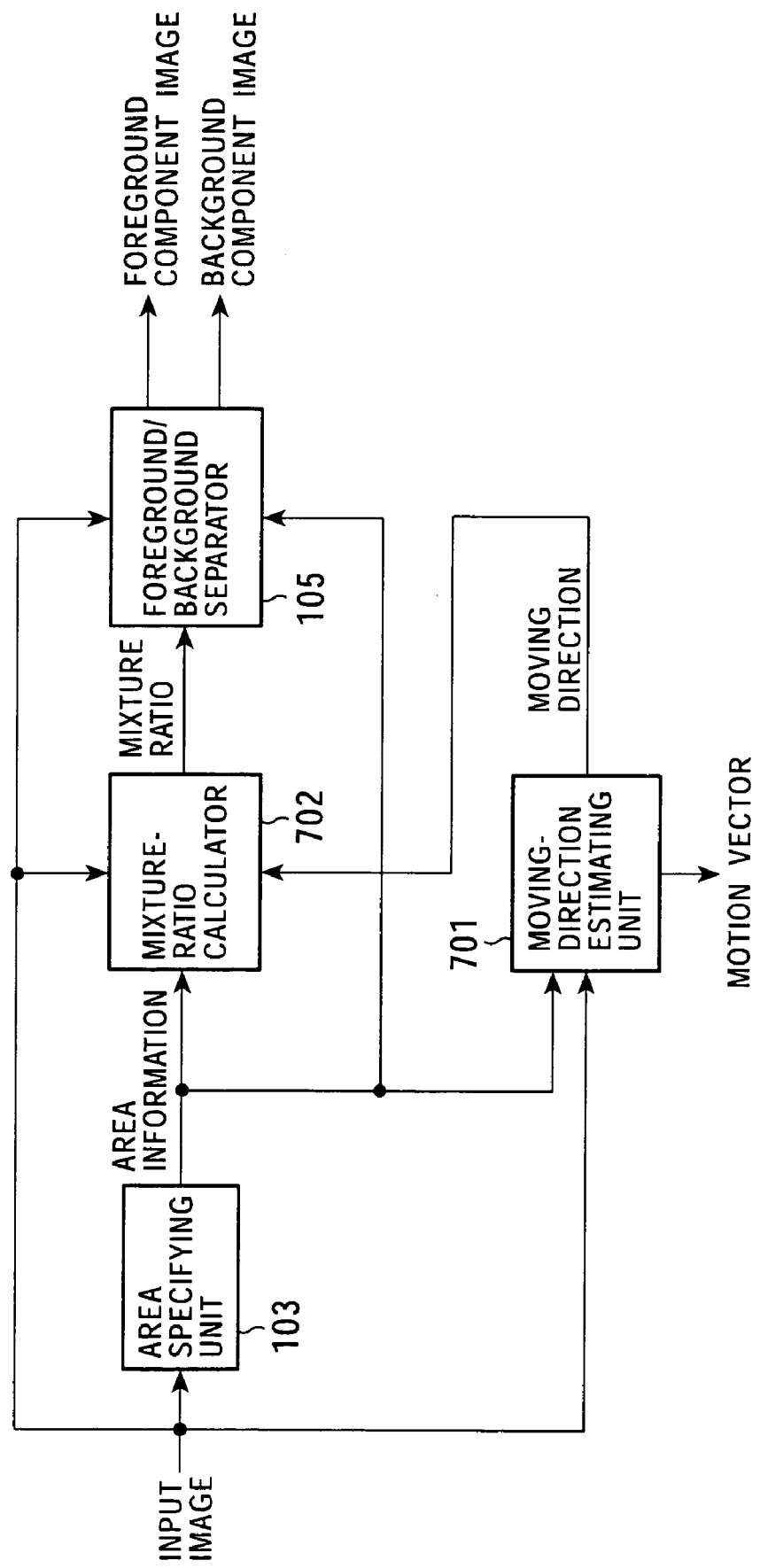
FIG. 64 is a block diagram illustrating another configuration of the image processing apparatus according to the present invention.

FIG. 64 illustrates another configuration of the image processing apparatus according to the present invention. The elements similar to those shown in FIG. 2 are indicated by like reference numerals, and an explanation thereof is thus omitted.

A moving-direction estimating unit 701 generates a motion vector corresponding to a foreground object based on area information supplied from the area specifying unit 103 and an input image, and also extracts the moving direction from the motion vector so as to supply the extracted moving direction to a mixture-ratio calculator 702. The moving-direction estimating unit 701 is able to output the generated motion vector.

The mixture-ratio calculator 702 calculates the mixture ratio α for each pixel based on the area information supplied from the area specifying unit 103 and the moving direction supplied from the moving-direction estimating unit 701, and supplies the calculated mixture ratio α to the foreground/background separator 105.

Figure 65:
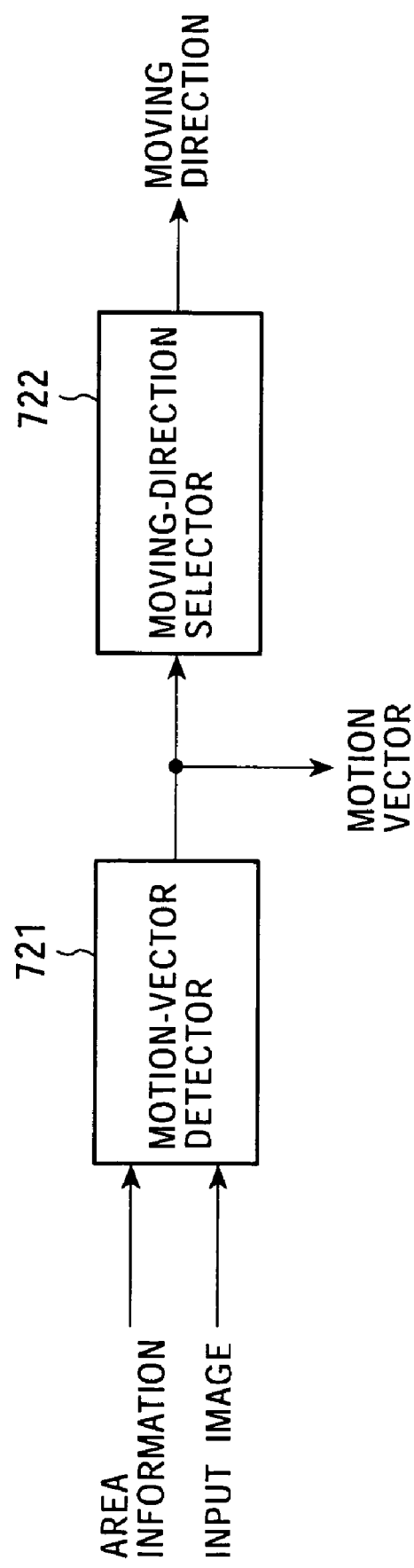
FIG. 65 is a block diagram illustrating the configuration of a moving-direction estimating unit 701.

FIG. 65 is a block diagram illustrating the configuration of the moving-direction estimating unit 701. A moving-vector detector 721 generates a motion vector based on the area information supplied from the area specifying unit 103 and the input image.

More specifically, when the designated pixel of frame #n belongs to the covered background area, the motion-vector detector 721 extracts an estimation block corresponding to the designated pixel from frame #n based on the area information of frame #n and #n+1 supplied from the area specifying unit 103.

For example, as shown in FIG. 66, an estimation block having the designated pixel belonging to the covered background area at the center and containing the background area and the foreground area is extracted.

In FIG. 66, A indicates the designated pixel, B designates the estimation block, and C represents the search area. In FIG. 66, D indicates the foreground area, E designates the background area, F represents the covered background area, and G indicates the uncovered background area.

The motion-vector detector 721 detects the covered background area of frame #n+1 having the same configuration as that of the covered background area contained in the extracted estimation block.

For example, as shown in FIG. 66, the motion-vector detector 721 searches the search area of frame #n+1 corresponding to the estimation block in frame #n, and detects the covered background area of frame #n+1 having the same configuration as that of the covered background area contained in the extracted estimation block.

The motion-vector detector 721 calculates the motion vector corresponding to the designated pixel based on the position of the estimation block of frame #n on the screen and the position of the detected covered background area of frame #n+1 on the screen. The motion-vector detector 721 outputs the calculated motion vector, and also supplies it to a moving-direction selector 722.

Figure 67A:
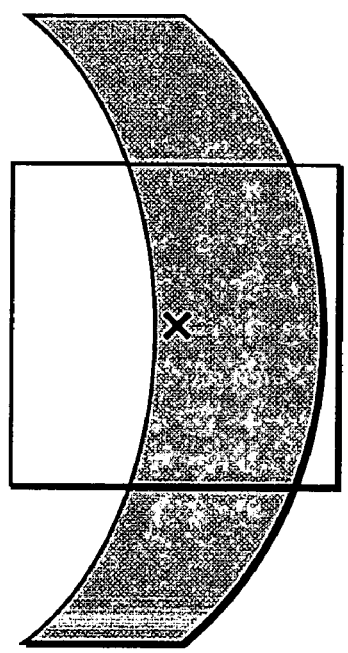
FIG. 67A illustrates an evaluation block.
Figure 67B:
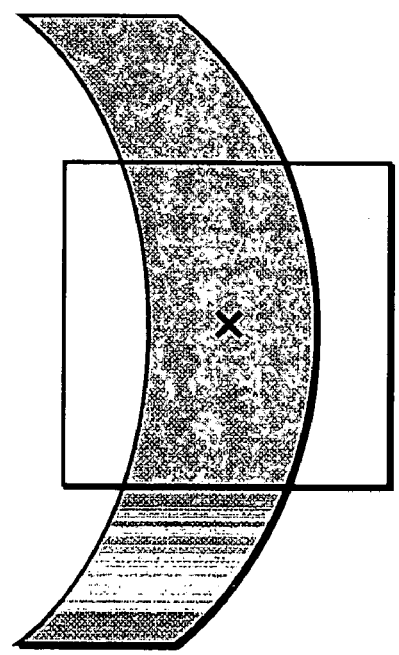
FIG. 67B illustrates an evaluation block.

As shown in FIGS. 67A and 67B, the motion-vector detector 721 sets the length of one side of the estimation block to twice longer than the amount of movement v (width of the mixed area).

For example, as shown in FIG. 67A, it is now assumed that the designated pixel is positioned at the edge of the mixed area. In this case, if the length of one side of the estimation block is set to twice longer than the amount of movement v, the estimation block contains the background area and the mixed area, and the outline of the mixed area to be detected becomes clear.

Similarly, as shown in FIG. 67B, it is now assumed that the designated pixel is positioned at the center of the mixed area. In this case, if the length of one side of the estimation block is set to twice longer than the amount of movement v, the estimation block contains the background area and the mixed area, and the outline of the mixed area to be detected becomes clear.

Figure 67C:
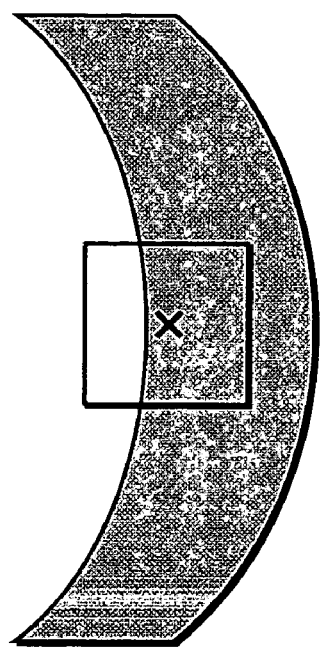
FIG. 67C illustrates an evaluation block.
Figure 67D:
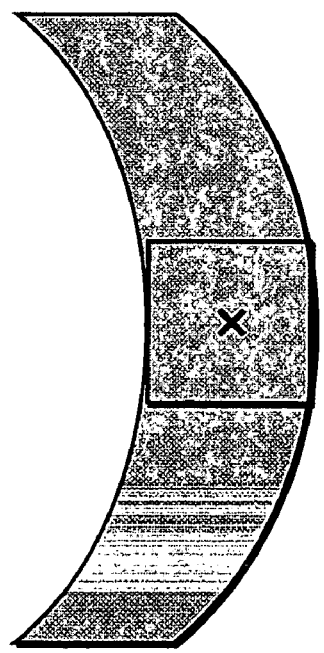
FIG. 67D illustrates an evaluation block.

In contrast, as shown in FIG. 67C, it is now assumed that the designated pixel is positioned at the edge of the mixed area. In this case, if the length of one side of the estimation block is set to the same length as that of the amount of movement v, either of the background area or the mixed area is not contained in the estimation block, and the outline of the mixed area to be detected becomes unclear. Likewise, as shown in FIG. 67D, it is now assumed that the designated pixel is positioned at the center of the mixed area. In this case, if the length of one side of the estimation block is set to the same length as that of the amount of movement v, either the background area or the mixed area is not contained in the estimation block, and the outline of the mixed area to be detected becomes unclear.

As discussed above, by setting the length of one side of the estimation block to twice longer than the amount of movement v, the motion-vector detector 721 is able to reliably detect the covered background area of frame #n+1 having the same configuration as that of the estimation block.

When the designated pixel of frame #n belongs to the uncovered background area, the motion-vector detector 721 extracts an estimation block corresponding to the designated pixel from frame #n based on the area information of frame #n and frame #n+1 supplied from the area specifying unit 103.

The motion-vector detector 721 detects the uncovered background area of frame #n+1 having the same configuration as that of the uncovered background area contained in the extracted estimation block.

The motion-vector detector 721 calculates the motion vector corresponding to the designated pixel based on the position of the estimation block of frame #n on the screen and the position of the detected uncovered background area of frame #n+1 on the screen. The motion-vector detector 721 outputs the calculated motion vector, and also supplies it to the moving-direction selector 722.

When the designated pixel of frame #n belongs to the foreground area, the motion-vector detector 721 extracts an estimation block corresponding to the designated pixel from the input image of frame #n. The motion-vector detector 721 provides matching between the estimation block of the input image of frame #n and the input image of frame #n+1, and generates the motion vector based on the position of the estimation block of the input image of frame #n and the position of the image of frame #n+1 that has been matched with the estimation block.

The motion-vector detector 721 may detect the motion vector based on the area information of the foreground area or the background area. In this case, the motion-vector detector 721 does not need the input image. Alternatively, the motion-vector detector 721 may detect the motion vector by performing matching on the whole screen for the covered background area, the uncovered background area, the foreground area, or the background area. In this case, the motion-vector detector 721 does not need the input image.

Referring back to FIG. 65, the moving-direction selector 722 extracts the moving direction of the motion vector supplied from the motion-vector detector 721, and outputs the extracted moving direction.

For example, the moving-direction selector 722 extracts horizontal vector components and vertical vector components from the motion vector, and calculates the absolute value of the horizontal vector components and the absolute value of the vertical vector components. The moving-direction selector 722 selects one of the horizontal vector components and the vertical vector components having a greater absolute value. The moving-direction selector 722 outputs the direction corresponding to the selected vector components as the moving direction.

The moving direction may take one of the values, for example, 0 indicating the left, 1 indicating the right, 2 indicating the top, and 3 indicating the bottom.

In this manner, the moving-direction estimating unit 701 is able to detect the motion vector and also outputs the moving direction.

Figure 68:
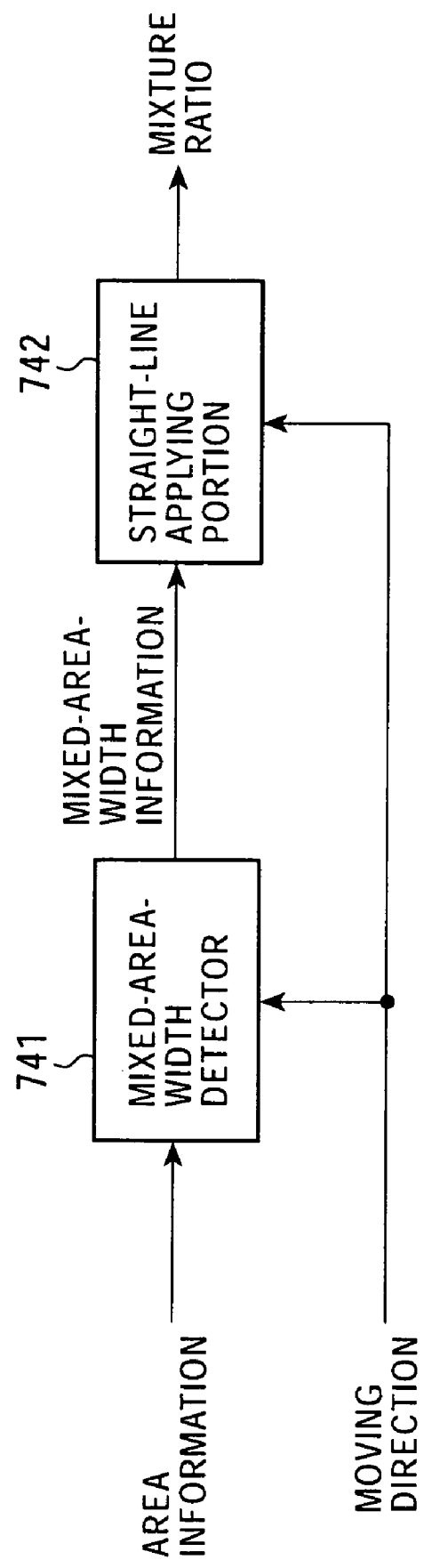
FIG. 68 is a block diagram illustrating the configuration of a mixture-ratio calculator 702.

FIG. 68 is a block diagram illustrating the configuration of the mixture-ratio calculator 702. A mixed-area-width detector 741 detects the width of the mixed area to which the designated pixel belongs by using the pixel interval as the unit based on the area information supplied from the area specifying unit 103 and the moving direction supplied from the moving-direction estimating unit 701, and supplies the detected width to a straight-line applying portion 742 as the mixed-area-width information.

The straight-line applying portion 742 calculates the ratio of the width of the mixed area to the distance from the designated pixel to the pixel of the background area adjacent to the mixed area based on the mixed-area-width information supplied from the mixed-area-width detector 741 and the moving direction supplied from the moving-direction estimating unit 701. The straight-line applying portion 742 calculates the mixture ratio of the designated pixel based on the ratio of the width of the mixed area to the distance from the designated pixel to the pixel of the background area adjacent to the mixed area.

Figure 69:
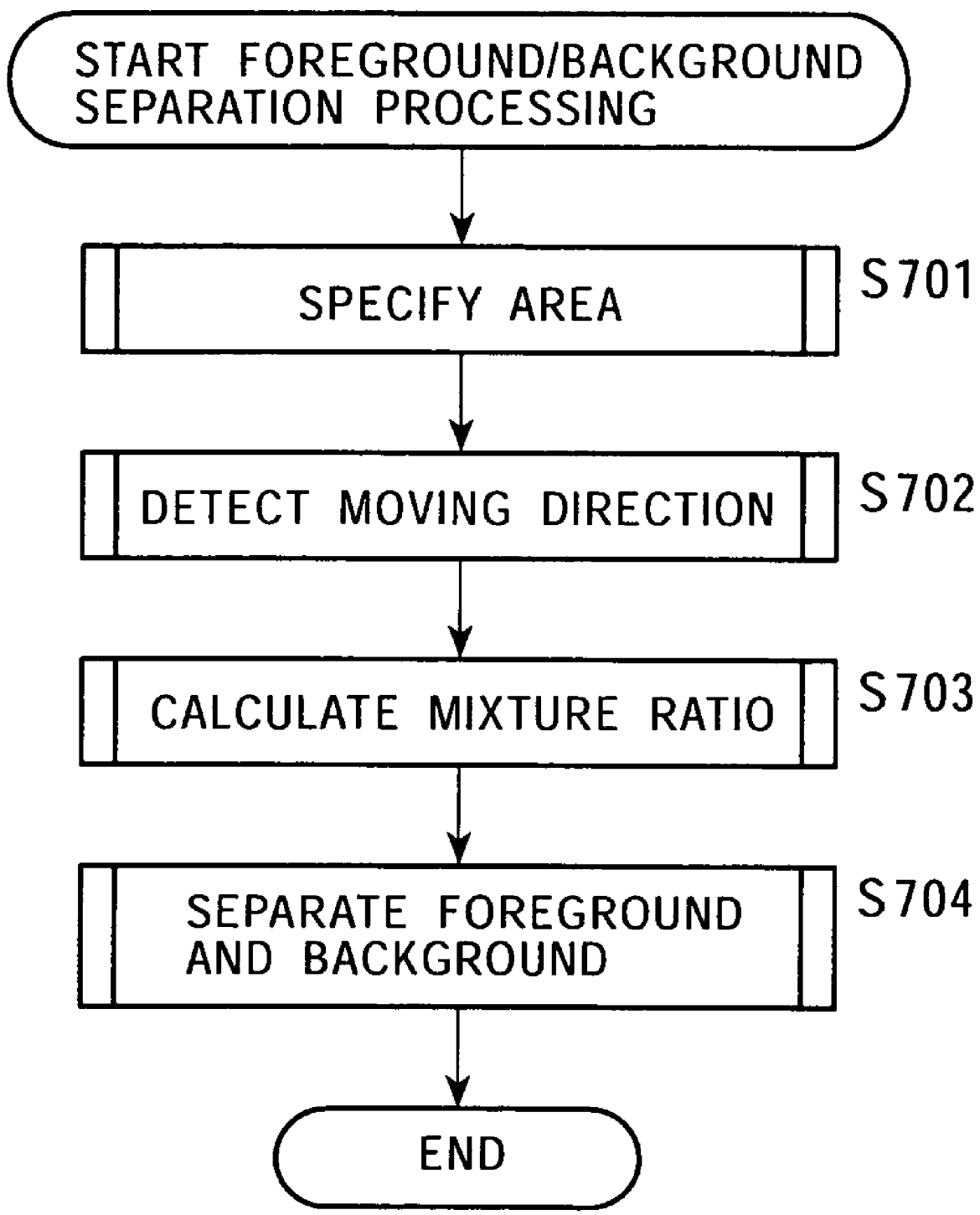
FIG. 69 is a flowchart illustrating the foreground/background separation processing.

The foreground/background separation processing performed by the image processing apparatus configured as shown in FIG. 64 is described below with reference to the flowchart of FIG. 69.

In step S701, the area specifying unit 103 executes area specifying processing, based on an input image, for generating area information indicating to which of a foreground area, a background area, a covered background area, or an uncovered background area each pixel of the input image belongs. The area specifying unit 103 supplies the generated area information to the mixture-ratio calculator 702. Details of the processing of step S701 are similar to those of the processing of step S12, and an explanation thereof is thus omitted.

In step S702, the moving-direction estimating unit 701 detects the moving direction based on the area information supplied from the area specifying unit 103. Details of the moving-direction detection processing are described below. The moving-direction estimating unit 701 supplies the moving direction to the mixture-ratio calculator 702.

In step S703, the mixture-ratio calculator 702 calculates the mixture ratio $\alpha$ for each pixel contained in the mixed area based on the moving direction supplied from the moving-direction estimating unit 701 and the area information supplied from the area specifying unit 103. Details of the mixture-ratio calculation processing area are discussed below. The mixture-ratio calculator 104 supplies the calculated mixture ratio $\alpha$ to the foreground/background separator 105. Details of the processing of step S703 are similar to those of the processing of step S13, and an explanation thereof is thus omitted.

In step S704, the foreground/background separator 705 extracts the foreground components and the background components from the input image based on the area information and the mixture ratio $\alpha$, and synthesizes the foreground component image based on the extracted foreground components, and synthesizes the background component image based on the extracted background components. The foreground/background separator 105 outputs the foreground component image and the background component image, and the processing is then completed. Details of the processing of step S704 are similar to those of the processing of step S14, and an explanation thereof is thus omitted.

As discussed above, the image processing apparatus configured as shown in FIG. 64 is able to separate the foreground and the background.

Figure 70:
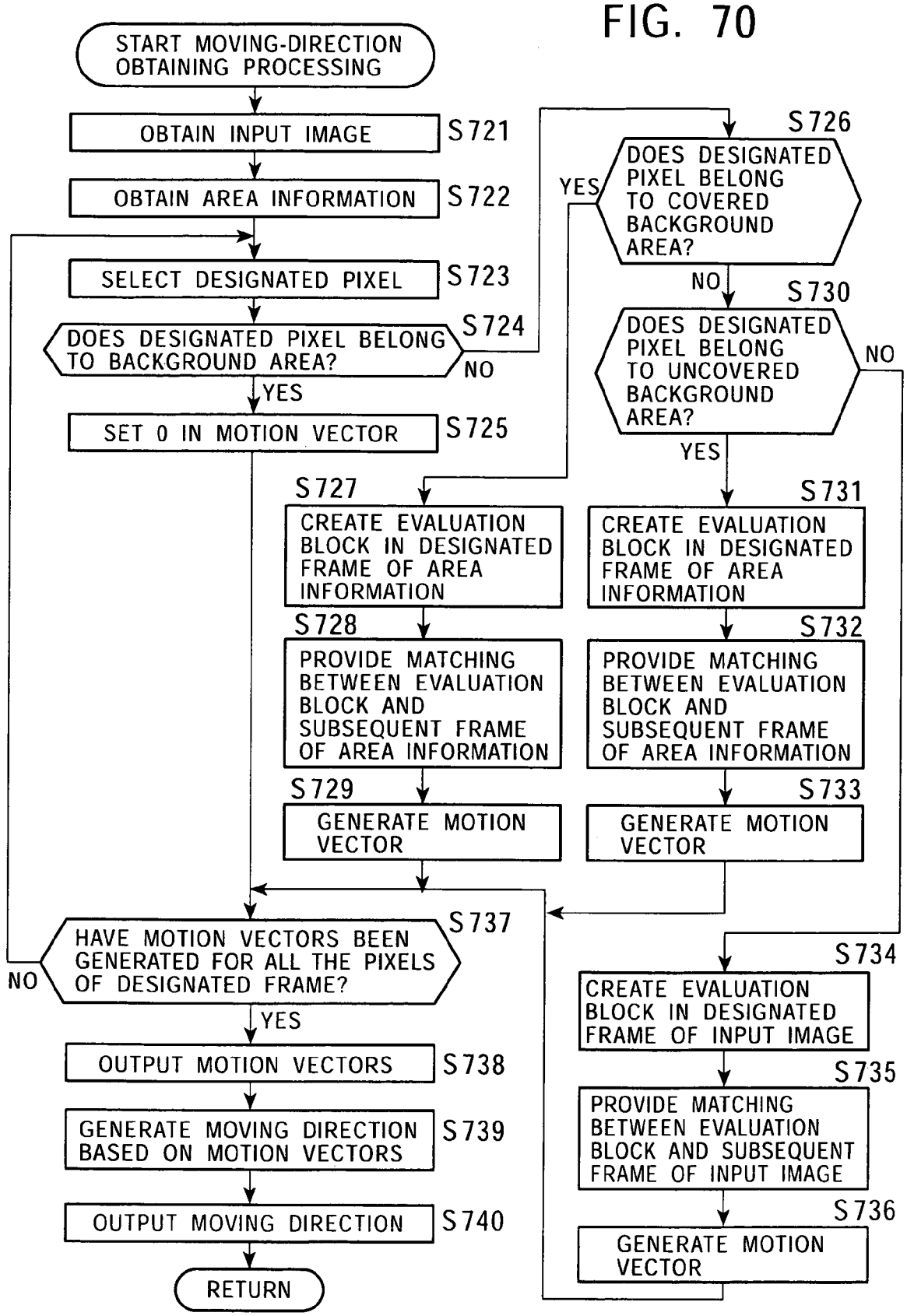
FIG. 70 is a flowchart illustrating the moving-direction obtaining processing.

The moving-direction obtaining processing performed by the moving-direction estimating unit 701 is described below with reference to the flowchart of FIG. 70.

In step S721, the motion-vector detector 721 obtains the input image of a designated frame and the input image of the frame subsequent to the designated frame.

In step S722, the motion-vector detector 721 obtains the area information of the designated frame and the area information of the frame subsequent to the designated frame.

In step S723, the motion-vector detector 721 designates a pixel. In step S724, the motion-vector detector 721 determines whether the designated pixel belongs to the stationary area based on the area information of the designated frame. If it is determined that the designated pixel belongs to the stationary area, the process proceeds to step S725 in which the motion vector is set to 0. The process then proceeds to step S737.

If it is determined in step S724 that the designated pixel does not belong to the stationary area, the process proceeds to step S726. In step S726, the motion-vector detector 721 determines whether the designated pixel belongs to the covered background area based on the area information of the designated frame. If it is determined in step S726 that the designated pixel belongs to the covered background area, the process proceeds to step S727. In step S727, the motion-vector detector 721 creates an estimation block containing the covered background area, the foreground area, and the background area. In step S728, the motion-vector detector 721 provides matching between the estimation block and the area information indicating the covered background area of the frame subsequent to the designated frame.

For example, the motion-vector detector 721 calculates the square sums of the errors between the estimation block and the areas having the same size as that of the estimation block within the search area of the area information of the frame subsequent to the designated frame, and selects the area within the search area having the minimum square sum of the errors.

In step S729, the motion-vector detector 721 generates a motion vector based on the position of the estimation block of the designated frame and the position of the matched covered background area of the frame subsequent to the designated frame, and the process proceeds to step S737.

If it is determined in step S726 that the designated pixel does not belong to the covered background area, the process proceeds to step S730. In step S730, the motion-vector detector 721 determines whether the designated pixel belongs to the uncovered background area based on the area information of the designated frame.

If it is determined in step S730 that the designated pixel belongs to the uncovered background area, the process proceeds to step S731. In step S731, the motion-vector detector 721 creates an estimation block containing the uncovered background area, the foreground area, and the background area. In step S732, the motion-vector detector 721 provides matching between the estimation block and the area information indicating the uncovered background area of the frame subsequent to the designated frame.

For example, the motion-vector detector 721 calculates the square sums of the errors between the estimation block and the areas having the same size as that of the estimation block within the search area of the area information of the frame subsequent to the designated frame, and selects the area within the search area having the minimum square sum of the errors.

In step S733, the motion-vector detector 721 generates a motion vector based on the position of the estimation block of the designated frame and the position of the matched uncovered background area of the frame subsequent to the designated frame. The process then proceeds to step S737.

If it is determined in step S730 that the designated pixel does not belong to the uncovered background area, it can be proved that the designated pixel belongs to the foreground area. The process thus proceeds to step S734 in which the motion-vector detector 721 creates an estimation block in the designated frame of the input image. In step S735, the motion-vector detector 721 provides matching between the estimation block of the designated frame and the input image of the frame subsequent to the designated frame.

For example, the motion-vector detector 721 calculates the square sums of the errors between the estimation block and the image portions having the same size as that of the estimation block within the search area of the input image of the frame subsequent to the designated frame, and selects the image portion within the search area having the minimum square sum of the errors.

In step S736, the motion-vector detector 721 generates a motion vector based on the position of the estimation block of the designated frame and the position of the matched image portion of the frame subsequent to the designated frame. The process then proceeds to step S737.

In step S737, the motion-vector detector 721 determines whether the motion vectors have been generated for all the pixels of the designated frame. If it is determined that the motion vectors have not been generated for all the pixels of the designated frame, the process returns to step S723 in which the subsequent pixel is selected to repeat the processing for generating a motion vector.

If it is determined in step S737 that the motion vectors have been generated for all the pixels of the designated frame, the process proceeds to step S738. In step S738, the motion-vector detector 721 supplies the motion vectors to the moving-direction selector 722, and also outputs the motion vectors.

In step S739, the moving-direction selector 722 generates moving directions based on the motion vectors supplied from the motion-vector detector 721. In step S740, the moving-direction selector 722 outputs the generated moving directions, and the processing is completed.

As described above, the moving-direction estimating unit 701 is able to generate motion vectors and moving directions based on the input images and the area information.

It has been described that the motion-vector estimating unit 701 generates motion vectors and moving directions by using the images and the area information of the designated frame and the frame subsequent to the designated frame. Alternatively, the motion-vector estimating unit 701 may generate motion vectors and moving directions by using the images and the area information of the designated frame and the frame prior to the designated frame.

Figure 71:
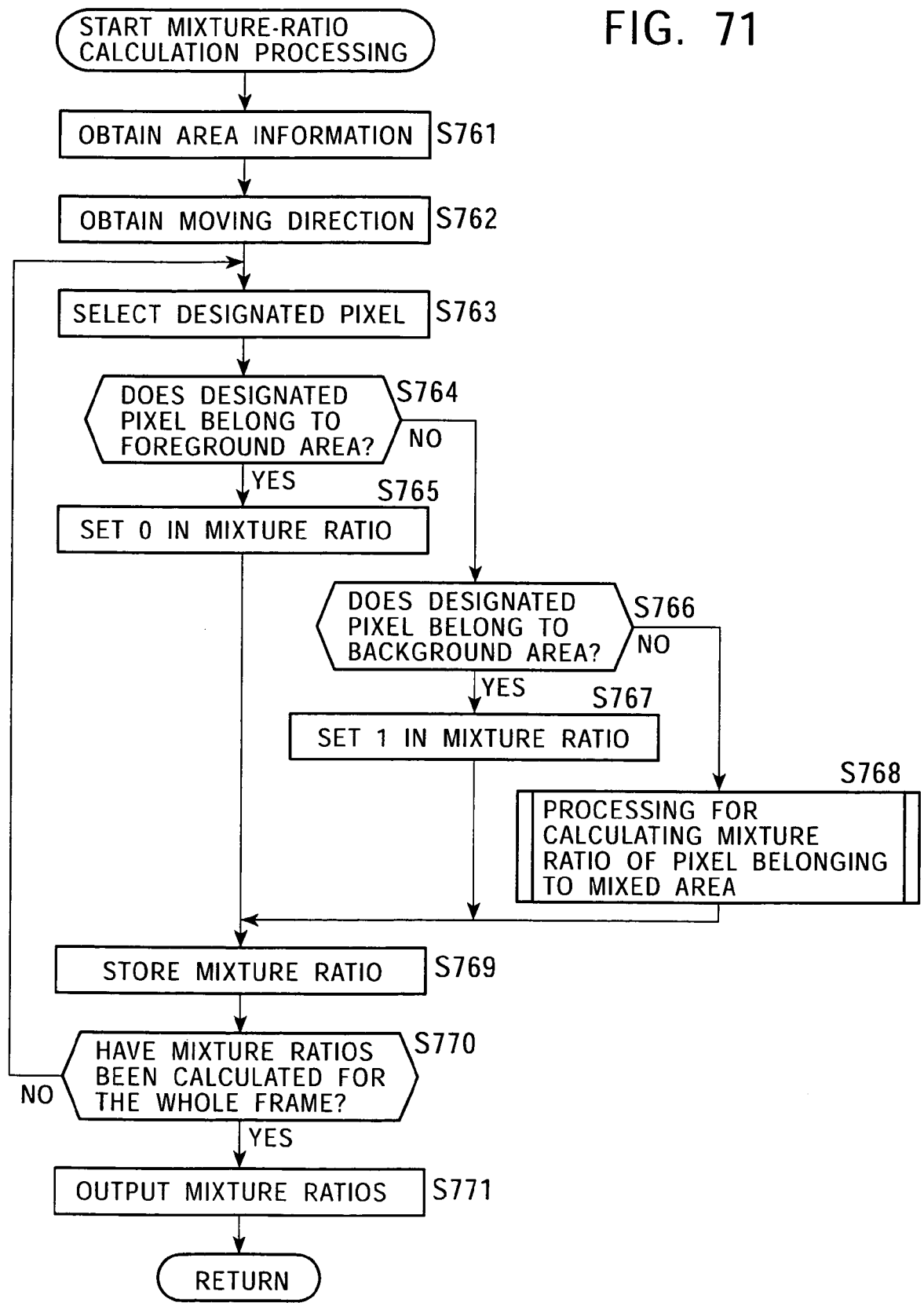
FIG. 71 is a flowchart illustrating the processing for calculating the mixture ratio $\alpha$.

The mixture-ratio calculation processing performed by the mixture-ratio calculator 702 is described below with reference to the flowchart of FIG. 71.

In step S761, the mixture-ratio-width detector 741 obtains the area information supplied from the area specifying unit 103. In step S762, the mixture-ratio-width detector 741 and the straight-line applying portion 742 obtain the moving direction supplied from the moving-direction estimating unit 701.

In step S763, the straight-line applying portion 742 designates a pixel. In step S764, the straight-line applying portion 742 determines whether the designated pixel belongs to the foreground area based on the area information. If it is determined that the designated pixel belongs to the foreground area, the process proceeds to step S765 in which 0 is set in the mixture ratio $\alpha$, and the process proceeds to step S769.

If it is determined in step S764 that the designated pixel does not belong to the foreground area, the process proceeds to step S766. In step S766, the straight-line applying portion 742 determines whether the designated pixel belongs to the background area based on the area information. If it is determined that the designated pixel belongs to the background area, the process proceeds to step S767 in which 1 is set in the mixture ratio $\alpha$. The process then proceeds to step S769.

If it is determined in step S766 that the designated pixel does not belong to the background area, the process proceeds to step S768. In step S768, the straight-line applying portion 742 executes processing for calculating the mixture ratio $\alpha$ of the pixel belonging to the mixed area, and the process proceeds to step S769. Details of the processing for calculating the mixture ratio α of the pixel belonging to the mixed area are described below.

In step S769, the straight-line applying portion 742 stores the calculated mixture ratio α in correspondence with the designated pixel.

In step S770, the straight-line applying portion 742 determines whether the mixture ratios α have been calculated for the whole frame. If it is determined that the mixture ratios α have not been calculated for the whole frame, the process returns to step S763 in which another pixel is selected to repeat the processing for calculating the mixture ratio α.

If it is determined in step S770 that the mixture ratios α have been calculated for the whole frame, the process proceeds to step S771 in which the straight-line applying portion 742 outputs the mixture ratios α. The processing is then completed.

Figure 72:
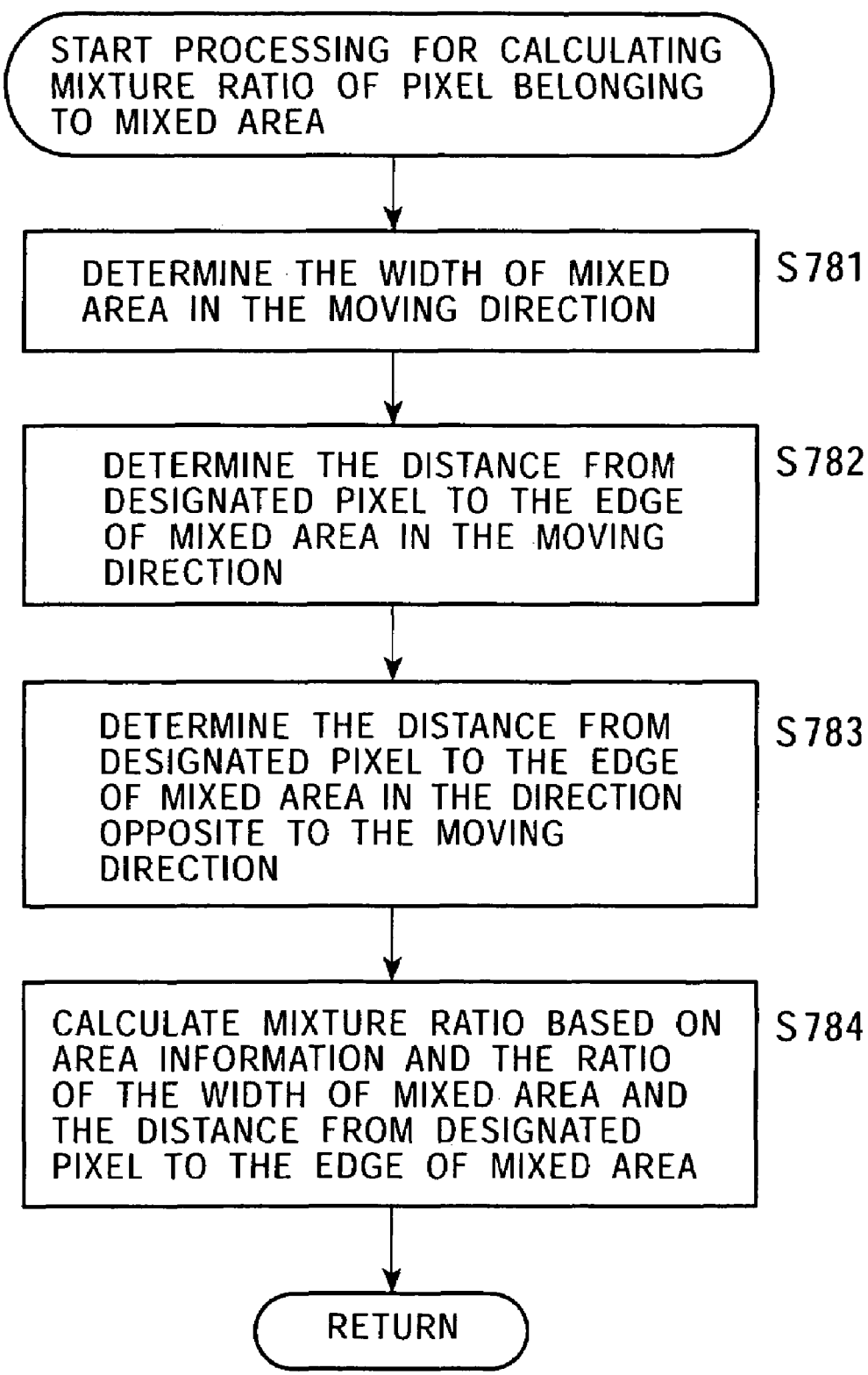
FIG. 72 is a flowchart illustrating the processing for calculating the mixture ratio $\alpha$ of a pixel belonging to the mixed area.

A description is given below, with reference to the flowchart of FIG. 72, of the processing for calculating the mixture ratio α of the pixel belonging to the mixed area performed by the mixed-area-width detector 741 and the straight-line applying portion 742 corresponding to the processing of step S768.

In step S781, the mixed-area-width detector 741 determines the width of the mixed area in the moving direction of the motion vector based on the moving direction supplied from the moving-direction estimating unit 701 and the area information supplied from the area specifying unit 103. The mixed-area-width detector 741 supplies the width of the mixed area to the straight-line applying portion 742 as the mixed-area-width information.

In step S782, the straight-line applying portion 742 determines the distance from the designated pixel to the edge of the mixed area in the moving direction.

In step S783, the straight-line applying portion 742 determines the distance from the designated pixel to the edge of the mixed area in the direction opposite to the moving direction.

In step S784, the straight-line applying portion 742 calculates the mixture ratio α based on the area information and the ratio of the width of the mixed area to the distance from the designated pixel to the edge of the mixed area. The processing is then completed.

As discussed above, the mixture-ratio calculator 702 is able to calculate the mixture ratio α, which is a feature quantity corresponding to each pixel, based on the area information supplied from the area specifying unit 103 and the moving direction supplied from the moving-direction estimating unit 701.

Figure 73:
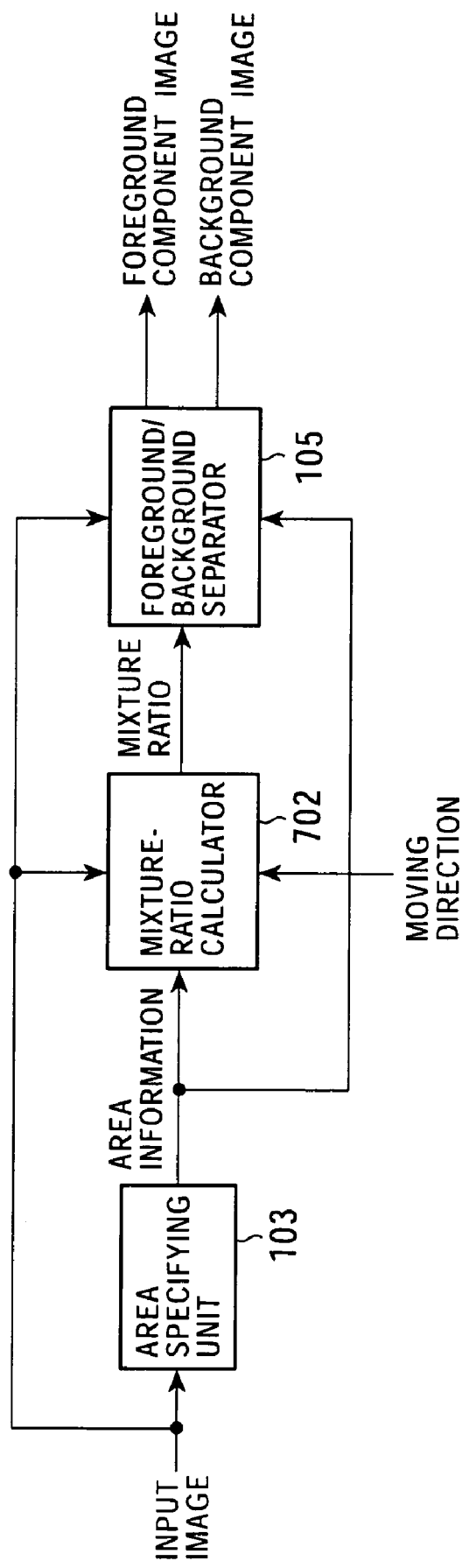
FIG. 73 is a block diagram illustrating still another configuration of the image processing apparatus according to the present invention.

FIG. 73 is a block diagram illustrating still another configuration of the image processing apparatus according to the present invention. The same elements as those shown in FIG. 64 are designated with like reference numerals, and an explanation thereof is thus omitted.

In the image processing apparatus shown in FIG. 73, the moving direction is input from an external source.

The area specifying unit 103 specifies each of the pixels of the input image as the foreground area, the background area, or the mixed area, and supplies area information indicating to which of the foreground area, the background area, or the mixed area each pixel belongs to the mixture-ratio calculator 702 and the foreground/background separator 105.

The mixture-ratio calculator 702 calculates the mixture ratio α of each pixel based on the area information supplied from the area specifying unit 103 and the moving direction supplied from the external source, and supplies the calculated mixture ratio α to the foreground/background separator 105.

The foreground/background separator 105 separates the input image into the foreground component image consisting of only the foreground components and the background component image consisting of only the background components based on the area information supplied from the area specifying unit 103 and the mixture ratio α supplied from the mixture-ratio calculator 702, and outputs the foreground component image and the background component image.

The foreground/background separation processing performed by the image processing apparatus configured as shown in FIG. 73 is described below with reference to the flowchart of FIG. 74.

In step S801, the area specifying unit 103 performs, based on the input image, area specifying processing for generating area information indicating to which of the foreground area, the background area, the covered background area, or the uncovered background area each pixel of the input image belongs. The area specifying unit 103 supplies the generated area information to the mixture-ratio calculator 702.

In step S802, the mixture-ratio calculator 702 calculates the mixture ratio α for each pixel contained in the mixed area based on the externally input moving direction and the area information supplied from the area specifying unit 103. The mixture-ratio calculator 104 supplies the calculated mixture ratio α to the foreground/background separator 105.

In step S803, the foreground/background separator 105 extracts the foreground components and the background components from the input image based on the area information and the mixture ratio α, and synthesizes the foreground component image based on the extracted foreground components and also synthesizes the background component image based on the extracted background components. The foreground/background separator 105 outputs the foreground component image and the background component image, and the processing is completed.

As discussed above, the image processing apparatus configured as shown in FIG. 73 is able to separate the foreground and the background.

It has been described in which the width of the mixed area is determined to calculate the distance from the designated pixel to the edge of the mixed area in the direction of the moving vector, or the width of the mixed area is determined to calculate the distance from the designated pixel to the edge of the mixed area in the moving direction. However, the mixture ratio can be calculated by the processing described with reference to FIG. 55 or 72 by determining the above-described width of the mixed area and the distance in any direction other than the direction orthogonal to the motion vector or the moving direction. For example, the mixture ratio can be calculated by the processing described with reference to FIG. 55 or 72 by determining the width of the mixed area and the distance of the designated pixel to the edge of the mixed area in the direction parallel to the motion vector or the moving direction. Alternatively, the mixture ratio can be calculated by the processing described with reference to FIG. 55 or 72 by determining the width of the mixed area and the distance from the designated pixel to the edge of the mixed area in a direction obliquely intersecting with the motion vector or the moving direction.

That is, the mixed area in which the foreground object components forming the foreground object and the background object components forming the background object are mixed in correspondence with the image data is specified, and the area information is output. Then, by assuming that the mixture ratio indicating the ratio of the background object components to the foreground object components in the mixed area changes substantially linearly with respect to the position of the pixel, the mixture ratio is estimated based on the area information and the moving direction of the foreground object. With this arrangement, the mixture state in the image can be detected.

In this case, based on the position on a segment whose one end is positioned at the foreground area consisting of only the foreground object components and the other end is positioned at the background area consisting of only the background object components, the segment traversing the mixed area, the mixture ratio of a pixel corresponding to the position on the segment can be estimated.

Also, based on the position on a segment parallel to the moving direction of the foreground object, the mixture ratio of a pixel corresponding to the position on the segment can be estimated.

Further, based on the position on a segment obliquely intersecting with the moving direction of the foreground object, the mixture ratio of a pixel corresponding to the position on the segment can be estimated.

It has been described in which the mixture ratio $\alpha$ is set to the ratio of the background components contained in the pixel values. However, the mixture ratio $\alpha$ may be set to the ratio of the foreground components contained in the pixel values.

It has also been described in which the moving direction of the foreground object is set to the direction from the left to the right. However, the moving direction is not restricted to the above-described direction.

In the above description, a real-space image having a three-dimensional space and time axis information is projected onto a time space having a two-dimensional space and time axis information by using a video camera. However, the present invention is not restricted to this example, and can be applied to the following case. When a greater amount of first information in one-dimensional space is projected onto a smaller amount of second information in a two-dimensional space, distortion generated by the projection can be corrected, significant information can be extracted, or a more natural image can be synthesized.

The sensor is not restricted to a CCD, and may be another type of sensor, such as a solid-state image-capturing device, for example, a BBD (Bucket Brigade Device), a CID (Charge Injection Device), or a CPD (Charge Priming Device), or a CMOS (Complementary Metal Oxide Semiconductor). Also, the sensor does not have to be a sensor in which detection devices are arranged in a matrix, and may be a sensor in which detection devices are arranged in one line.

A recording medium in which a program for performing the signal processing of the present invention is recorded may be formed of a package medium in which the program is recorded, which is distributed for providing the program to a user separately from the computer, as shown in FIG. 1, such as the magnetic disk 51 (including a floppy (registered trade name) disk), the optical disc 52 (including a CD-ROM (Compact Disc-Read Only Memory) and a DVD (Digital Versatile Disc)), the magneto-optical disk 53 (including MD (Mini-Disc) (registered trade name), or the semiconductor memory 54. The recording medium may also be formed of the ROM 22 or a hard disk contained in the storage unit 28 in which the program is recorded, such recording medium being provided to the user while being prestored in the computer.

The steps forming the program recorded in a recording medium may be executed chronologically according to the orders described in the specification. However, they do not have to be executed in a time-series manner, and they may be executed concurrently or individually.

INDUSTRIAL APPLICABILITY

According to the first invention, it is possible to detect the mixture state in an image.

According to the second invention, it is possible to detect the mixture state in an image.

The invention claimed is:

1. An image processing apparatus for processing image data which is formed of a predetermined number of pixel data obtained by an image-capturing device including a predetermined number of pixels, the pixels having a time integrating function, said image processing apparatus comprising:
   area specifying means for specifying, in correspondence with the image data, a mixed area in which foreground object components forming a foreground object and background object components forming a background object are mixed and a non-mixed area formed of a foreground area consisting of only the foreground object components and a background area consisting of only the background object components; and
   mixture-ratio estimating means for estimating, based on a ratio of a width of the mixed area in a predetermined direction with respect to a moving direction of the foreground object component, the width of the mixed area being specified by the area information, to a distance from a position of a designated pixel to an edge of the mixed area in the predetermined direction, a mixture ratio indicating the ratio between the foreground object components and the background object components of the designated pixel.

2. An image processing apparatus according to claim 1, further comprising motion-vector detection means for detecting a motion vector of the foreground object,
   wherein said mixture-ratio estimating means detects the width of the mixed area and the distance from the position of the designated pixel to the edge of the mixed area in the moving direction of the motion vector, and estimates the mixture ratio based on the ratio of the width of the mixed area to the distance from the position of the designated pixel to the edge of the mixed area.

3. An image processing apparatus according to claim 1, further comprising moving-direction detection means for detecting the moving direction of the foreground object,
   wherein said mixture-ratio estimating means detects the width of the mixed area and the distance from the position of the designated pixel to the edge of the mixed area in the moving direction, and estimates the mixture ratio based on the ratio of the width of the mixed area to the distance from the position of the designated pixel to the edge of the mixed area.

4. An image processing apparatus according to claim 3, wherein said moving-direction detection means comprises motion-vector generating means for generating a motion vector based on the area information and the position of the mixed area in a designated frame and the position of the mixed area in a frame in the vicinity of the designated frame, thereby detecting the moving direction based on the generated motion vector.

5. An image processing method for an image processing apparatus for processing image data which is formed of a predetermined number of pixel data obtained by an image-capturing device including a predetermined number of pixels, the pixels having a time integrating function, said image processing method comprising:

an area specifying step of specifying, in correspondence with the image data, a mixed area in which foreground object components forming a foreground object and background object components forming a background object are mixed and a non-mixed area formed of a foreground area consisting of only the foreground object components and a background area consisting of only the background object components; and a mixture-ratio estimating step of estimating, based on a ratio of a width of the mixed area in a predetermined direction with respect to a moving direction of the foreground object component, the width of the mixed area being specified by the area information, to a distance from a position of a designated pixel to an edge of the mixed area in the predetermined direction, a mixture ratio indicating the ratio between the foreground object components and the background object components of the designated pixel.

6. An image processing method according to claim 5, further comprising a motion-vector detection step of detecting a motion vector of the foreground object, wherein, in said mixture-ratio estimating step, the width of the mixed area and the distance from the position of the designated pixel to the edge of the mixed area are detected in the moving direction of the motion vector, and the mixture ratio is estimated based on the ratio of the width of the mixed area to the distance from the position of the designated pixel to the edge of the mixed area.

7. An image processing method according to claim 5, further comprising a moving-direction detection step of detecting the moving direction of the foreground object, wherein, in said mixture-ratio estimating step, the width of the mixed area and the distance from the position of the designated pixel to the edge of the mixed area are detected in the moving direction, and the mixture ratio is estimated based on the ratio of the width of the mixed area to the distance from the position of the designated pixel to the edge of the mixed area.

8. An image processing method according to claim 7, wherein said moving-direction detection step comprises a motion-vector generating step of generating a motion vector based on the area information and the position of the mixed area in a designated frame and the position of the mixed area in a frame in the vicinity of the designated frame, thereby detecting the moving direction based on the generated motion vector.

9. A recording medium in which a computer-readable program for processing image data which is formed of a predetermined number of pixel data obtained by an image-capturing device including a predetermined number of pixels, the pixels having a time integrating function, is recorded, said program comprising:

an area specifying step of specifying, in correspondence with the image data, a mixed area in which foreground object components forming a foreground object and background object components forming a background object are mixed and a non-mixed area formed of a foreground area consisting of only the foreground object components and a background area consisting of only the background object components; and a mixture-ratio estimating step of estimating, based on a ratio of a width of the mixed area in a predetermined direction with respect to a moving direction of the foreground object component, the width of the mixed area being specified by the area information, to a distance from a position of a designated pixel to an edge of the mixed area in the predetermined direction, a mixture ratio indicating the ratio between the foreground object components and the background object components of the designated pixel.

10. A recording medium according to claim 9, wherein:

said program further comprises a motion-vector detection step of detecting a motion vector of the foreground object; and in said mixture-ratio estimating step, the width of the mixed area and the distance from the position of the designated pixel to the edge of the mixed area are detected in the moving direction of the motion vector, and the mixture ratio is estimated based on the ratio of the width of the mixed area to the distance from the position of the designated pixel to the edge of the mixed area.

11. A recording medium according to claim 9, wherein:

said program further comprises a moving-direction detection step of detecting the moving direction of the foreground object; and in said mixture-ratio estimating step, the width of the mixed area and the distance from the position of the designated pixel to the edge of the mixed area are detected in the moving direction, and the mixture ratio is estimated based on the ratio of the width of the mixed area to the distance from the position of the designated pixel to the edge of the mixed area.

12. A recording medium according to claim 11, wherein said moving-direction detection step comprises a motion-vector generating step of generating a motion vector based on the area information and the position of the mixed area in a designated frame and the position of the mixed area in a frame in the vicinity of the designated frame, thereby detecting the moving direction based on the generated motion vector.

13. An image-capturing apparatus comprising:

image-capturing means for outputting a subject image captured by an image-capturing device including a predetermined number of pixels, the pixels having a time integrating function, as image data formed of a predetermined number of pixel data;

area specifying means for specifying, in correspondence with the image data, a mixed area in which foreground object components forming a foreground object and background object components forming a background object are mixed and a non-mixed area formed of a foreground area consisting of only the foreground object components and a background area consisting of only the background object components; and mixture-ratio estimating means for estimating, based on a ratio of a width of the mixed area in a predetermined direction with respect to a moving direction of the foreground object component, the width of the mixed area being specified by the area information, to a distance from a position of a designated pixel to an edge of the mixed area in the predetermined direction, a mixture ratio indicating the ratio between the foreground object components and the background object components of the designated pixel.

14. An image-capturing apparatus according to claim 13, further comprising motion-vector detection means for detecting a motion vector of the foreground object, wherein said mixture-ratio estimating means detects the width of the mixed area and the distance from the position of the designated pixel to the edge of the mixed area in the moving direction of the motion vector, and estimates the mixture ratio based on the ratio of the width of the mixed area to the distance from the position of the designated pixel to the edge of the mixed area.

15. An image-capturing apparatus according to claim 13, further comprising moving-direction detection means for detecting the moving direction of the foreground object, wherein said mixture-ratio estimating means detects the width of the mixed area and the distance from the position of the designated pixel to the edge of the mixed area in the moving direction, and estimates the mixture ratio based on the ratio of the width of the mixed area to the distance from the position of the designated pixel to the edge of the mixed area.

16. An image-capturing apparatus according to claim 15, wherein said moving-direction detection means comprises motion-vector generating means for generating a motion vector based on the area information and the position of the mixed area in a designated frame and the position of the mixed area in a frame in the vicinity of the designated frame, thereby detecting the moving direction based on the generated motion vector. from the position of the designated pixel to the edge of the mixed area.

17. An image processing apparatus for processing image data which is formed of a predetermined number of pixel data obtained by an image-capturing device including a predetermined number of pixels, the pixels having a time integrating function, said image processing apparatus comprising:
   area specifying means for outputting area information used for specifying, in correspondence with the image data, a mixed area in which foreground object components forming a foreground object and background object components forming a background object are mixed; and
   mixture-ratio estimating means for estimating a mixture ratio indicating the ratio of the foreground object components and the background object components in the mixed area based on the area information and a moving direction of the foreground object by assuming that the mixture ratio changes substantially linearly with respect to a position of the pixel.

18. An image processing apparatus according to claim 17, wherein said mixture-ratio estimating means estimates, based on a position on a segment whose one end is positioned at a foreground area consisting of only the foreground object components and the other end is positioned at a background area consisting of only the background object components, the segment traversing the mixed area, the mixture ratio of the pixel corresponding to the position on the segment.

19. An image processing apparatus according to claim 18, wherein said mixture-ratio estimating means estimates the mixture ratio of the pixel corresponding to the position on the segment based on the position on the segment parallel to the moving direction of the foreground object.

20. An image processing apparatus according to claim 18, wherein said mixture-ratio estimating means estimates the mixture ratio of the pixel corresponding to the position on the segment based on the position on the segment obliquely intersecting with the moving direction of the foreground object.

21. An image processing method for processing image data which is formed of a predetermined number of pixel data obtained by an image-capturing device including a predetermined number of pixels, the pixels having a time integrating function, said image processing method comprising:
   an area specifying step of outputting area information used for specifying, in correspondence with the image data, a mixed area in which foreground object components forming a foreground object and background object components forming a background object are mixed; and
   a mixture-ratio estimating step of estimating a mixture ratio indicating the ratio of the foreground object components and the background object components in the mixed area based on the area information and a moving direction of the foreground object by assuming that the mixture ratio changes substantially linearly with respect to a position of the pixel.

22. An image processing method according to claim 21, wherein, in said mixture-ratio estimating step, based on a position on a segment whose one end is positioned at a foreground area consisting of only the foreground object components and the other end is positioned at a background area consisting of only the background object components, the segment traversing the mixed area, the mixture ratio of the pixel corresponding to the position on the segment is estimated.

23. An image processing method according to claim 22, wherein, in said mixture-ratio estimating step, the mixture ratio of the pixel corresponding to the position on the segment is estimated based on the position on the segment parallel to the moving direction of the foreground object.

24. An image processing method according to claim 22, wherein, in said mixture-ratio estimating step, the mixture ratio of the pixel corresponding to the position on the segment is estimated based on the position on the segment obliquely intersecting with the moving direction of the foreground object.

25. A recording medium in which a computer-readable program for processing image data which is formed of a predetermined number of pixel data obtained by an image-capturing device including a predetermined number of pixels, the pixels having a time integrating function, is recorded, said program comprising:
   an area specifying step of outputting area information used for specifying, in correspondence with the image data, a mixed area in which foreground object components forming a foreground object and background object components forming a background object are mixed; and
   a mixture-ratio estimating step of estimating a mixture ratio indicating the ratio of the foreground object components and the background object components in the mixed area based on the area information and a moving direction of the foreground object by assuming that the mixture ratio changes substantially linearly with respect to a position of the pixel.

26. A recording medium according to claim 25, wherein, in said mixture-ratio estimating step, based on a position on a segment whose one end is positioned at a foreground area consisting of only the foreground object components and the other end is positioned at a background area consisting of only the background object components, the segment traversing the mixed area, the mixture ratio of the pixel corresponding to the position on the segment is estimated.

27. A recording medium according to claim 26, wherein, in said mixture-ratio estimating step, the mixture ratio of the pixel corresponding to the position on the segment is estimated based on the position on the segment parallel to the moving direction of the foreground object.

28. A recording medium according to claim 26, wherein, in said mixture-ratio estimating step, the mixture ratio of the pixel corresponding to the position on the segment is estimated based on the position on the segment obliquely intersecting with the moving direction of the foreground object.

29. An image-capturing apparatus comprising:

- image-capturing means for outputting a subject image captured by an image-capturing device including a predetermined number of pixels, the pixels having a time integrating function, as image data formed of a predetermined number of pixel data;
- area specifying means for outputting area information used for specifying, in correspondence with the image data, a mixed area in which foreground object components forming a foreground object and background object components forming a background object are mixed; and
- mixture-ratio estimating means for estimating a mixture ratio indicating the ratio of the foreground object components and the background object components in the mixed area based on the area information and a moving direction of the foreground object by assuming that the mixture ratio changes substantially linearly with respect to a position of the pixel.

30. An image-capturing apparatus according to claim 29, wherein said mixture-ratio estimating means estimates, based on a position on a segment whose one end is positioned at a foreground area consisting of only the foreground object components and the other end is positioned at a background area consisting of only the background object components, the segment traversing the mixed area, the mixture ratio of the pixel corresponding to the position on the segment.

31. An image-capturing apparatus according to claim 30, wherein said mixture-ratio estimating means estimates the mixture ratio of the pixel corresponding to the position on the segment based on the position on the segment parallel to the moving direction of the foreground object.

32. An image-capturing apparatus according to claim 30, wherein said mixture-ratio estimating means estimates the mixture ratio of the pixel corresponding to the position on the segment based on the position on the segment obliquely intersecting with the moving direction of the foreground object.

* * * * *